US009377639B2

(12) United States Patent
Aoyama et al.

(10) Patent No.: US 9,377,639 B2
(45) Date of Patent: Jun. 28, 2016

(54) TRANSMITTER AND TRANSMITTING METHOD

(71) Applicant: Panasonic Intellectual Property Corporation of America, Torrance, CA (US)

(72) Inventors: Hideki Aoyama, Osaka (JP); Mitsuaki Oshima, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 117 days.

(21) Appl. No.: 14/318,745

(22) Filed: Jun. 30, 2014

(65) Prior Publication Data
US 2015/0234218 A1 Aug. 20, 2015

Related U.S. Application Data

(60) Provisional application No. 61/941,610, filed on Feb. 19, 2014.

(30) Foreign Application Priority Data

Feb. 19, 2014 (JP) .................................. 2014-030063

(51) Int. Cl.
*G02F 1/35* (2006.01)
*G02F 1/133* (2006.01)
(Continued)

(52) U.S. Cl.
CPC ............ *G02F 1/13306* (2013.01); *G02F 1/135* (2013.01); *G02F 1/1336* (2013.01);
(Continued)

(58) Field of Classification Search
CPC .......................... G02F 1/135; G02F 2001/1351
See application file for complete search history.

(56) References Cited

U.S. PATENT DOCUMENTS 6,437,893 B1 * 8/2002 Rivollet ............ G06K 17/0022
345/170
7,583,901 B2 9/2009 Nakagawa et al.
(Continued)

FOREIGN PATENT DOCUMENTS

JP 61-252727 11/1986
JP 64-004127 1/1989
(Continued)

OTHER PUBLICATIONS

Search report from P.C.T. (PCT Appl. No. PCT/JP2014/002787), mail date is Aug. 12, 2014.
(Continued)

*Primary Examiner* — Phu Vu
(74) *Attorney, Agent, or Firm* — Greenblum & Bernstein, P.L.C.

(57) ABSTRACT

A transmitter that is difficult to be affected by structural constraints includes: a liquid crystal board; a first board having translucency; and a second board; and a control unit that changes, by switching transmittance of the liquid crystal board with respect to outside light through application, to the liquid crystal board, of a control voltage corresponding to a signal to be transmitted, an amount of light reflected by the first board and emitted toward the receiver via the liquid crystal board, wherein the control unit maintains, when switching the transmittance of the liquid crystal board to a low transmittance, the transmittance of the liquid crystal board at the low transmittance until the outside light that passed through the liquid crystal board is reflected by the second board and reaches the liquid crystal board.

11 Claims, 74 Drawing Sheets

(51) Int. Cl.
*G02F 1/1335* (2006.01)
*G02F 1/135* (2006.01)
*G02F 1/1333* (2006.01)

(52) U.S. Cl.
CPC .... *G02F1/133524* (2013.01); *G02F 1/133528* (2013.01); *G02F 1/133553* (2013.01); *G02F 2001/1351* (2013.01); *G02F 2001/133342* (2013.01); *G02F 2001/133626* (2013.01)

(56) References Cited

U.S. PATENT DOCUMENTS

| | | |
|---|---|---|
| 7,929,867 B2 | 4/2011 | Nakagawa |
| 8,381,985 B2 | 2/2013 | Ferren et al. |
| 8,439,265 B2 | 5/2013 | Ferren et al. |
| 8,700,012 B2 | 4/2014 | Ferren et al. |
| 8,700,102 B2 | 4/2014 | Ferren et al. |
| 8,820,644 B2 | 9/2014 | Ferren |
| 2002/0167701 A1 | 11/2002 | Hirata |
| 2004/0227719 A1 | 11/2004 | Chang et al. |
| 2006/0056855 A1 | 3/2006 | Nakagawa et al. |
| 2009/0297156 A1 | 12/2009 | Nakagawa et al. |
| 2009/0297157 A1 | 12/2009 | Nakagawa |
| 2009/0297166 A1 | 12/2009 | Nakagawa et al. |
| 2009/0297167 A1 | 12/2009 | Nakagawa et al. |
| 2009/0310976 A1 | 12/2009 | Nakagawa et al. |
| 2011/0311234 A1 | 12/2011 | Almassy et al. |
| 2012/0074227 A1 | 3/2012 | Ferren et al. |
| 2012/0075194 A1 | 3/2012 | Ferren |
| 2012/0075452 A1 | 3/2012 | Ferren |
| 2012/0079265 A1 | 3/2012 | Ferren |
| 2012/0118971 A1 | 5/2012 | Ferren et al. |
| 2012/0118972 A1 | 5/2012 | Ferren et al. |
| 2012/0118973 A1 | 5/2012 | Ferren et al. |
| 2012/0120301 A1 | 5/2012 | Ferren et al. |
| 2012/0157127 A1 | 6/2012 | Ferren et al. |
| 2012/0190408 A1 | 7/2012 | Ferren et al. |
| 2012/0268405 A1 | 10/2012 | Ferren et al. |
| 2012/0268581 A1 | 10/2012 | Ferren |
| 2012/0270575 A1 | 10/2012 | Ferren et al. |
| 2012/0270601 A1 | 10/2012 | Ferren et al. |
| 2012/0272313 A1 | 10/2012 | Ferren |
| 2012/0276932 A1 | 11/2012 | Ferren et al. |
| 2013/0019321 A1 | 1/2013 | Ferren et al. |

FOREIGN PATENT DOCUMENTS

| | | |
|---|---|---|
| JP | 02-37850 | 2/1990 |
| JP | 05-191349 | 7/1993 |
| JP | 2002-190764 | 7/2002 |
| JP | 2002-290335 | 10/2002 |
| JP | 2005-236614 | 9/2005 |
| JP | 2005-303919 | 10/2005 |
| JP | 2009-239800 | 10/2009 |
| JP | 2012-527820 | 11/2012 |
| WO | 2004/038962 | 5/2004 |
| WO | 2010/147609 | 12/2010 |

OTHER PUBLICATIONS

Search report from P.C.T. (PCT Appl. No. PCT/JP2014/003466), mail date is Sep. 2, 2014.
Office Action issued Dec. 17, 2015 in copending U.S. Appl. No. 14/302,679.

* cited by examiner

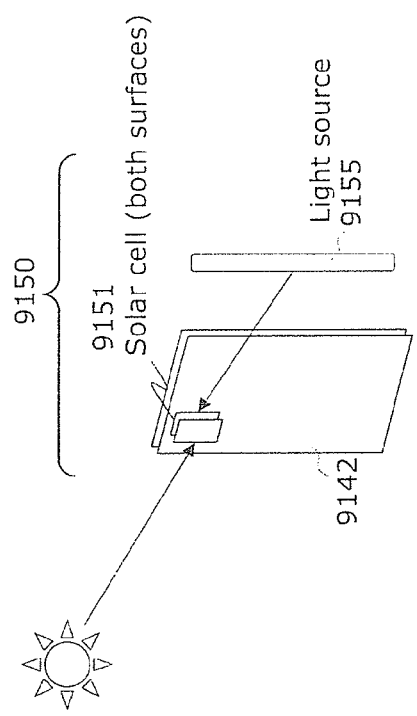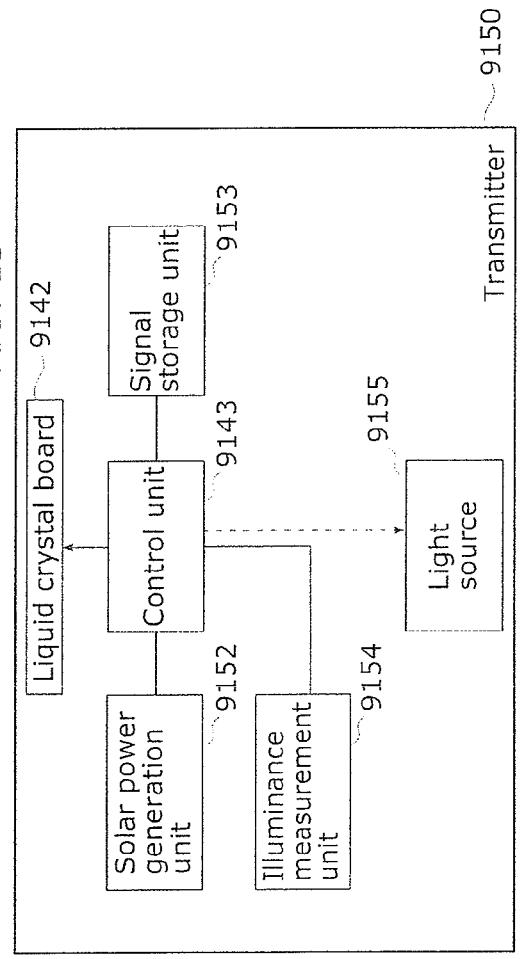

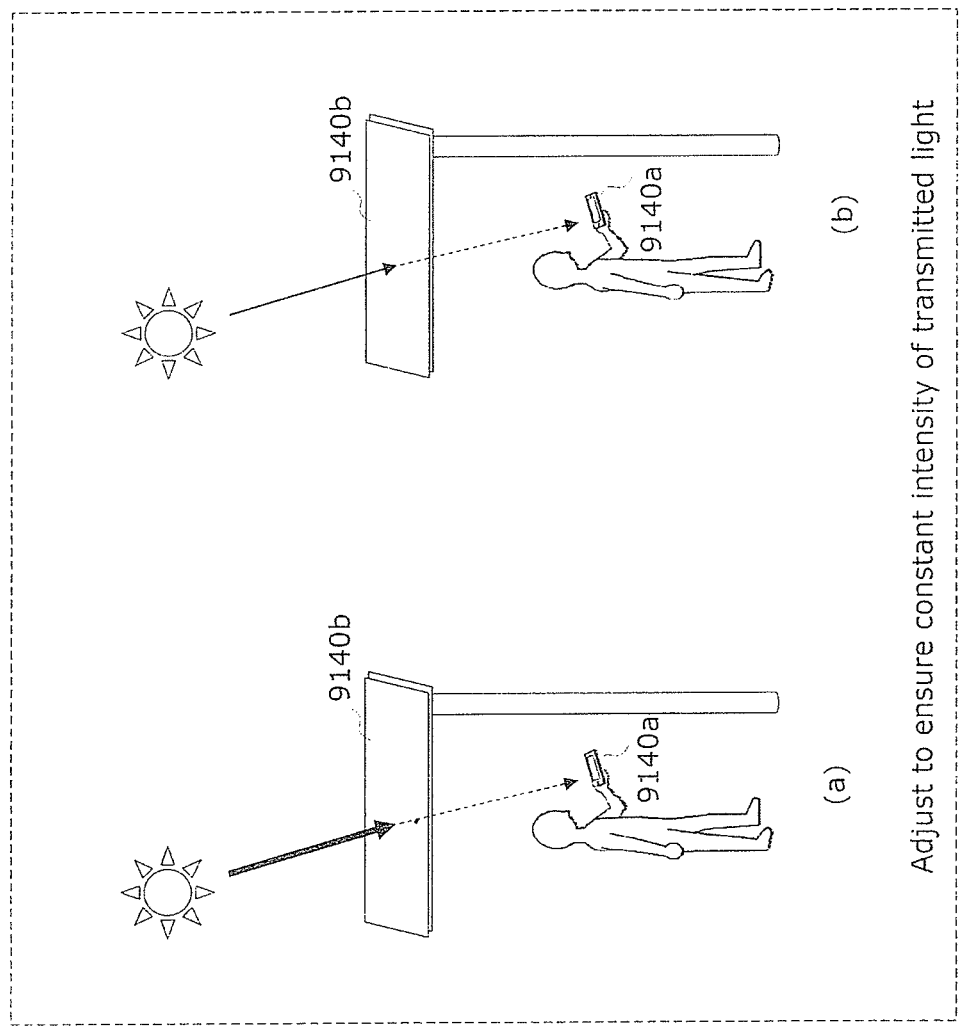

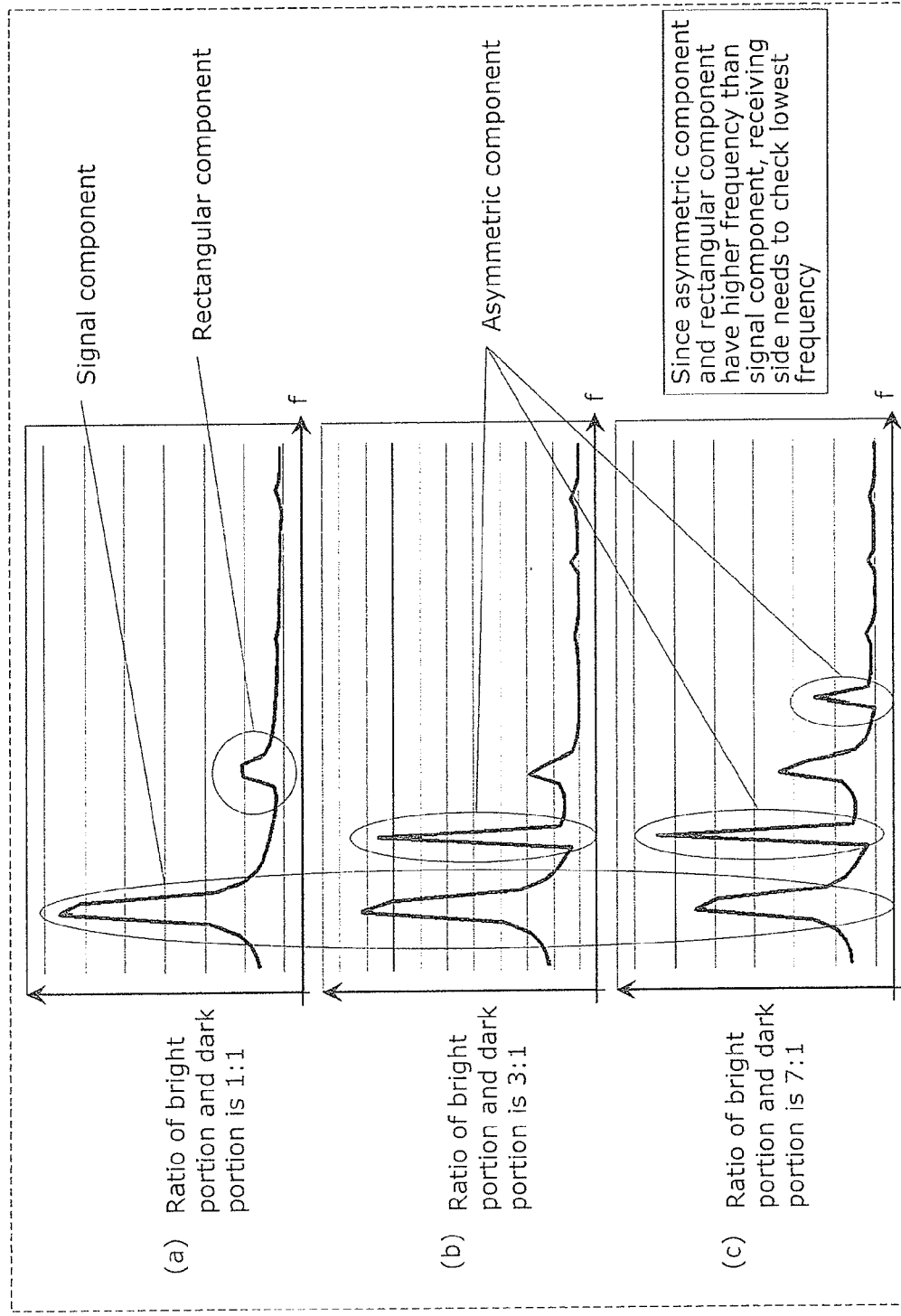

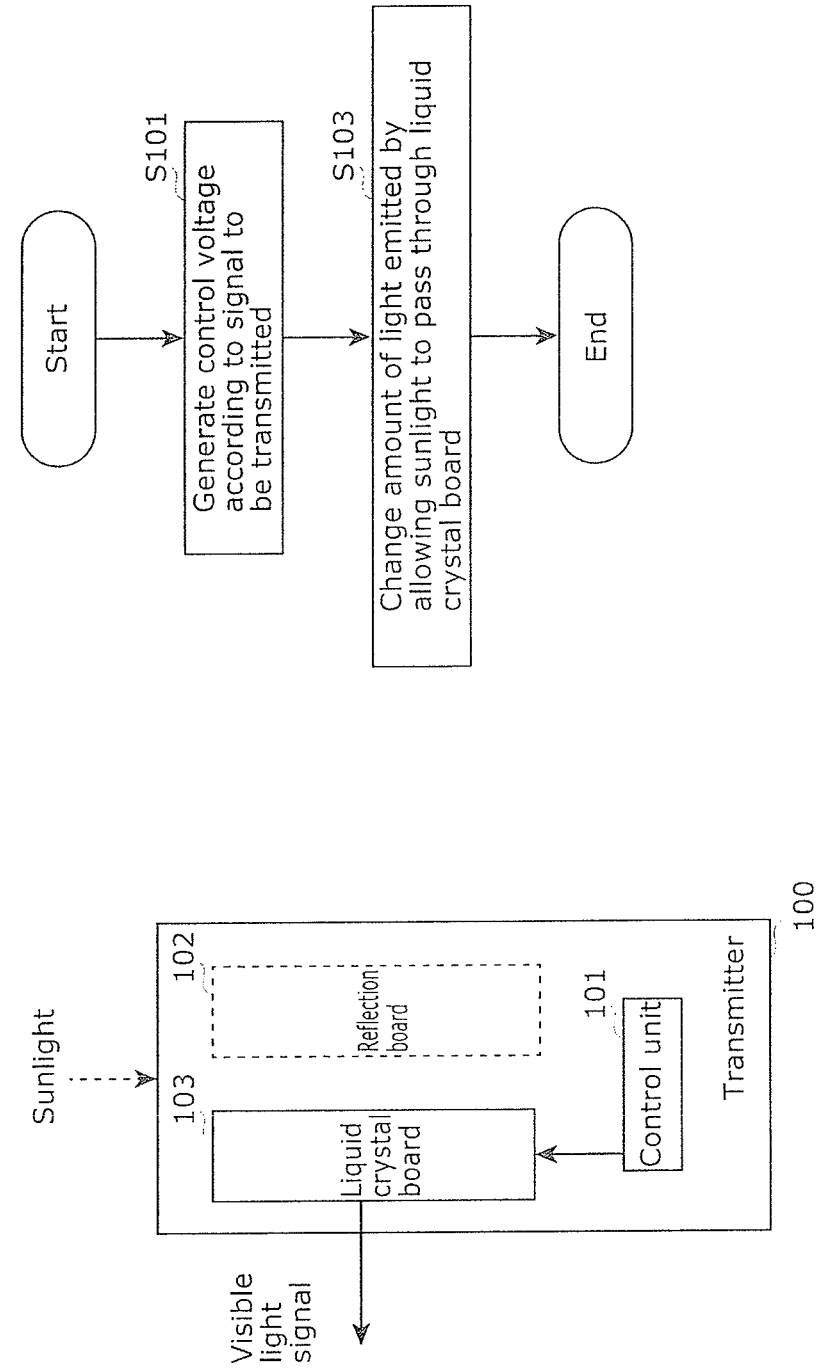

FIG. 55

(a) Signal is assigned at equal wavelength interval

| Signal value | 20 | 21 | ... | 100 | 101 | ... | 500 | 501 |
|---|---|---|---|---|---|---|---|---|
| Wavelength [microsecond] | 200 | 210 | ... | 1000 | 1010 | ... | 5000 | 5010 |
| Frequency [Hz] | 5000 | 4761.9 | ... | 1000 | 990.1 | ... | 200 | 199.6 |

Identifiable — Identifiable — Identifiable (b) Signal is assigned at equal frequency interval

| Signal value | 20 | 21 | ... | 100 | 101 | ... | 500 | 501 |
|---|---|---|---|---|---|---|---|---|
| Frequency [Hz] | 200 | 210 | ... | 1000 | 1010 | ... | 5000 | 5010 |
| Wavelength [microsecond] | 5000 | 4761.9 | ... | 1000 | 990.1 | ... | 200 | 199.6 |

Identifiable but redundant (Identifiable in more fine manner) — Identifiable — Difficult to identify

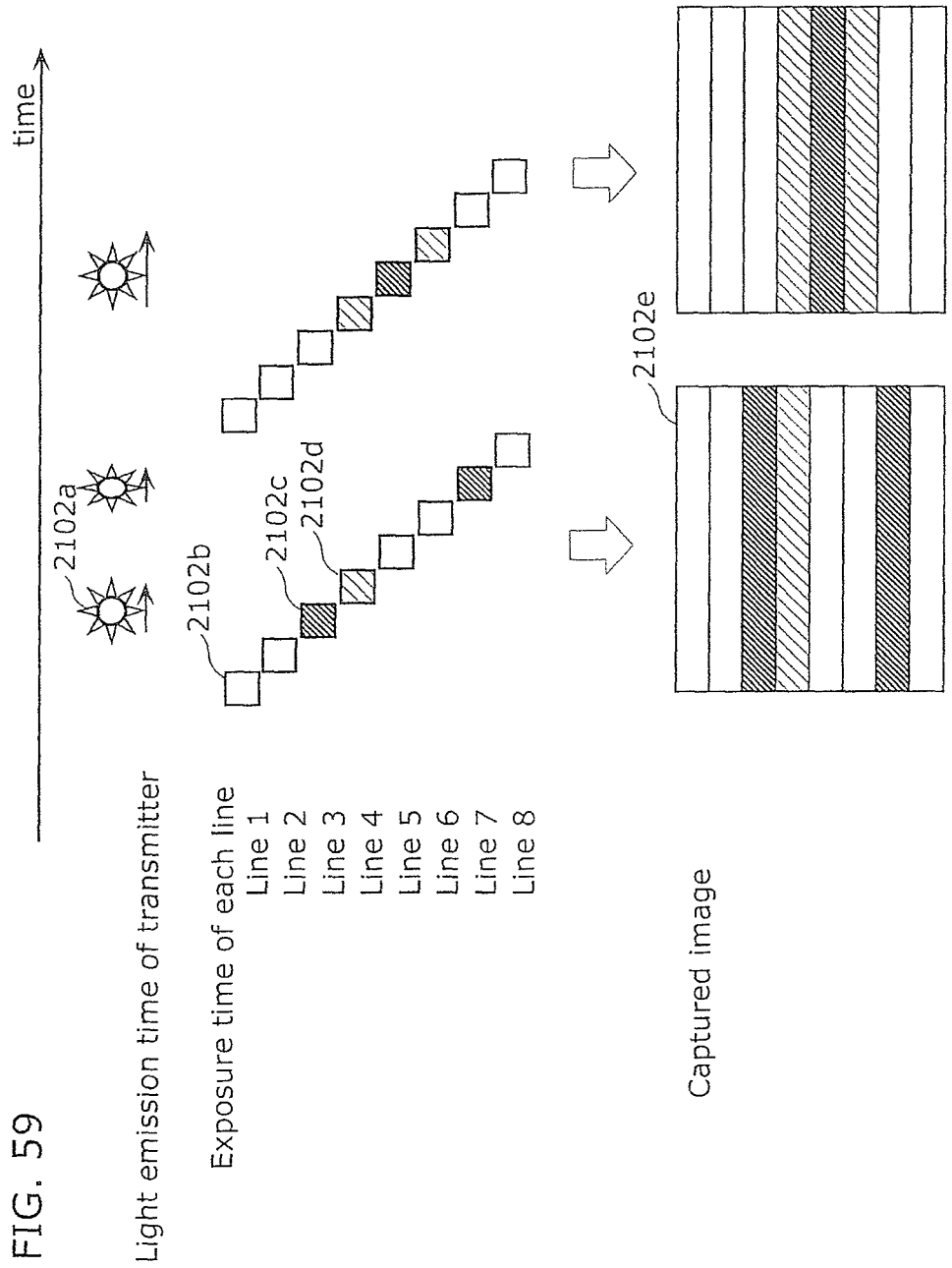

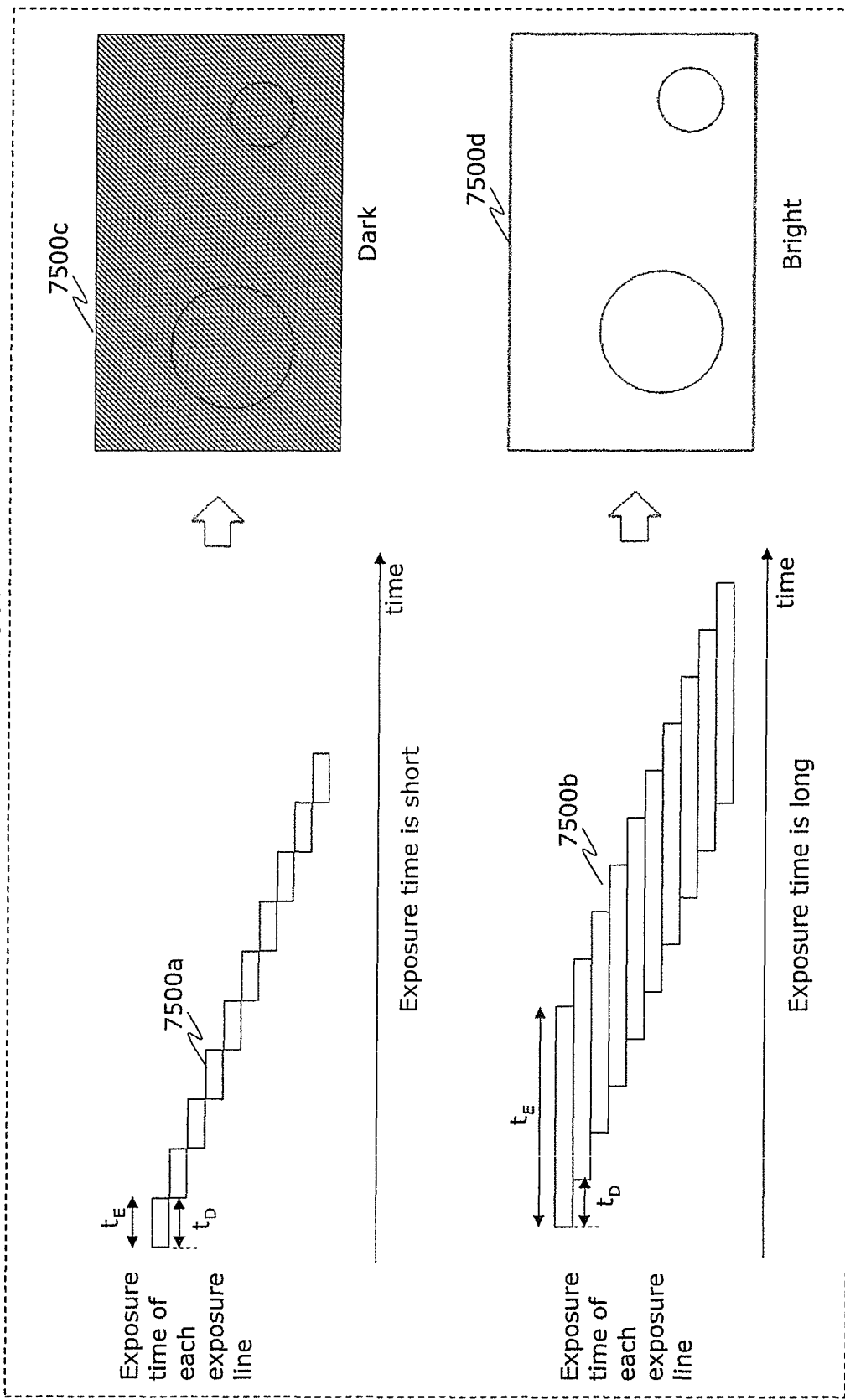

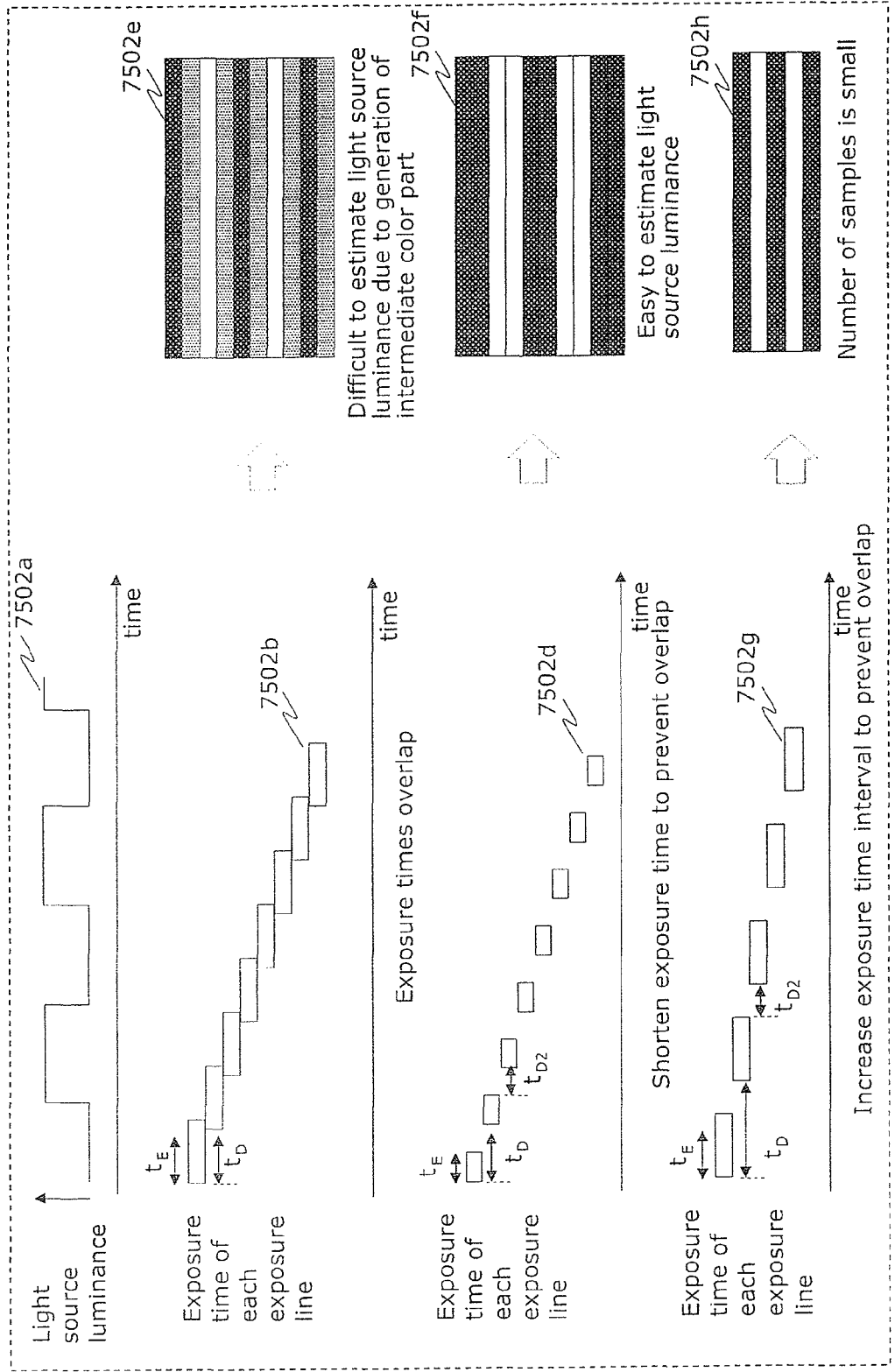

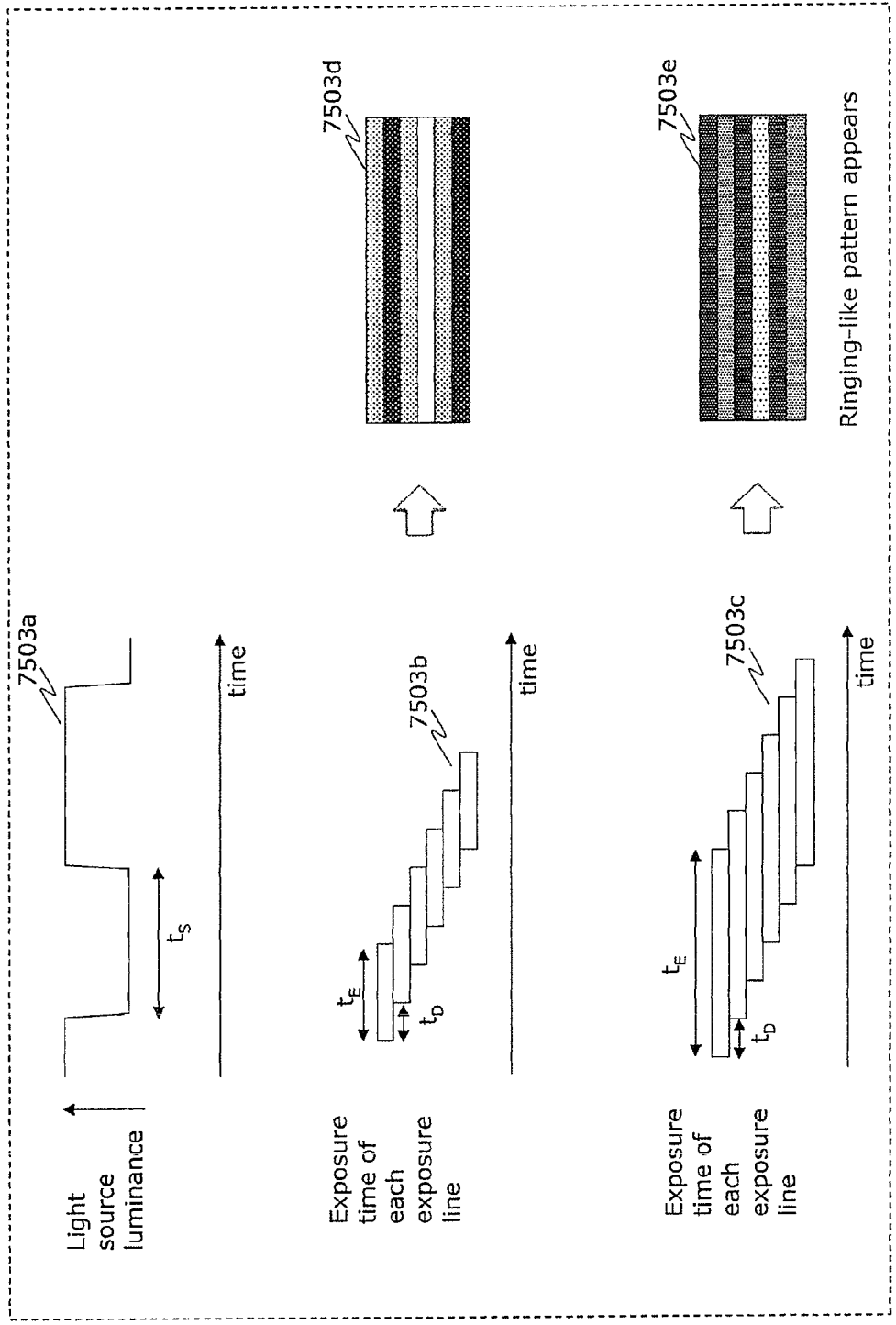

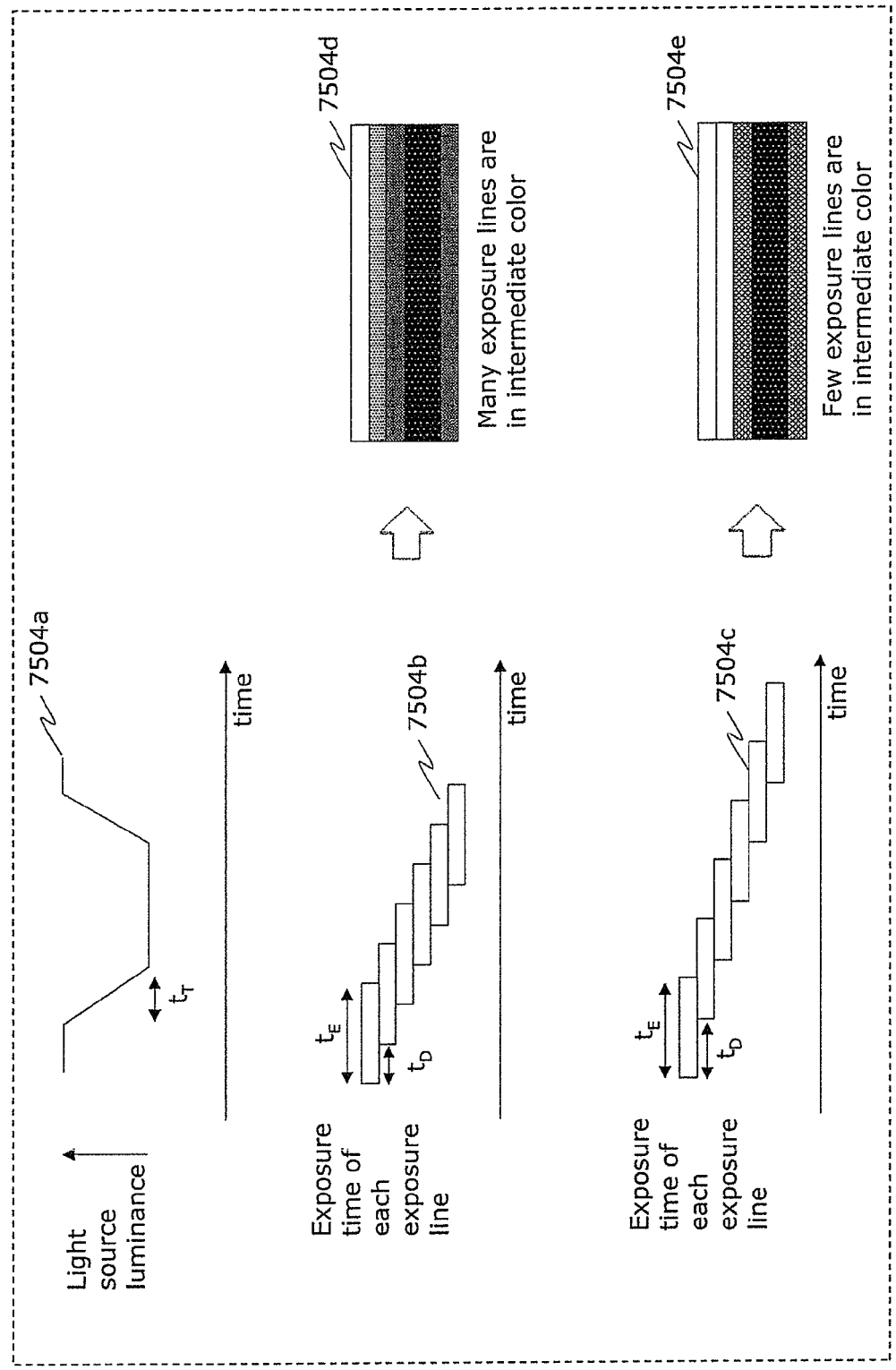

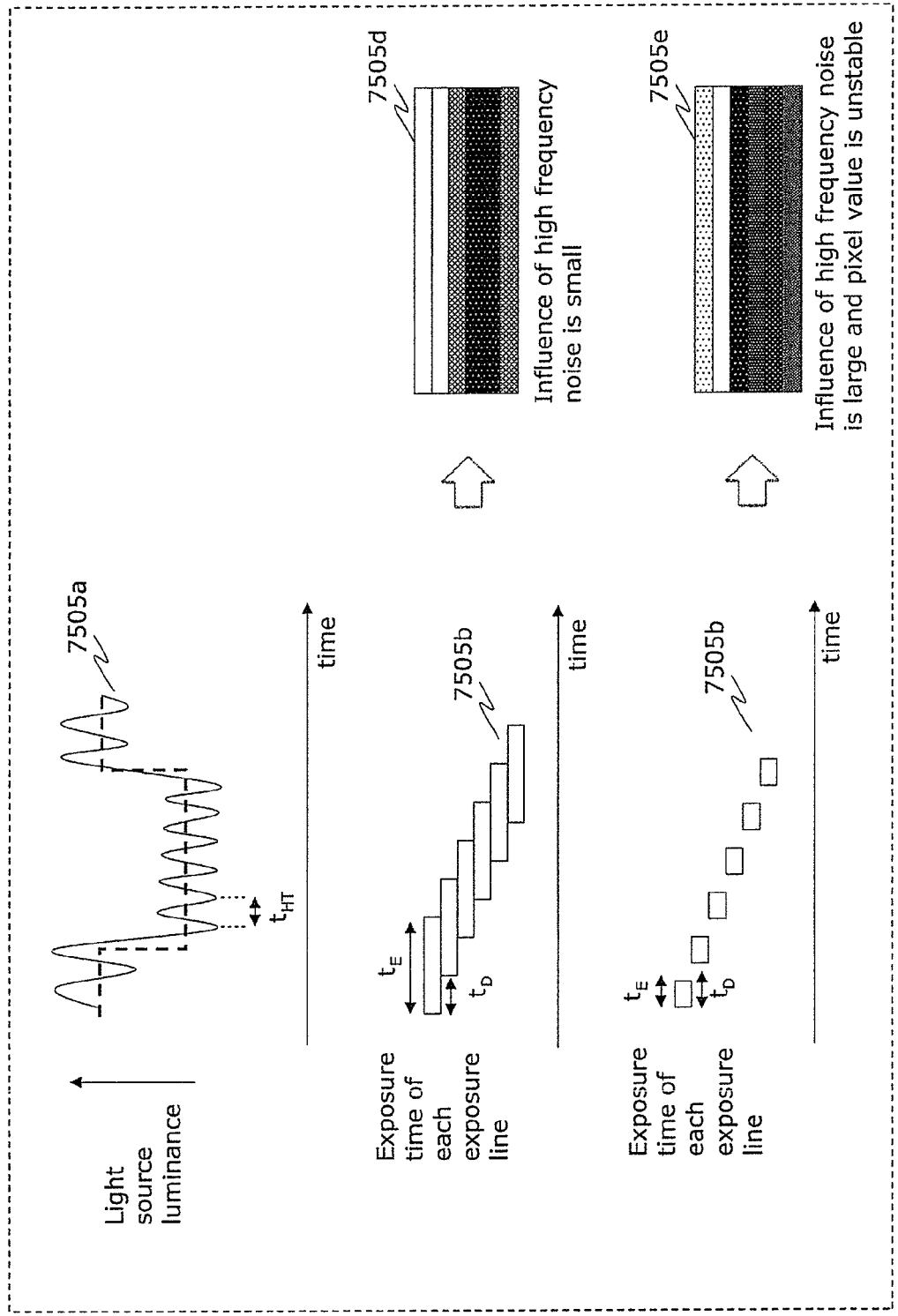

TRANSMITTER AND TRANSMITTING METHOD

CROSS REFERENCE TO RELATED APPLICATION

The present application claims the benefit of Japanese Patent Application No. 2014-030063 filed on Feb. 19, 2014 and U.S. Provisional Patent Application No. 61/941,610 filed on Feb. 19, 2014. The entire disclosures of the above-identified applications, including the specifications, drawings and claims are incorporated herein by reference in there entirety.

FIELD

The present disclosure relates to a method of communication between a mobile terminal such as a smartphone, a tablet terminal, or a mobile phone, and a home electric appliance such as an air conditioner, a lighting device, or a rice cooker.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by Internet Protocol (IP) connection using Ethernet® or wireless local area network (LAN). However, there are home electric appliances whose computational performance is insufficient to have a communication function, and home electric appliances that do not have a communication function due to a matter of cost.

In order to solve such a problem, Patent Literature (PTL) 1 discloses a technique of efficiently establishing communication between devices among limited optical spatial transmission devices that transmit information to free space using light, by performing communication using plural single color light sources of illumination light.

CITATION LIST

Patent Literature

[Patent Literature 1]
Japanese Unexamined Patent Application Publication No. 2002-290335

SUMMARY

Technical Problem

However, there is a problem that a conventional transmitter using the conventional lights needs to have three color light sources such as an illuminator, and therefore is affected by structural constraints.

One non-limiting and exemplary embodiment provides a transmitter or the like that is difficult to be affected by structural constraints.

Solution to Problem

A transmitter according to an aspect of the present disclosure is a transmitter that transmits a signal to a receiver by changing an amount of light emitted, the transmitter comprising: a liquid crystal board; a first board having translucency; a second board disposed to sandwich the first board with the liquid crystal board; and a control unit configured to, by switching transmittance of the liquid crystal board with respect to outside light between a first transmittance and a second transmittance through application, to the liquid crystal board, of a control voltage corresponding to a signal to be transmitted, change an amount of outside light reflected by the first board and emitted toward the receiver via the liquid crystal board, wherein the control unit is configured to, when switching the transmittance of the liquid crystal board to the second transmittance, maintain the transmittance of the liquid crystal board at the second transmittance until outside light that passed through the liquid crystal board is reflected by the second board and reaches the liquid crystal board via the first board, the second transmittance being lower than the first transmittance.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure can achieve a transmitter that is difficult to be affected by structural constraints.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 is a diagram illustrating another example of a transmitter in Embodiment 1.

FIG. 15 is a block diagram illustrating a configuration of the transmitter in Embodiment 1.

FIG. 16 is a diagram illustrating an example of an application of a transmitter of a transmissive type according to Embodiment 1.

FIG. 18 is a diagram illustrating a spectrum of a luminance change of a liquid crystal board obtained by control of transmittance in the transmitter in Embodiment 1.

FIG. 19A is a block diagram illustrating a configuration of a transmitter according to an aspect of the present disclosure.

FIG. 19B is a flowchart illustrating a transmitting method according to an aspect of the present disclosure.

FIG. 55 is a diagram illustrating a relationship between a signal value, a wavelength, and a frequency in Embodiment 5.

FIG. 59 illustrates an example of an observation method of luminance of a light emitting unit in Embodiment 5.

FIG. 60B illustrates an example of an observation method of luminance of a light emitting unit in Embodiment 5.

FIG. 60D illustrates an example of an observation method of luminance of a light emitting unit in Embodiment 5.

FIG. 60E illustrates an example of an observation method of luminance of a light emitting unit in Embodiment 5.

FIG. 60F illustrates an example of an observation method of luminance of a light emitting unit in Embodiment 5.

FIG. 60G illustrates an example of an observation method of luminance of a light emitting unit in Embodiment 5.

DESCRIPTION OF EMBODIMENTS

A transmitter according to an aspect of the present disclosure is a transmitter that transmits a signal to a receiver by changing an amount of light emitted, the transmitter comprising: a liquid crystal board; a first board having translucency; a second board disposed to sandwich the first board with the liquid crystal board; and a control unit configured to, by switching transmittance of the liquid crystal board with respect to outside light between a first transmittance and a second transmittance through application, to the liquid crystal board, of a control voltage corresponding to a signal to be transmitted, change an amount of outside light reflected by the first board and emitted toward the receiver via the liquid crystal board, wherein the control unit is configured to, when switching the transmittance of the liquid crystal board to the second transmittance, maintain the transmittance of the liquid crystal board at the second transmittance until outside light that passed through the liquid crystal board is reflected by the second board and reaches the liquid crystal board via the first board, the second transmittance being lower than the first transmittance.

Figure 42:
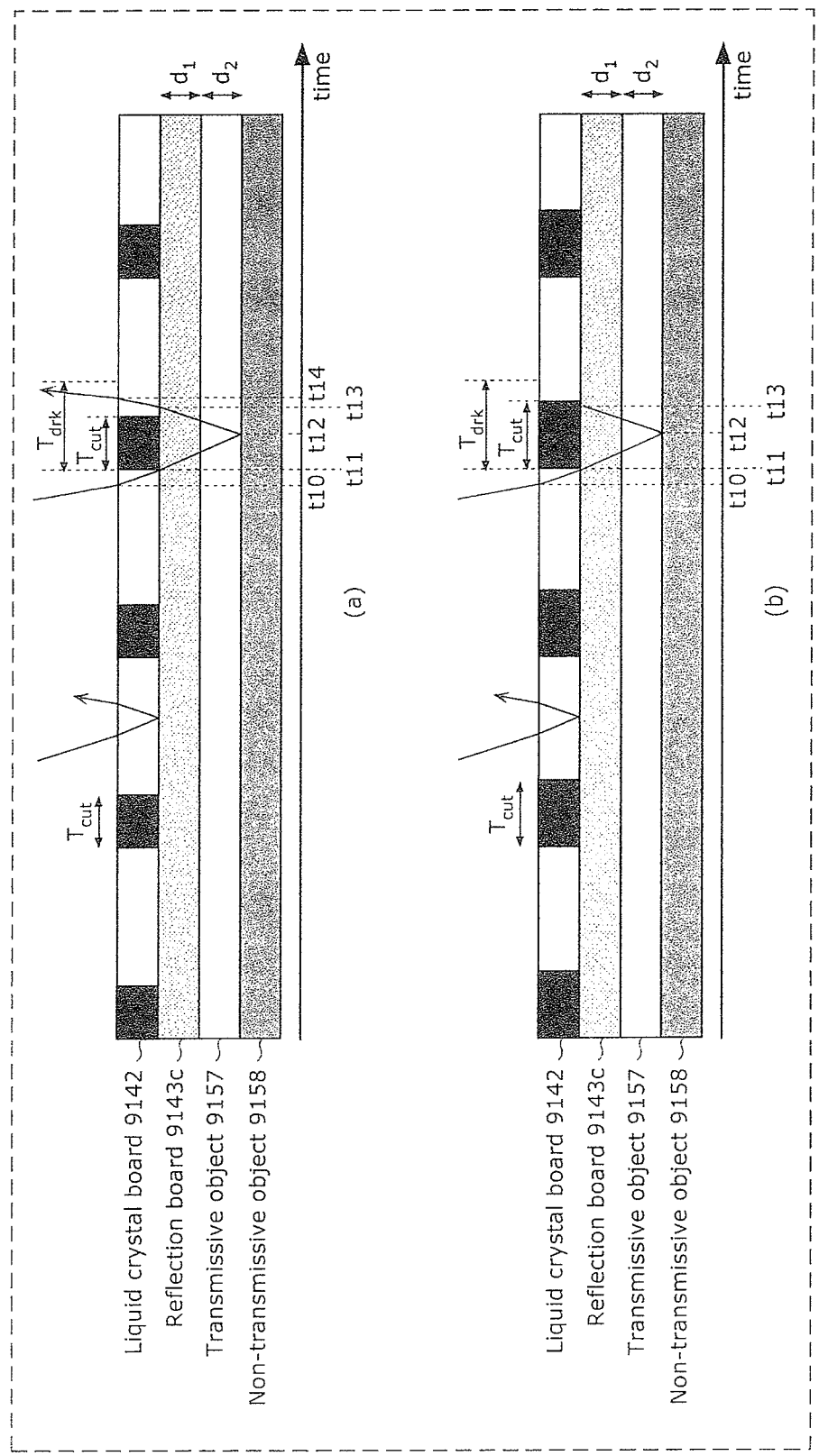
FIG. 42 is a diagram illustrating another example of a method of controlling transmittance by a transmitter in Embodiment 5.

With this, the transmitter can perform visible light communication using outside light by changing the amount of outside light reflected by the first board and emitted toward the receiver, and does not need a light source for visible light communication, thus making it difficult to be affected by structural constraints. Furthermore, as illustrated in FIGS. 42 to 43B, when the transmittance of the liquid crystal board is switched to the second transmittance (low transmittance), the liquid crystal board maintains a low transmittance until the outside light that passed through the liquid crystal board is reflected by the second board and reaches the liquid crystal board. Therefore, even when outside light passes through the first board due to the translucency of the first board, it is possible to suppress the outside light from being reflected by the second board and being emitted toward the receiver. As a result, it is possible to control the transmission of a visible light signal without considering the reflection of outside light by the second board. In other words, it can be difficult to be affected by constraints also in the control of the transmission of a visible light signal.

Moreover, the liquid crystal board may include: a first polarizing board provided on a surface side of a liquid crystal display; a liquid crystal; and a second polarizing board disposed to sandwich the liquid crystal board with the first polarizing board, and the second polarizing board may be installed on the liquid crystal display so that a polarizing direction of the second polarizing board is perpendicular to a polarizing direction of the first polarizing board.

Figure 47:
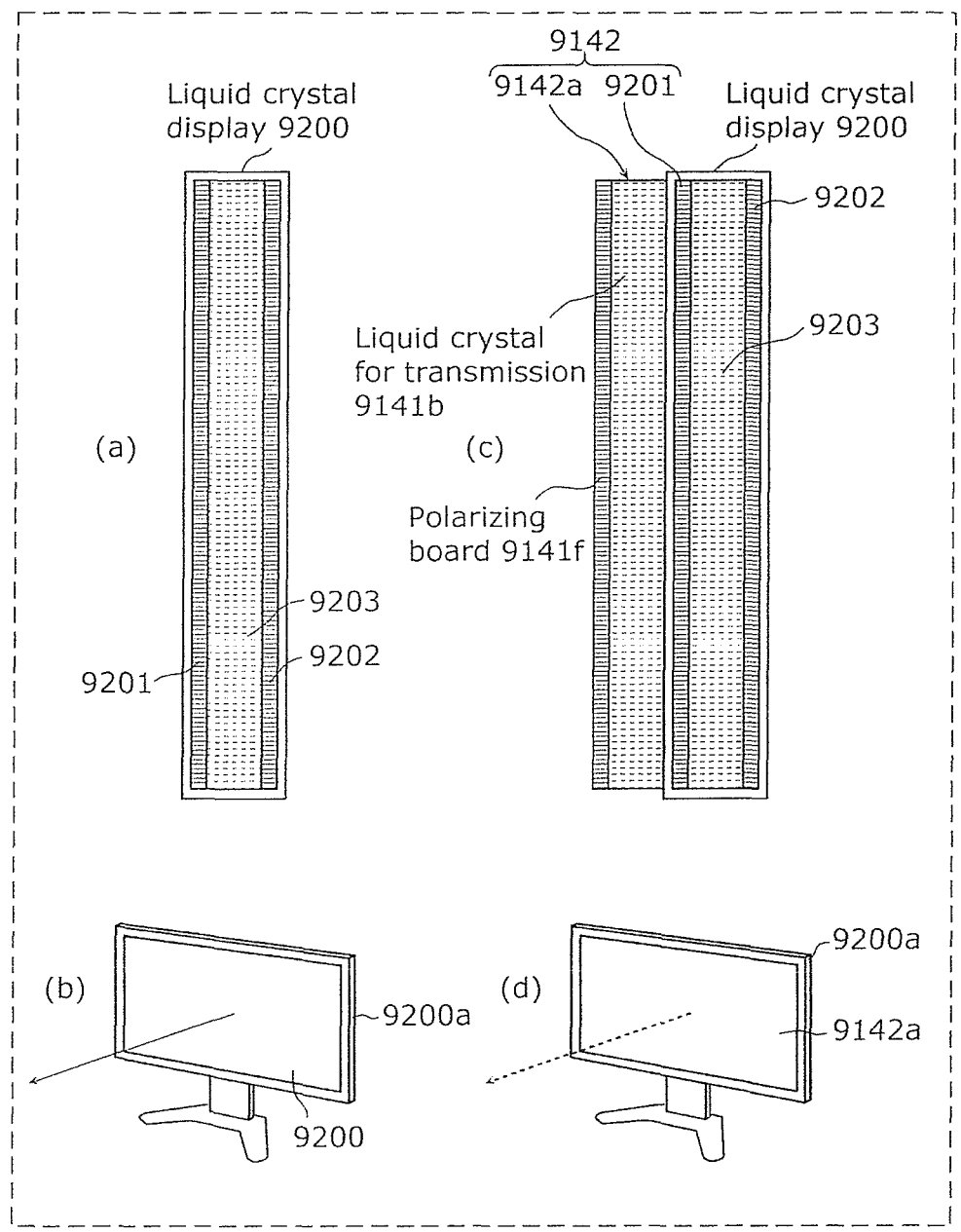
FIG. 47 is a diagram illustrating an example of a configuration of a liquid crystal board in the transmitter in Embodiment 5.

With this, for example, as illustrated in FIG. 47, when the liquid crystal board for visible light communication is installed on the liquid crystal display, a polarizing board included in the liquid crystal display is used as the polarizing board of the liquid crystal board. This means that the number of polarizing board can be reduced compared with the case where the liquid crystal board having two dedicated polarizing boards is installed on the liquid crystal display. As a result, it is possible to simplify the configuration, increase an amount of light emitted from the liquid crystal board, and perform appropriate visible light communication.

Moreover, a signal transmitting unit including the liquid crystal board, the first board, and the second board may be formed only at an end of a surface of a liquid crystal display. For example, a signal transmitting unit including the liquid crystal board, the first board, and the second board is formed only on a rim of a surface of a liquid crystal display.

Figure 44:
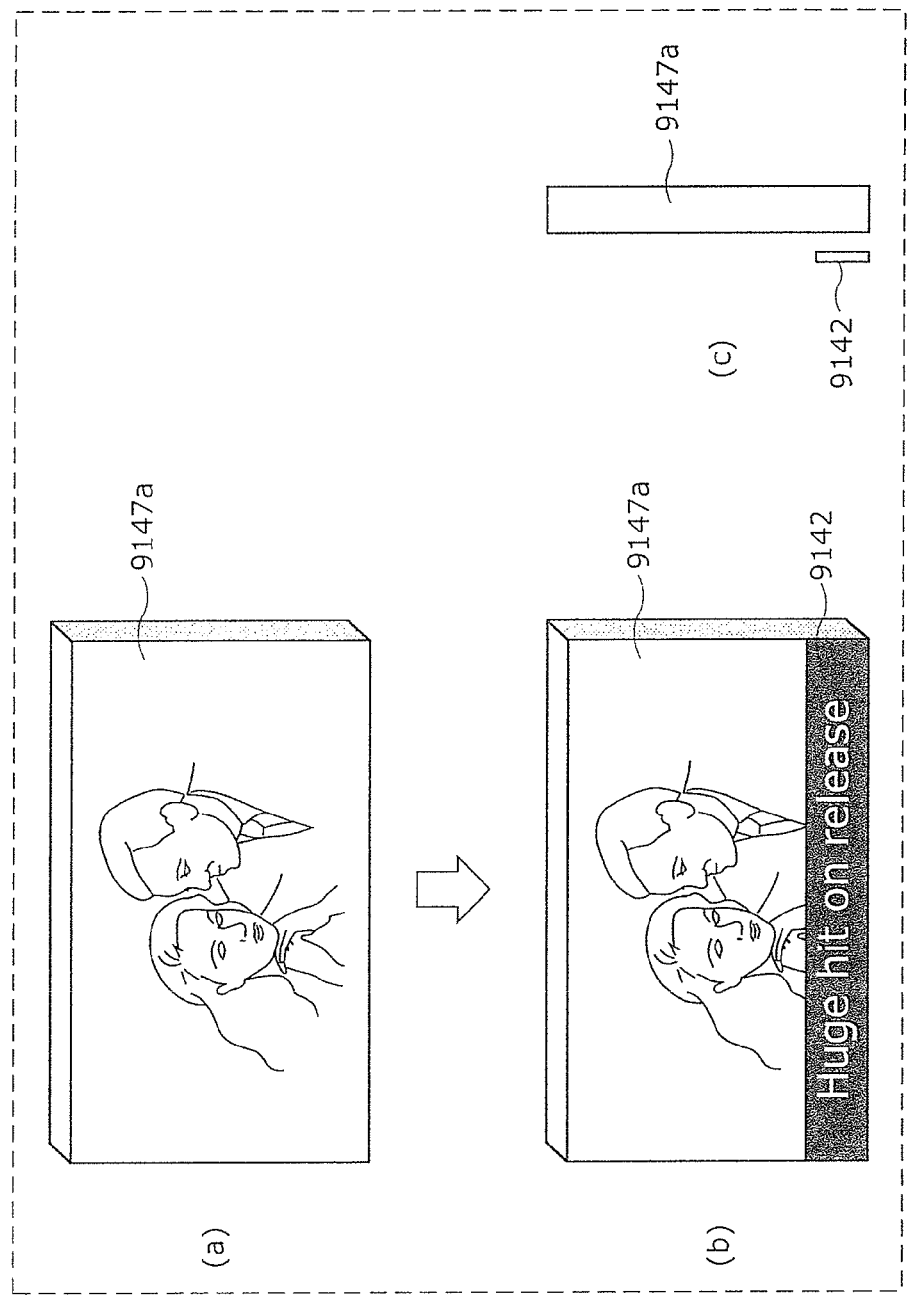
FIG. 44 is a diagram illustrating an example of a disposition of a liquid crystal board in the transmitter in Embodiment 5.
Figure 45:
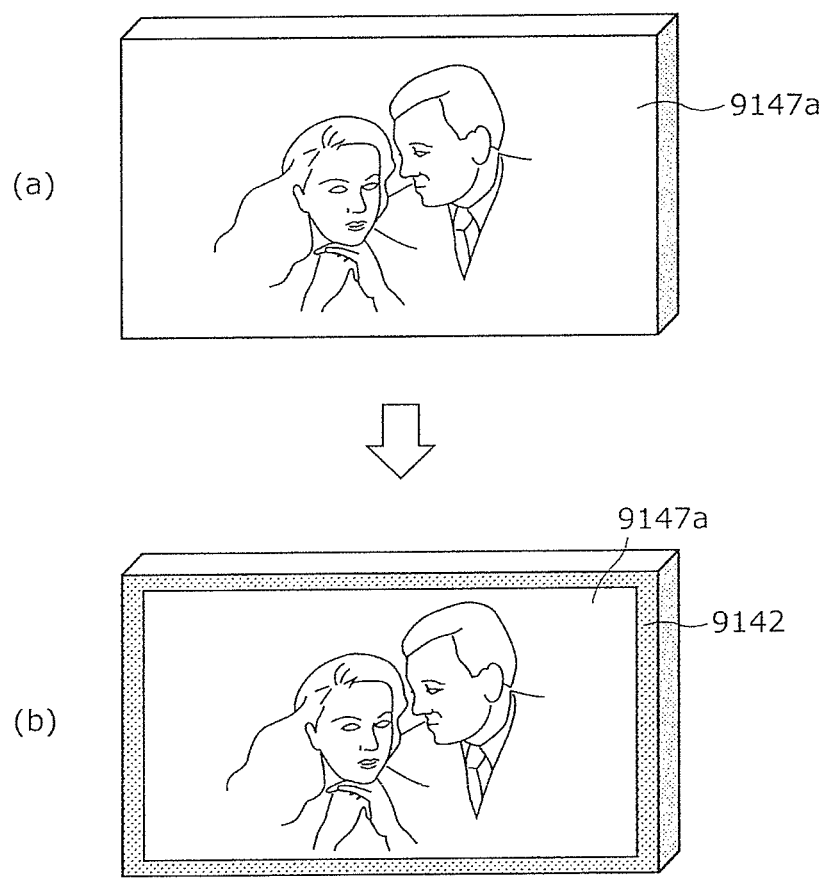
FIG. 45 is a diagram illustrating another example of a disposition of a liquid crystal board in the transmitter in Embodiment 5.

With this, as illustrated in FIG. 44 and FIG. 45, it is possible to make it easy to see the liquid crystal display compared with the case where the whole surface is covered with the signal transmitting unit.

Moreover, a signal transmitting unit including the liquid crystal board, the first board, and the second board may be formed only in a portion along a boundary between a plurality of liquid crystal displays that are disposed adjacent to each other, in each surface of the plurality of liquid crystal displays.

With this, as illustrated in FIG. 44, for example, it is possible to make it easy to see each liquid crystal display.

Moreover, the control unit may be configured to, by changing a control voltage to be applied to the liquid crystal board in a range higher than a predetermined voltage value, switch the transmittance of the liquid crystal board between the first transmittance and the second transmittance. For example, the predetermined voltage value is 0 V.

Figure 51:
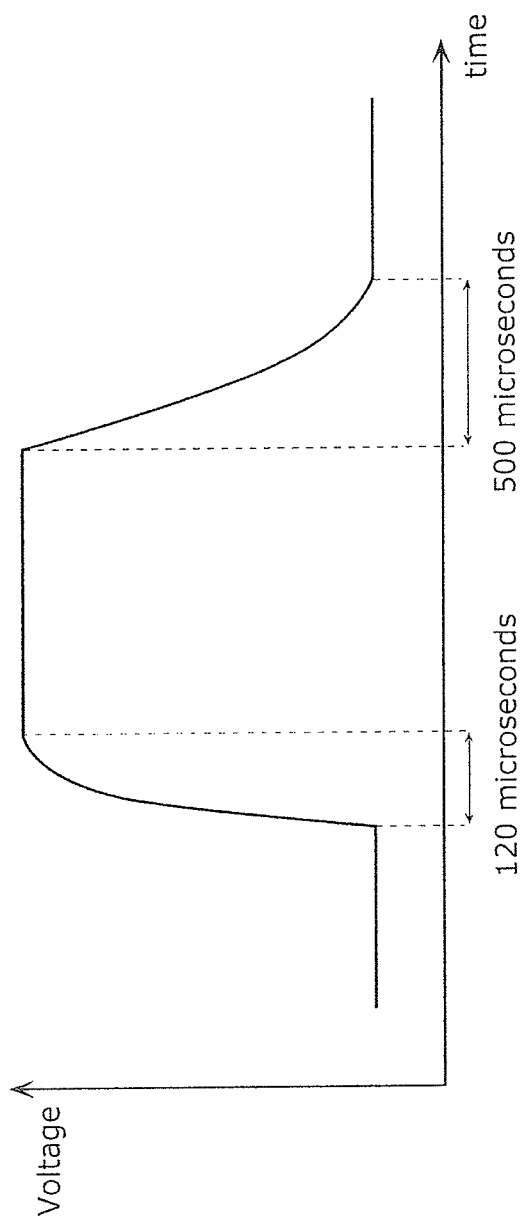
FIG. 51 is a diagram illustrating a waveform of a control voltage in Embodiment 5.
Figure 52:
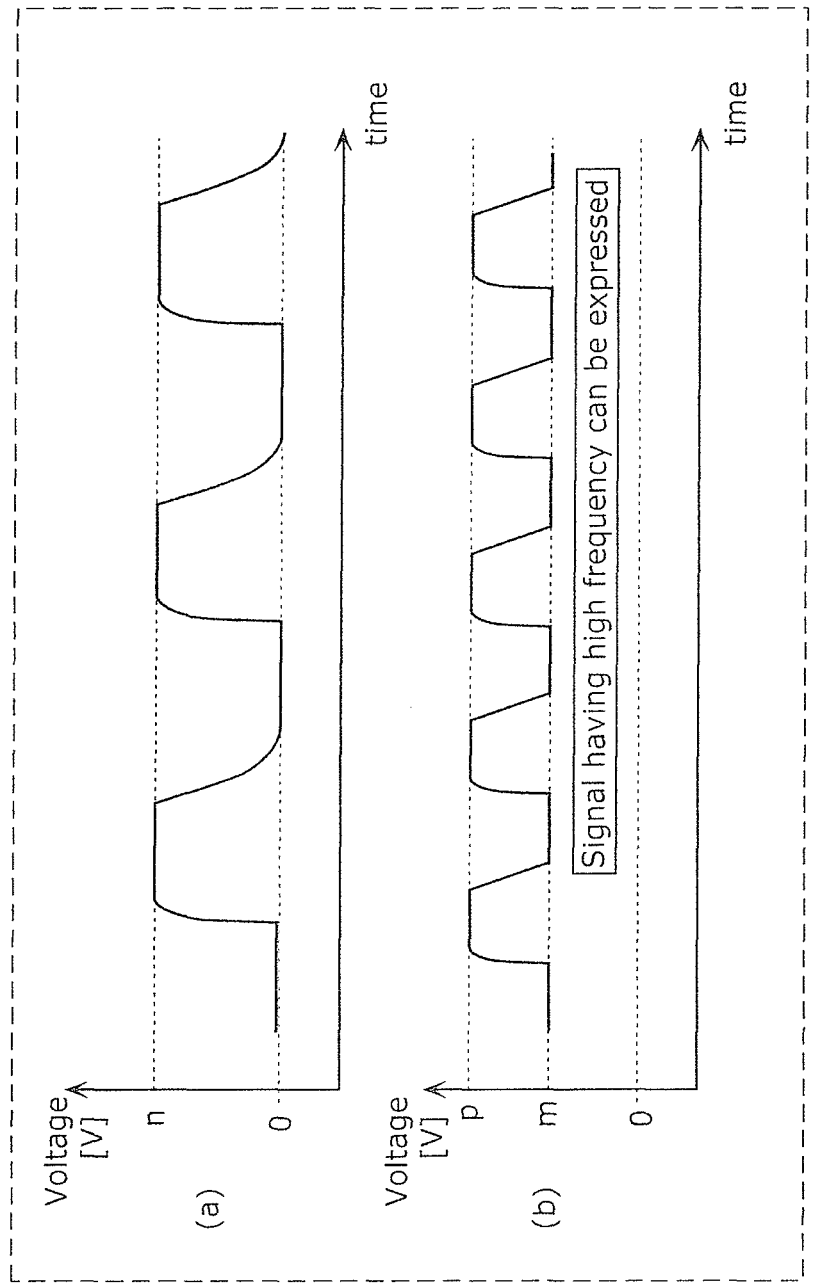
FIG. 52 is a diagram illustrating a waveform of a control voltage in Embodiment 5.

With this, as illustrated in FIG. 51 and FIG. 52, for example, even when each of the rise and fall of the control voltage takes time, it is possible to reduce each time and switch the transmittance of the liquid crystal board at a high frequency. As a result, it is possible to increase a communication speed of the visible light communication.

Moreover, the control unit may be configured to, when transmitting a k-th signal in a case where different frequencies are assigned to respective 0th to n-th signals, apply a control voltage that changes at a frequency assigned to the k-th signal to the liquid crystal board, k being an integer from 0 to n, n being an integer of at least 0, and when, in the assignment of the different frequencies, a value of an i-th signal is represented by (a+b×i) using constants a and b, the different frequencies are assigned so that a difference between a frequency f (i) assigned to the i-th signal and a frequency f (i−1) assigned to an (i−1)th signal is larger or smaller as i is larger, i being an integer from 0 to 1.

With this, as illustrated in (a) in FIG. 55, when a frequency is assigned to each signal so that where a=20, and b=1, the difference between a frequency f (i) and a frequency f (i−1) is smaller as i is larger, the receiver can easily identify these frequencies and receive each signal appropriately. It should be noted that, for example, as illustrated in (a) in FIG. 55, when wavelength is arithmetically assigned to each signal, a frequency can be assigned to each signal so that the difference between the frequency f (i) and the frequency f (i−1) is smaller as i is larger.

Moreover, in at least one of two polarizing boards included in the liquid crystal board, an area in which polarization is not performed on outside light may be uniformly formed with respect to the at least one of two polarizing boards.

With this, it is possible to increase the amount of light emitted from the liquid crystal board, and it is possible to make it easy to see letters and designs depicted on the first board.

A transmitter according to an aspect of the present disclosure is a transmitter that transmits a signal to a receiver by changing an amount of light emitted, the transmitter comprising: a control unit configured to generate a control voltage corresponding to a signal to be transmitted; a reflector that reflects sunlight; and a liquid crystal board that receives reflected light that is sunlight reflected by the reflector and changes, according to the control voltage, the amount of light emitted toward the receiver by allowing the reflected light to pass therethrough.

With this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, the reflector may be disposed opposite to, with a gap therebetween, a surface of the liquid crystal board that receives the reflected light, may receive at least part of the sunlight from the gap and not via the liquid crystal board, and may reflect the part of the sunlight toward the liquid crystal board.

For example, when the reflector is in contact with the liquid crystal board, the sunlight passes through the liquid crystal board and is reflected by the reflector, and then the reflected sunlight passes through the liquid crystal board again as reflected light. Therefore, since the sunlight passes through the liquid crystal board twice, the amount of light emitted from the liquid crystal board toward the receiver is small. Therefore, as described above, when the reflector opposite to the liquid crystal board with a gap receives at least part of the sunlight from the gap and not via the liquid crystal board and then reflects the part toward the liquid crystal board, at least part of the sunlight is emitted toward the receiver by pasting through only once the liquid crystal board. Therefore, the amount of light emitted from the liquid crystal board toward the receiver can be increased, a change range of amount of light, that is, a range of luminance change can be large, and therefore it is possible to transmit a signal easy for the receiver to receive.

Moreover, the transmitter may further comprise a light source for illuminating a reflected light receiving surface that is a surface of the liquid crystal board that receives the reflected light, wherein when the reflected light receiving surface is illuminated by light from the light source without receiving the reflected light, the liquid crystal board changes, according to the control voltage, the amount of light emitted toward the receiver by allowing the light from the light source instead of the reflected light to pass therethrough.

With this, when the weather is fine, it is possible to perform visible light communication using sunlight. When it is at night or the weather is cloudy, it is possible to perform visible light communication using a light source such as a backlight. In other words, an influence from the state of sunlight can be reduced.

Moreover, the reflector may be translucent and may be disposed opposite to the reflected light receiving surface of the liquid crystal board, the transmitter may further comprise a plate-like light guide disposed substantially parallel to the liquid crystal board, with the reflector interposed therebetween, and the light guide may guide incident sunlight in the light guide so that the sunlight incident to an end portion of the light guide is spread via the reflector to the reflected light receiving surface of the liquid crystal board.

With this, since the reflected light receiving surface of the liquid crystal board not only receives reflected light but also sunlight to be spread from the light guide, the amount of light emitted from the liquid crystal board toward the receiver can be increased. Therefore, a change range of amount of light, that is, a range of luminance change can be large, and therefore it is possible to transmit a signal easy for the receiver to receive.

Moreover, the transmitter may further comprise a light collecting lens that collects sunlight at the end portion of the light guide.

With this, the amount of sunlight incident to the light guide can be increased, and therefore the amount of light emitted from the liquid crystal board toward the receiver can be further increased.

Moreover, the light guide may further guide the light from the light source in the light guide so that the light from the light source incident to the end portion of the light guide is spread via the reflector to the reflected light receiving surface of the liquid crystal board.

With this, when light from such light source as the backlight is incident to an end portion of the light guide, the light from the light source is spread to the reflected light receiving surface, the backlight can be disposed toward the end portion of the light guide. In other words, a degree of freedom of the disposition of the backlight can be increased.

Moreover, the light collecting lens and the light source may be disposed at respective ends of the light guide, the light collecting lens and the light source interposing the light guide therebetween, and in the light guide, a plurality of reflective dots for scattering light may be formed along a direction connecting the light collecting lens and the light source, and a width in the direction of each of the reflective dots may be smaller as a position of the reflective dot is closer to one of the ends, and may be larger as the position of the reflective dot is closer to a center of the light guide.

With this, the amount of light each for sunlight and a light source in each position in the light guide that is incident from each end portion of the light guide and is guided to the center of the light guide is larger as a position is closer to the end of the light guide, and is smaller as a position is closer to the center of the light guide. Therefore, as described above, in an aspect of the present disclosure, the width of a reflective dot is smaller as the position of a reflective dot is closer to the end, and the width of a reflective dot is larger as the position of a reflective dot is closer to the center. With this, a ratio of light emitted from the light guide to the liquid crystal board via the reflector at each position in the light guide is smaller as the position is closer to the end of the light guide, and is larger as the position is closer to the center of the light guide. As a result, at each position in the light guide, the amount of light emitted from the light guide to the liquid crystal board via the reflector can be substantially even. As a result, a signal can be transmitted according to an appropriate luminance change.

Moreover, the reflector may be translucent, and the liquid crystal board may receive transmitted light that is sunlight passing through the reflector, and may change, according to the control voltage, the amount of light emitted toward the receiver by allowing the transmitted light to pass therethrough.

With this, since not only reflected light but also transmitted light are emitted from the receiver side, the amount of light emitted from the liquid crystal board toward the receiver can be increased. Therefore, the amount of light emitted from the liquid crystal board toward the receiver can be increased, a change range of amount of light, that is, a range of luminance change can be large, and therefore it is possible to transmit a signal easy for the receiver to receive.

Moreover, a surface of the reflector that reflects the sunlight may be formed as a specular surface.

With this, it is possible to increase the amount of reflected light, that is, to make the reflected light brighter. Therefore, a change range of the amount of light emitted from the liquid crystal board toward the receiver, that is, a range of luminance change can be large, and therefore it is possible to transmit a signal easy for the receiver to receive.

A transmitter according to an aspect of the present disclosure is a transmitter that transmits a signal to a receiver by changing an amount of light emitted, and the transmitter may comprise: a control unit configured to generate a control voltage corresponding to a signal to be transmitted; and a liquid crystal board that receives sunlight and changes, according to the control voltage, the amount of light emitted toward the receiver by allowing the sunlight to pass therethrough.

Also with this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, a receiving method according to an aspect of the present disclosure is a receiving method of receiving a signal from a transmitter, the receiving method comprising: emitting flash of light to the transmitter according to claim 1; and receiving, by imaging the transmitter illuminated by the flash of light, a signal indicated by a change in an amount of light emitted from the transmitter, wherein a reflector of the transmitter reflects the flash of light instead of the sunlight, and a liquid crystal board of the transmitter changes, according to the control voltage to be applied to the liquid crystal board, an amount of light emitted by allowing reflected light that is the reflected flash of light to pass through the liquid crystal board.

With this, by using flash of light instead of sunlight when there is no sunlight or the sunlight is weak, a signal from the transmitter can be appropriately received.

An information communication method according to an aspect of the present disclosure is an information communication method of obtaining information from a subject, the information communication method comprising: receiving at least one first data item to be transmitted by radio wave; receiving, by imaging the subject, second data to be transmitted by visible light from the subject; and identifying third data corresponding to the received second data from the received at least one first data item, wherein the receiving of a visible light includes: setting an exposure time of an image sensor so that in an image obtained by imaging the subject with the image sensor, a bright line corresponding to an exposure line included in the image sensor is generated according to a luminance change of the subject; obtaining an image including the bright line by imaging the subject having luminance change at the set exposure time; and obtaining the second data by demodulating data identified by a pattern of the bright line which is included in the obtained image.

Figure 35:
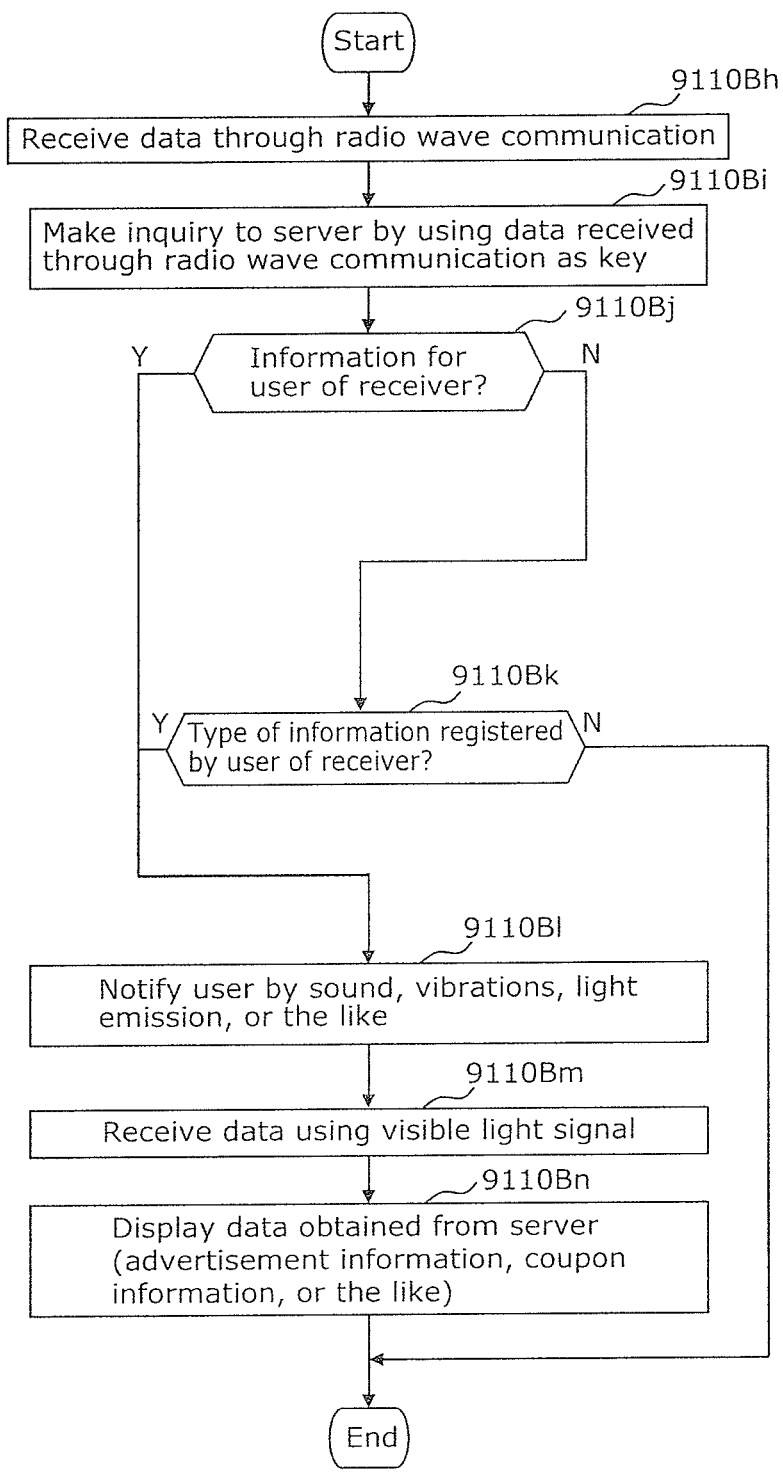
FIG. 35 is a flowchart illustrating another example of an operation of the receiver in Embodiment 4.

With this, as illustrated in FIGS. 35 to 35 to be described later, since the third data corresponding to the second data to be transmitted by visible light can be identified from at least one first data item to be transmitted by radio wave, from a large amount of data to be transmitted by radio wave to a relatively wide area, the third data corresponding to a relatively narrow area that is communicable with visible light communication can be received at a fast speed even when the data amount of the second data is small. In other words, the data amount of visible light communication for receiving the third data necessary in the relatively narrow area can be small. With this, communication between various devices is possible.

These general and specific aspects may be implemented using a system, a method, an integrated circuit, a computer program, or a computer-readable recording medium such as a CD-ROM, or any combination of systems, methods, integrated circuits, computer programs, or recording media.

The following will describe embodiments with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims representing the broadest concepts are described as arbitrary structural elements.

Embodiment 1

(Visible Light Signal Transmission by Transmittance Control of Liquid Crystal: Transmissive Type)

Figure 1:
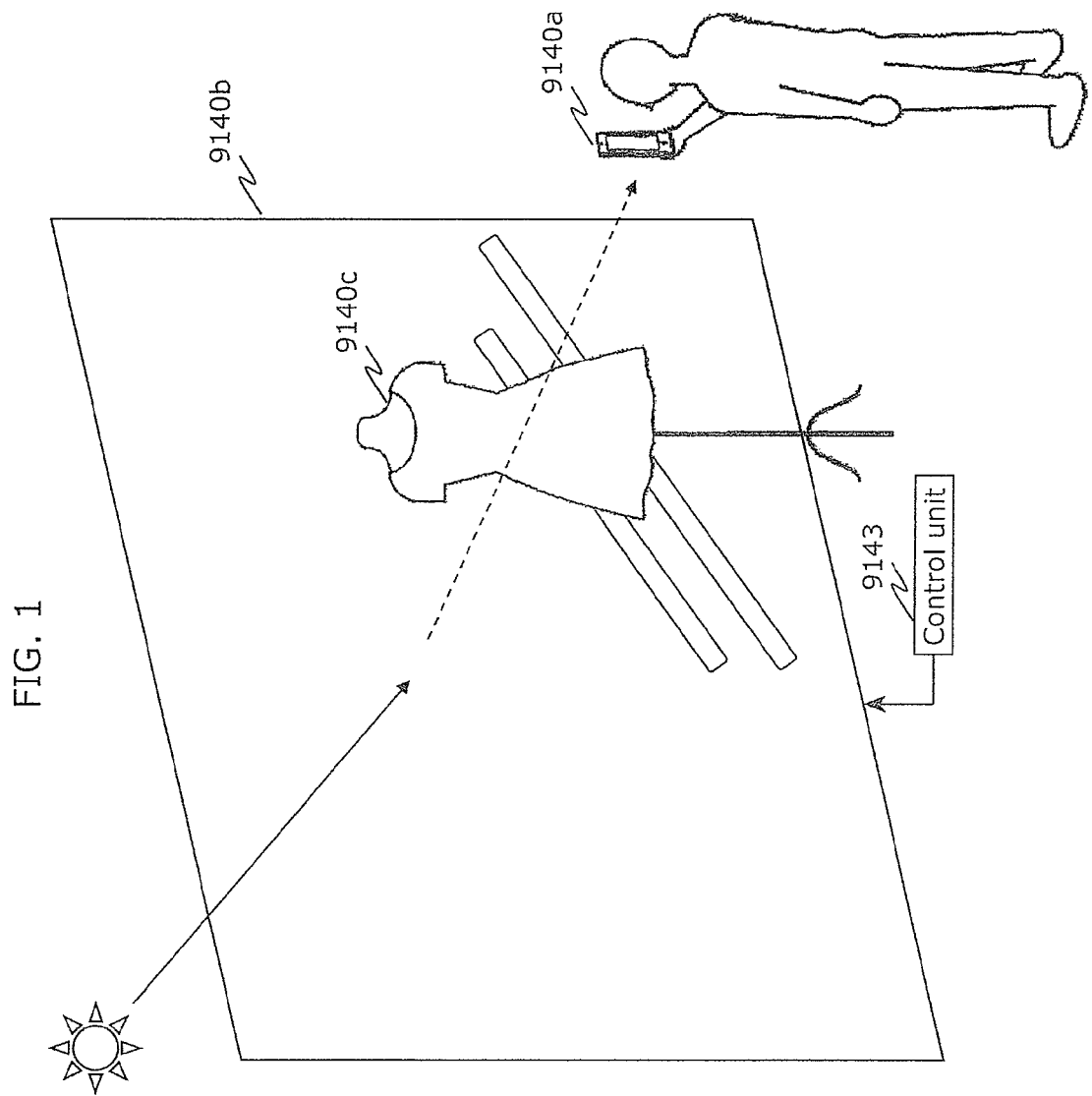
FIG. 1 is a diagram illustrating an example of a transmitter of a transmissive type in Embodiment 1.
Figure 2:
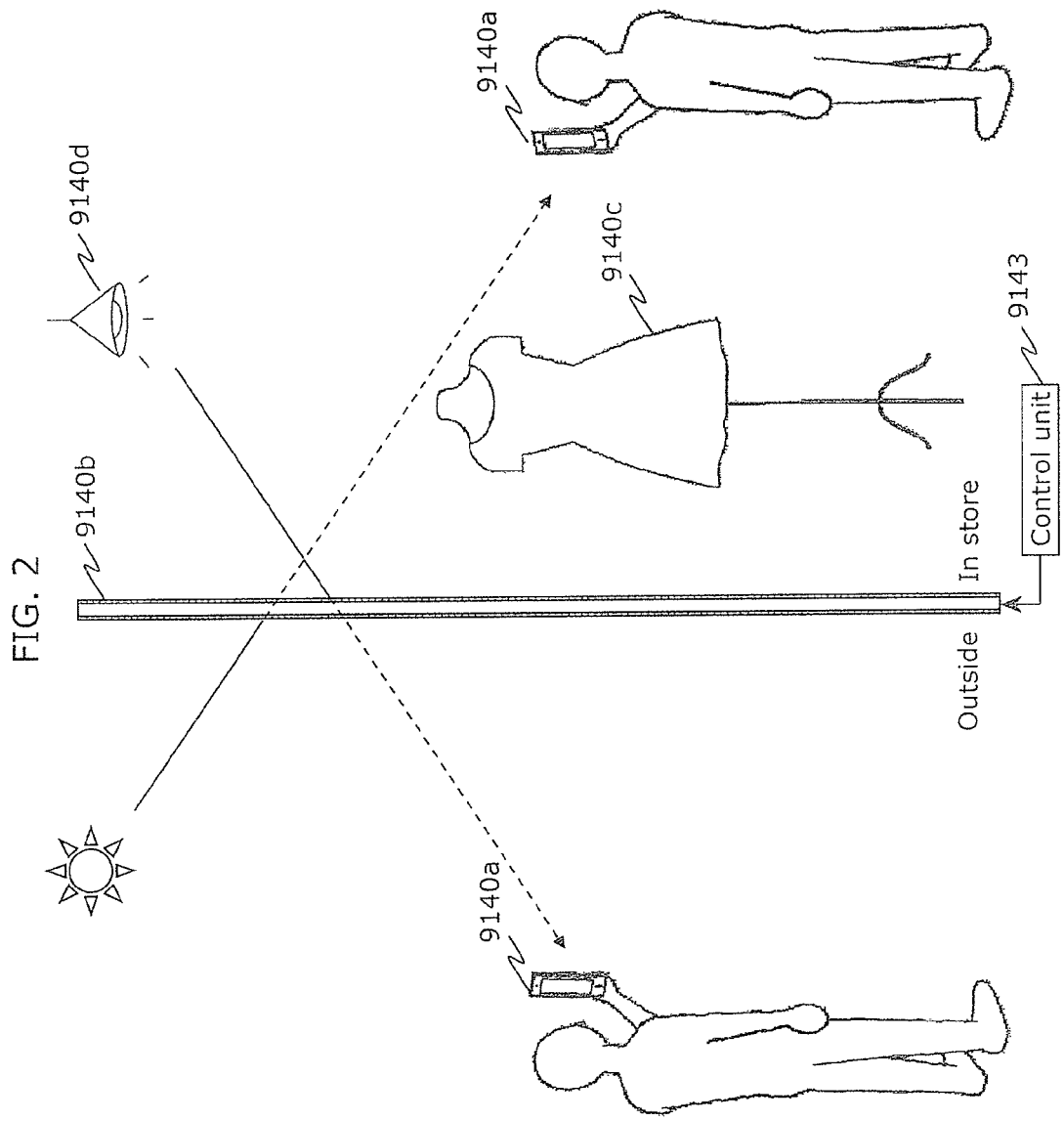
FIG. 2 is a diagram illustrating an example of a transmitter of a transmissive type in Embodiment 1.

FIGS. 1 and 2 are each a diagram illustrating an example of a transmitter of a transmissive type in Embodiment 1.

The transmitter according to the present embodiment includes a liquid crystal board. By applying a voltage (control voltage) to this liquid crystal board, the ratio of light passing through this liquid crystal board (transmittance) can be controlled. By using characteristics of this liquid crystal board and controlling the transmittance, the transmitter can transit a visible light signal without a light source. Moreover, when even when ambient light is bright and therefore blinking of illumination light is difficult to be observed, it is possible to transmit a visible light signal that is easy to receive. It should be noted that the same effect can be obtained from a method of controlling the transmittance of this liquid crystal board, when using an electromagnetic wave other than visible light such as infrared light or ultraviolet light.

For example, as illustrated in FIG. 1, the transmitter includes a liquid crystal board 9140*b* configured as the glass of a show window, and a control unit 9143 that generates a control voltage to be applied to the liquid crystal board 9140*b* according to a signal to be transmitted. This transmitter transmits a signal by controlling the transmittance of outside light such as sunlight in the liquid crystal board 9140*b*. The transmitter transmits information about a product 9140*c* located nearby and information for accessing to the information, by controlling the transmittance of the liquid crystal board 9140*b*. An imaging unit of a receiver 9140*a* simultaneously images, by being directed to the product 9140*c*, the product 9140*c* and the liquid crystal board 9140*b* that is the background of the product 9140*c*. As a result, the receiver 9140*a* can receive a signal that includes the information about the product 9140*c* and comes from the liquid crystal board 9140*b* of the transmitter. It should be noted that the imaging unit of the receiver 9140*a* is a camera having an image sensor including a plurality of exposure lines. This receiver 9140*a* sets an exposure time of the image sensor so that in an image obtained by imaging the subject by the image sensor, a bright line corresponding to each exposure line included in the image sensor is generated according to a luminance change of the subject. Then, the image sensor of the receiver 9140*a* obtains a bright line image that is an image including a plurality of bright lines, by imaging the subject having luminance change at a set exposure time. Next, the receiver 9140a obtains information about the aforementioned product 9140c by demodulating data identified by a plurality of bright line patterns included in the obtained bright line image.

Moreover, as illustrated in FIG. 2, when the control unit 9143 applies a control voltage to the liquid crystal board 9140b, the transmitter transmits a signal by controlling the transmittance of the sunlight and the transmittance of light of an in-store lighting device 9140d. When the receiver 9140a is outside the store, the receiver 9140a simultaneously images, by imaging the product 9140c across the show window, the liquid crystal board 9140b in front of the product 9140c. As a result, the receiver 9140a can receive a signal that includes the information about the product 9140c and comes from the liquid crystal board 9140b of the transmitter.

The transmitter in the present embodiment is a transmitter that transmits a signal to the receiver 9140a by changing the amount of light emitted, and includes the control unit 9143 that generates a control voltage according to a signal to be transmitted, and the liquid crystal board 9140b that receives sunlight and changes, according to the control voltage, the amount of light emitted toward the receiver 9140a by allowing the sunlight to pass through. With this, the transmitter can perform visible light communication using sunlight and does not need a light source for visible light communication, thus making it difficult to be affected by structural constraints. It should be noted that the transmitter may use light from other devices such as a lighting device instead of the sunlight.

(Visible Light Signal Transmission by Transmittance Control of Liquid Crystal: Reflective Type)

Figure 3:
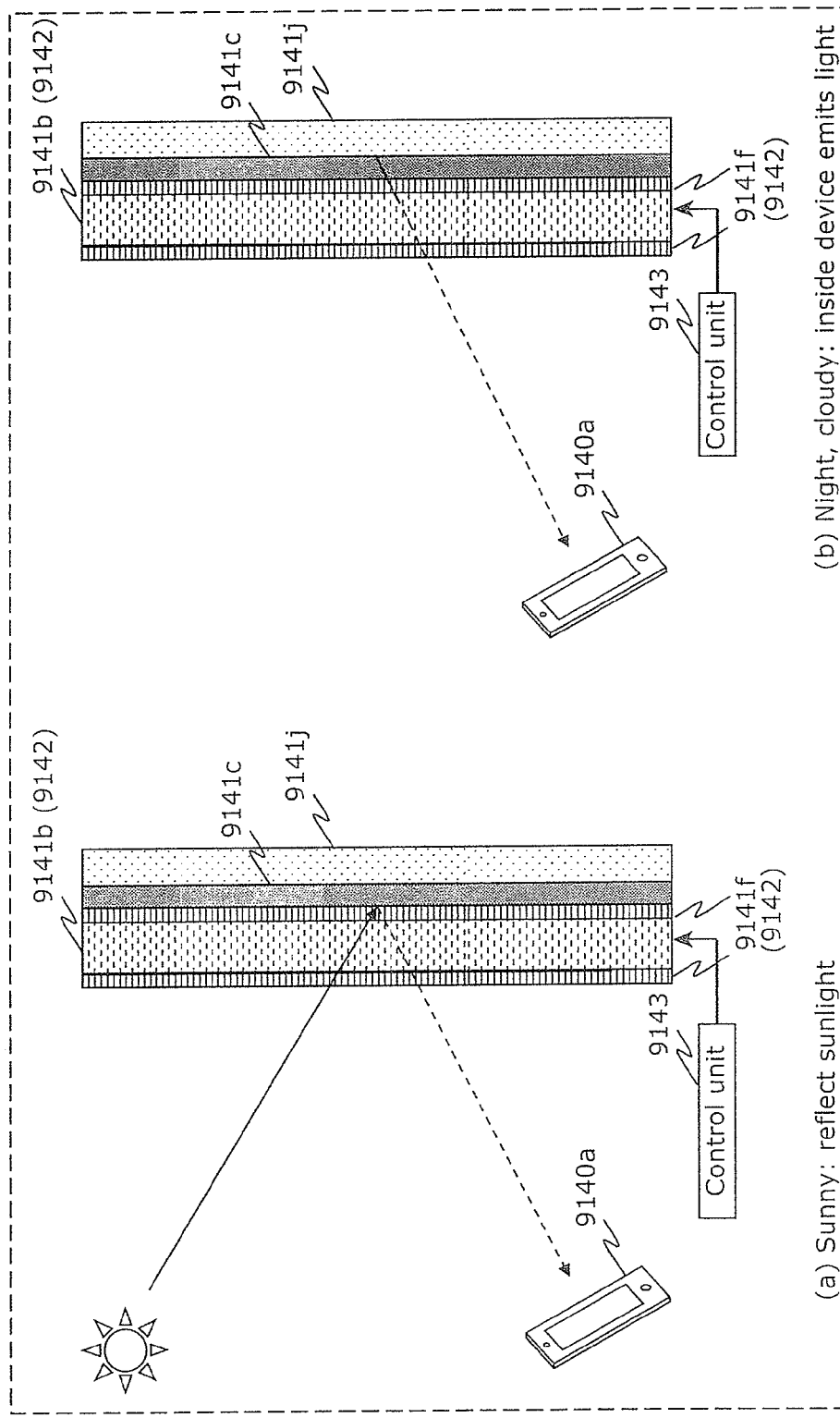
FIG. 3 is a diagram illustrating an example of a transmitter of a reflective type in Embodiment 1.

FIG. 3 is a diagram illustrating an example of a transmitter of a reflective type in Embodiment 1.

The transmitter that is an information communication device in the present embodiment includes, as illustrated in FIG. 3, a liquid crystal board 9142, a reflection board (reflector) 9141c that reflects sunlight, the aforementioned control unit 9143 that controls the transmittance of the liquid crystal board 9142, and a backlight 9141j. When the control unit 9143 controls the transmittance of the liquid crystal board 9142, this transmitter can superimpose a signal on light emitted from the liquid crystal board 9142 toward the receiver 9140a by being reflected by the reflection board 9141c.

The reflection board 9141c is a board that is translucent and is disposed opposite, without a gap therebetween, to the back surface of the liquid crystal board 9142 (reflected light receiving surface), and is, for example, an advertisement display on which letters and designs are drawn.

The backlight 9141j is disposed at the back surface side of this reflection board 9141c and illuminates the reflection board 9141c from the back surface side. It should be noted that in the present embodiment, in each of the structural elements included in the transmitter, the surface of the receiver 9140a side (the side to which a visible light signal is transmitted) is referred to as a front surface, and the surface opposite to the front surface is referred to as a back surface.

The liquid crystal board 9142 includes a liquid crystal 9141b, and two polarizing boards that interpose the liquid crystal 9141b therebetween. A polarizing direction each for the two polarizing boards 9141f tilts toward each other by 90 degrees. The control unit 9143 generates a control voltage correspond to a signal to be transmitted, and applies the control voltage to the liquid crystal 9141b of the liquid crystal board 9142. With this, when a voltage value of the control voltage to be applied to the liquid crystal 9141b is 0 V, the liquid crystal 9141b twists a vibration direction of the light passing through the liquid crystal 9141b by 90 degrees. As a result, the light that passed through one of the polarizing boards 9141f is twisted by the liquid crystal 9141b, and passes through the other polarizing board 9141f. In other words, as illustrated in (a) in FIG. 3, when the weather is fine or when the sun is shining, sunlight pass through the liquid crystal board 9142 from the front surface side, and then is reflected by the reflection board 9141c, and then is emitted by passing through the liquid crystal board 9142. Therefore, at this time, the imaging unit of the receiver 9140a directed to the reflection board 9141c images the reflection board 9141c that is brightly illuminated.

Meanwhile, a voltage value of the control voltage to be applied to the liquid crystal 9141b is a predetermined value more or less than 0 V (operating voltage value), the liquid crystal 9141b does not twist the vibration direction of the light passing through the liquid crystal 9141b. As a result, since the light that passed through one of the polarizing boards 9141f is twisted by the liquid crystal 9141b, the light cannot pass through the other polarizing board 9141f. In other words, the sunlight irradiated to the front surface of the liquid crystal board 9142 does not pass through the liquid crystal board 9142. Therefore, at this time, the imaging unit of the receiver 9141a directed to the reflection board 9141c images the reflection board 9141c that becomes dark.

It should be noted that in FIG. 3, among solid lines and dotted lines indicating an orientation of light, the solid line indicates an orientation of light that is not modulated by a signal to be transmitted, and the dotted line indicates an orientation of light that is modulated by a signal to be transmitted. The same can be applied to other drawings.

As described above, the transmitter in the present embodiment can change luminance using outside light such as sunlight according to a signal, by changing the transmittance of the liquid crystal board 9142 with respect to light according to a signal to be transmitted. As a result, the transmitter can transmit a visible light signal to the receiver 9140a without a light source. Moreover, when even when ambient light is bright and therefore blinking of illumination light is difficult to be observed, it is possible to transmit a visible light signal that is easy to receive. It should be noted that the same effect can be obtained from this method, when using an electromagnetic wave other than visible light such as infrared light or ultraviolet light. By displaying advertisement on the reflection board 9141c or the like and transmitting information related to the advertisement (related information), the user can obtain the related information by directing the receiver 9140a to the advertisement (the reflection board 9141c) or the like.

In other words, the transmitter in the present embodiment is a transmitter that transmits a signal to the receiver 9140a by changing the amount of light emitted, and includes the control unit 9143 that generates a control voltage according to a signal to be transmitted, the reflection board 9141c that reflects sunlight, and the liquid crystal board 9142 that receives the reflected light that is sunlight reflected by the reflection board 9141c and changes, according to the control voltage, the amount of light emitted toward the receiver 9140a by allowing the reflected light to pass through. With this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, as illustrated in (b) in FIG. 3, when it is at night or the weather is cloudy, in other words, when the sun is not shining, the transmitter can transmit a signal by using light of the backlight 9141*j* that is located at the back surface of the reflection board 9141*c*, instead of sunlight. In other words, the transmitter can transmit a visible light signal indicated by light to the receiver 9140*a*, by allowing or not allowing light irradiated to the back surface of the liquid crystal board 9142 via the semi-translucent reflection board 9141*c* from the backlight 9141*j*, to pass to the front surface side of the liquid crystal board 9142.

In other words, the transmitter in the present embodiment further includes the backlight 9141*j* for illuminating the reflected light receiving surface (back surface) of the liquid crystal board 9142 that is a surface that receives the reflected light. Then, the liquid crystal board 9142 changes, according to the control voltage, the amount of light emitted toward the receiver 9140*a* by allowing the light from the backlight 9141*j* instead of the reflected light to pass through the liquid crystal board 9142, when the reflected light receiving surface is illuminated with light from the backlight 9141*j* without receiving the reflected light. With this, when the weather is fine, it is possible to perform visible light communication using sunlight. When it is at night or the weather is cloudy, it is possible to perform visible light communication using light from the backlight 9141*j*. In other words, an influence from the state of sunlight can be reduced.

Moreover, when the outside light such as sunlight is weak, it is possible to easily receive a signal by turning ON the backlight 9141*j* to an extent of supplementing the outside light. Moreover, power consumption can be reduced compared with when the backlight 9141*j* is turned ON with full power. When the backlight 9141*j* is turned ON, there are a method of expressing a signal by controlling the transmittance of the liquid crystal board 9142 while the backlight 9141*j* is always turned ON (liquid crystal control method), a method of expressing a signal by controlling the luminance of the backlight 9141*j* while the transmittance of the liquid crystal board 9142 is fixed to the largest (backlight control method), and a method of controlling the transmittance of the liquid crystal board 9142 in synchronization with controlling the luminance of the backlight 9141*j* (hybrid control method). By changing these control methods according to the brightness of the outside light, it is possible to reduce a receiving error rate and power consumption. For example, when the outside light is relatively bright, the selection of the liquid crystal method or the hybrid control method can reduce the number of receiving errors. By using wireless communication such as Bluetooth® (Low Energy), Wi-Fi, or the like, the transmitter may notify, to the receiver 9140*a*, which method is used for transmitting a signal. With this configuration, receiving efficiency (receiving speed or error rate) is increased. Moreover, since the most appropriate modulation method can be used with the control method, transmission efficiency (power consumption or flicker) and receiving efficiency can be increased.

A frequency domain used in the transmittance control of the liquid crystal 9141*b* is from several hundred Hz to 1 kHz. In this frequency domain, flicker is generated when pulse modulation is used. By expressing a signal using frequency modulation or phase modulation, it is possible to transmit a signal while suppressing flicker. The liquid crystal board 9142 is, for example, a Twist Nematic (TN) liquid crystal or Electrically Controlled Birefringence (ECB) liquid crystal.

Figure 4:
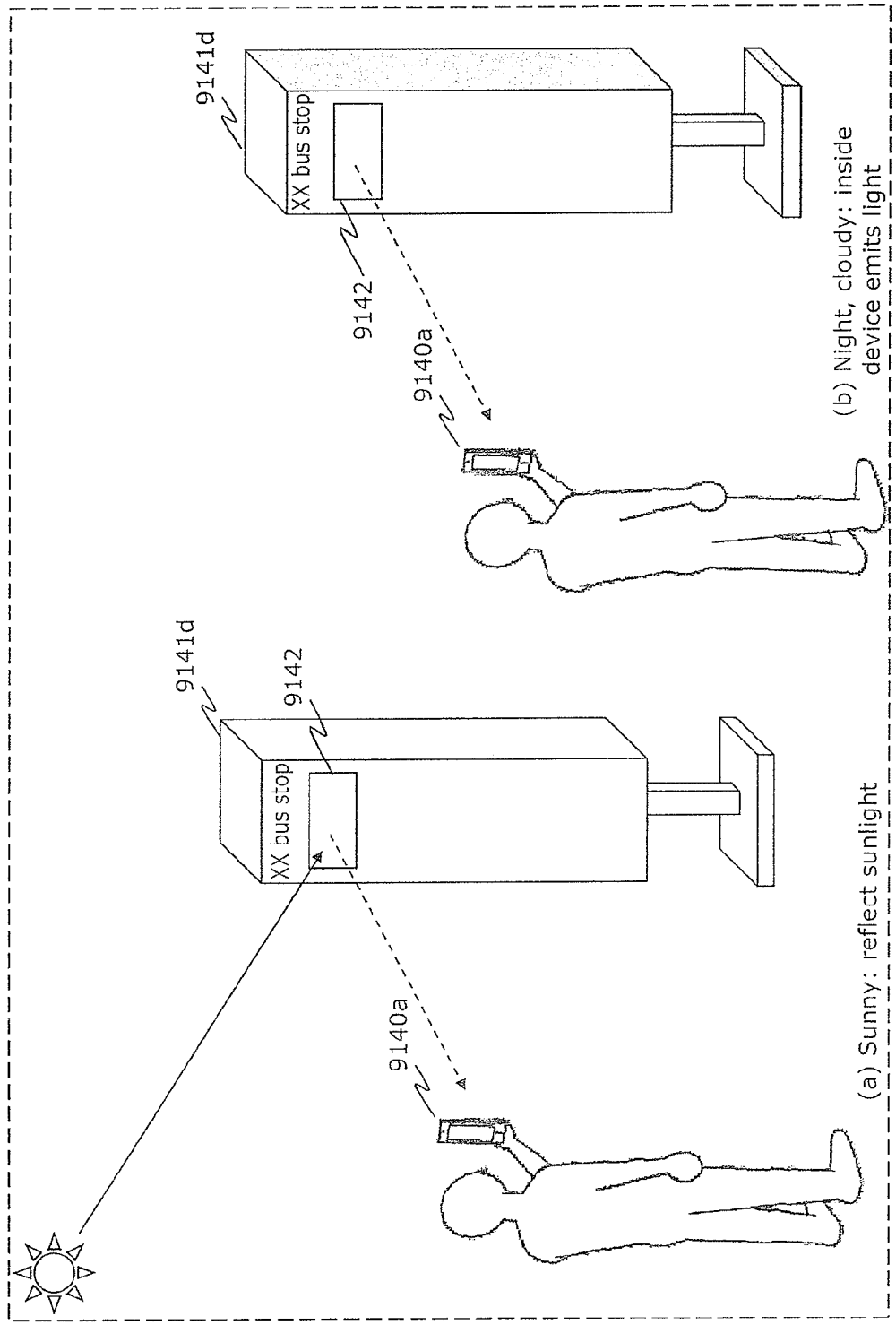
FIG. 4 is a diagram illustrating an example of an application of a transmitter of a reflective type in Embodiment 1.

FIG. 4 is a diagram illustrating an example of an application of a transmitter of a reflective type in the present embodiment.

As illustrated in (a) and (b) in FIG. 4, the transmitter is configured by installing the liquid crystal board 9142 on a sign pole 9141*d* of a bus stop. The sign pole 9141*d* constitutes part of the transmitter as the reflection board 9141*c* and the backlight 9141*l* illustrated in FIG. 3. With this configuration, it is possible to transmit and receive a visible light signal whether it is day or night.

As described above, the liquid crystal board 9142 includes two polarizing boards 9141*f*, and the intensity of light is halved every time the light passes through the two polarizing boards 9141*f*. In the configuration of (a) in FIG. 3, since the light passes through the two polarizing boards 9141*f* twice, the intensity of the light is reduced to a quarter and it becomes dark. In view of this, the transmitter may be configured for allowing the light not to pass through the two polarizing boards 9141*f* and hit the light on the reflection board 9141*c*.

Figure 5:
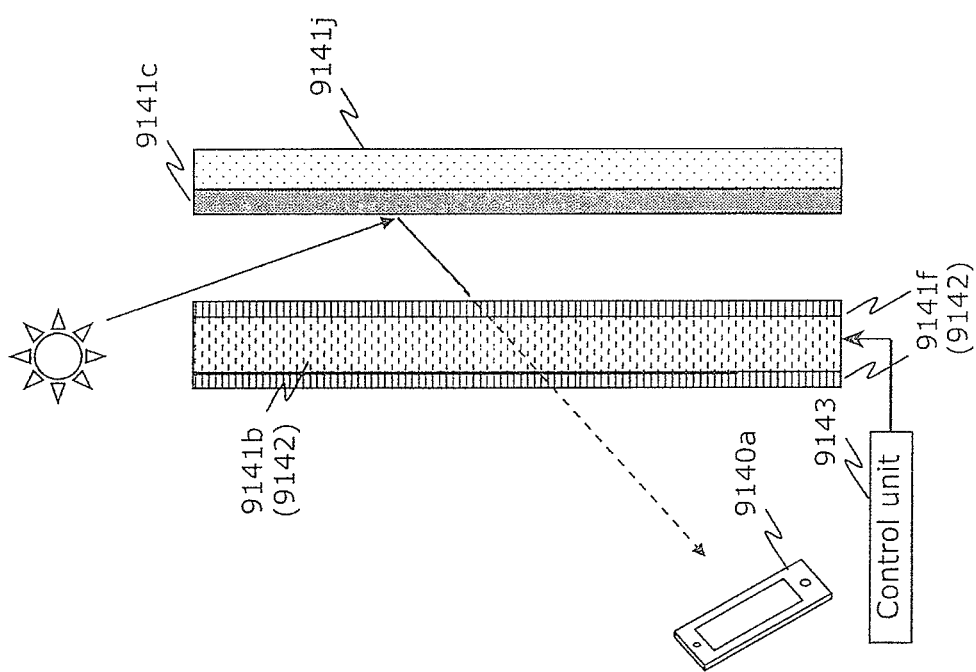
FIG. 5 is a diagram illustrating a configuration diagram of a reflection board of a reflective type in Embodiment 1.

FIG. 5 is a diagram illustrating an arrangement configuration of the reflection board 9141*c* in the present embodiment.

The reflection board 9141*c* is disposed opposite to the back surface of the liquid crystal board 9142 with a gap therebetween. The reflection board 9141*c* receives at least part of the sunlight from the gap and not via the liquid crystal board 9142, and then reflects the part toward the liquid crystal board 9142. With this, since at least part of the outside light such as sunlight is emitted toward the receiver 9140*a* by passing through the liquid crystal board 9142 only once, the amount of the light emitted from the liquid crystal board 9142 toward the receiver 9140*a* can be increased. As a result, a change range of amount of light, that is, a range of luminance change can be large, and therefore it is possible to transmit a signal easy for the receiver 9140*a* to receive.

Here, it is possible to use a light guide so that light is evenly irradiated to the back surface of the reflection board 9141*c*.

Figure 6:
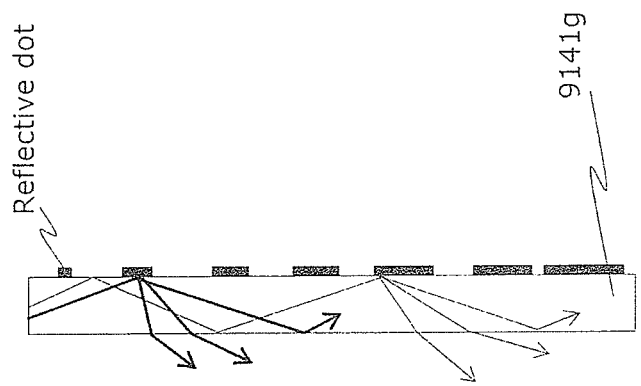
FIG. 6 is a side view of a light guide according to Embodiment 1.

FIG. 6 is a side view of a light guide according to the present embodiment.

A light guide 9141*g* is a board that is translucent. As illustrated in FIG. 6, the light guide 9141*g* is set along a vertical direction, and light is irradiated to an upper end of the light guide 9141*g*. At this time, since much of the light entering from the upper end to the inside of the light guide 9141*g* has a large angle of incidence with respect to the front surface of the light guide 9141*g* (the surface on the left side in FIG. 6) and the back surface (the surface on the right side in FIG. 6), the light is guided to the lower end of the light guide 9141*g* while being reflected by the front surface and the back surface.

Here, a plurality of reflective dots are formed on the back surface of the light guide 9141*g*. Each of the reflective dots has a property of causing light to have a diffuse reflection (scattering), and is formed in a long band in a horizontal direction (a vertical direction on the illustration in FIG. 6). Each of the reflective dots is disposed with a gap therebetween along a vertical direction of the light guide 9141*g*. Therefore, the light guided to the lower end in the light guide 9141*g* has a diffuse reflection when the light hits the reflective dots, and part of the diffused light is incident at a small angle of incidence with respect to the front surface of the light guide 9141*g*. As a result, the part of the light is emitted from the front surface of the light guide 9141*g*. As a result, when the light is guided, in the light guide 9141*g*, from the upper end side to the lower end side, the light in the light guide 9141*g* becomes gradually weak according to the amount of light emitted in the process. In view of this, each of the reflective dots is formed more widely as the position of the reflective dot is lower. Therefore, when the light is incident to the upper end of the light guide 9141*g*, the light guide 9141*g* can emit light from the front surface evenly on the whole.

Figure 7:
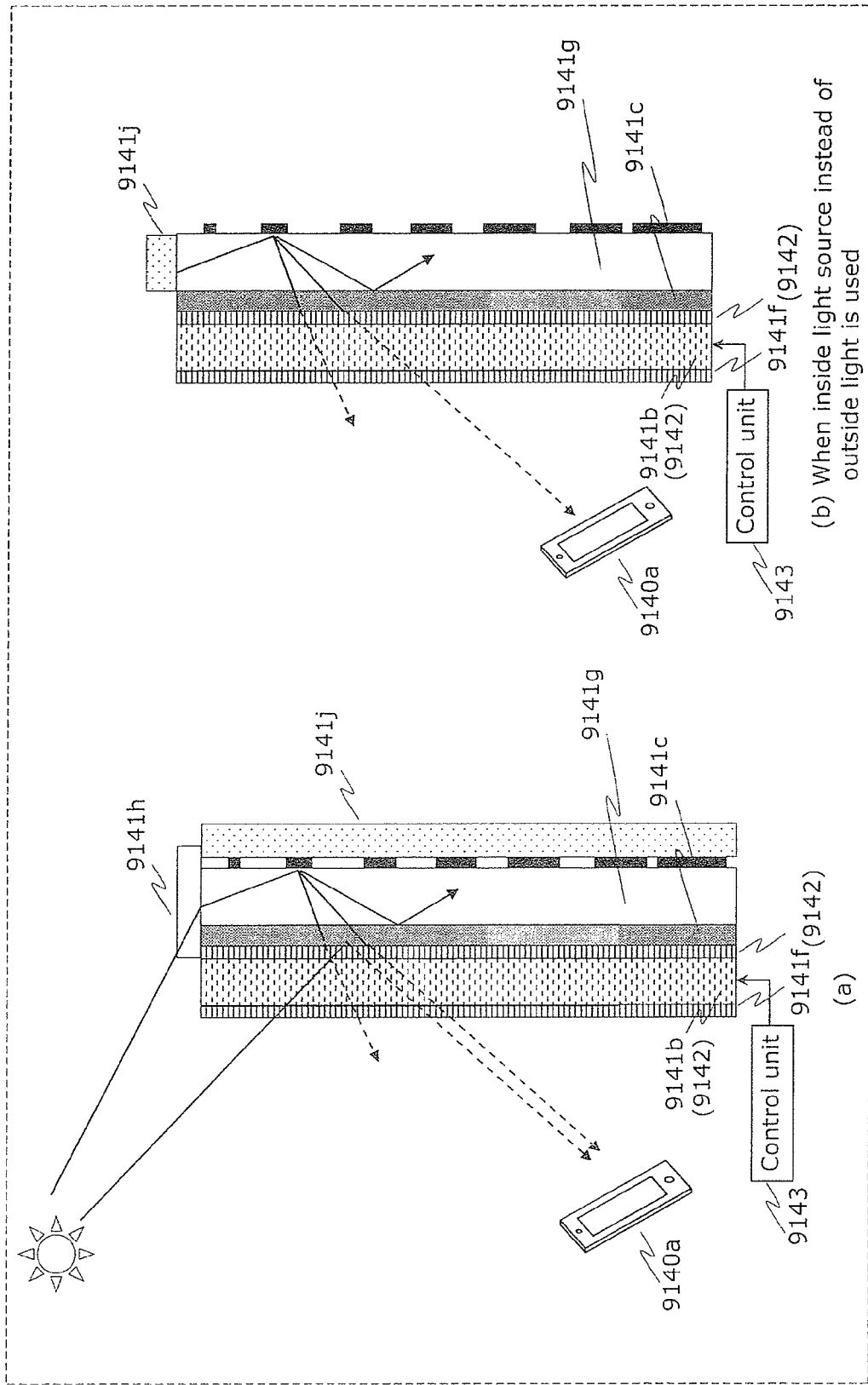
FIG. 7 is a diagram illustrating another example of a transmitter of a reflective type in Embodiment 1.

FIG. 7 is a diagram illustrating another example of a transmitter of a reflective type in the present embodiment.

As illustrated in (a) in FIG. 7, the transmitter includes the liquid crystal board 9142, the reflection board 9141c, the backlight 9141j, and the control unit 9143. The transmitter further includes a light guide 9141g and a light collection unit 9141h.

The light guide 9141g is disposed between the reflection board 9141c and the backlight 91413. The light collection unit 9141h is configured as a lens and is disposed on the upper end of the light guide 9141g. This light collection unit 9141h collects outside light such as sunlight, and then guides the outside light from the upper end to the inside of the light guide 9141g.

With this, when the transmittance of the liquid crystal board 9142 is high and there is outside light, the front surface of the semi-translucent reflection board 9141c is brightly illuminated by outside light to be irradiated via the liquid crystal board 9142 and outside light to be irradiated via the light collection unit 9141h and the light guide 9141g. Moreover, when there is no outside light, the front surface of the semi-translucent reflection board 9141c is brightly illuminated by light to be irradiated to the back surface of the reflection board 9141c via the light guide 9141g after being emitted from the backlight 91413.

This transmitter can stably illuminate the front surface of the reflection board 9141c, even when outside light is weak, by including the light guide 9141g and the light collection unit 9141h. As a result, when outside light is weak, the transmitter can greatly change the amount of light emitted from the front surface of the reflection board 9141c via the liquid crystal board 9142 by controlling the transmittance of the liquid crystal board 9142, and therefore can appropriately transmit a signal. It should be noted that the control (switch) of the transmittance of the liquid crystal board 9142 is performed instead of at a frequency of approximately 500 Hz at a frequency of at least several GHz. Therefore, a signal based on outside light to be reflected by the reflection board 9141c does not interfere with a signal based on outside light emitted after passing through the reflection board 9141c from the light guide 9141g. It should be noted that the light guide 9141j may be disposed between the light guide 9141g and the reflection board 9141c.

Moreover, as illustrated in (b) in FIG. 7, the transmitter does not have to include the light collection unit 9141h. In this case, the backlight 9141j is disposed at the upper end of the light guide 9141g. Moreover, in this case, the light guide 9141g receives light from the backlight 9141j instead of outside light, and diffuses the light to the front surface of the light guide 9141g, and evenly emits from the front surface on the whole.

As described above, in the present embodiment, the reflection board 9141c is translucent, and is disposed opposite to the reflected light receiving surface of the liquid crystal board 9142. Then, the transmitter further includes the board-shaped light guide 9141g that interposes the reflection board 9141c between the light guide 9141g and the liquid crystal board 9142 and is disposed substantially parallel to the liquid crystal board 9142. This light guide 9141g guides the incident sunlight in the light guide 9141g so that the sunlight incident on the end portion of the light guide 9141g is spread via the reflection board 9141c to the reflected light receiving surface of the liquid crystal board 9142. With this, since the reflective light receiving surface of the liquid crystal board 9142 not only receives reflected light but also sunlight to be spread from the light guide via the reflection board 9141c, the amount of light emitted from the liquid crystal board 9141 toward the receiver 9140a can be increased. Therefore, a change range of amount of light, that is, a range of luminance change can be large, and therefore it is possible to transmit a signal easy for the receiver 9140a to receive.

Moreover, the transmitter in the present embodiment includes the light collection unit 9141h that collects sunlight at the end portion of the light guide 9141g. With this, the amount of sunlight incident to the light guide 9141g can be increased, and therefore the amount of light emitted from the liquid crystal board 9142 toward the receiver 9140a can be further increased.

Moreover, in the present embodiment, the reflection board 9141c is translucent, and the liquid crystal board 9142 receives transmitted light that is sunlight passing through the reflection board 9141c, and changes, according to the control voltage, the amount of light emitted toward the receiver 9140a after the transmitted light passes through the reflection board 9141c. With this, since not only reflected light but also transmitted light are emitted from the receiver 9140a side, the amount of light emitted from the liquid crystal board 9142 toward the receiver 9140a can be increased. Therefore, a change range of amount of light, that is, a range of luminance change can be large, and therefore it is possible to transmit a signal easy for the receiver 9140a to receive.

Figure 8:
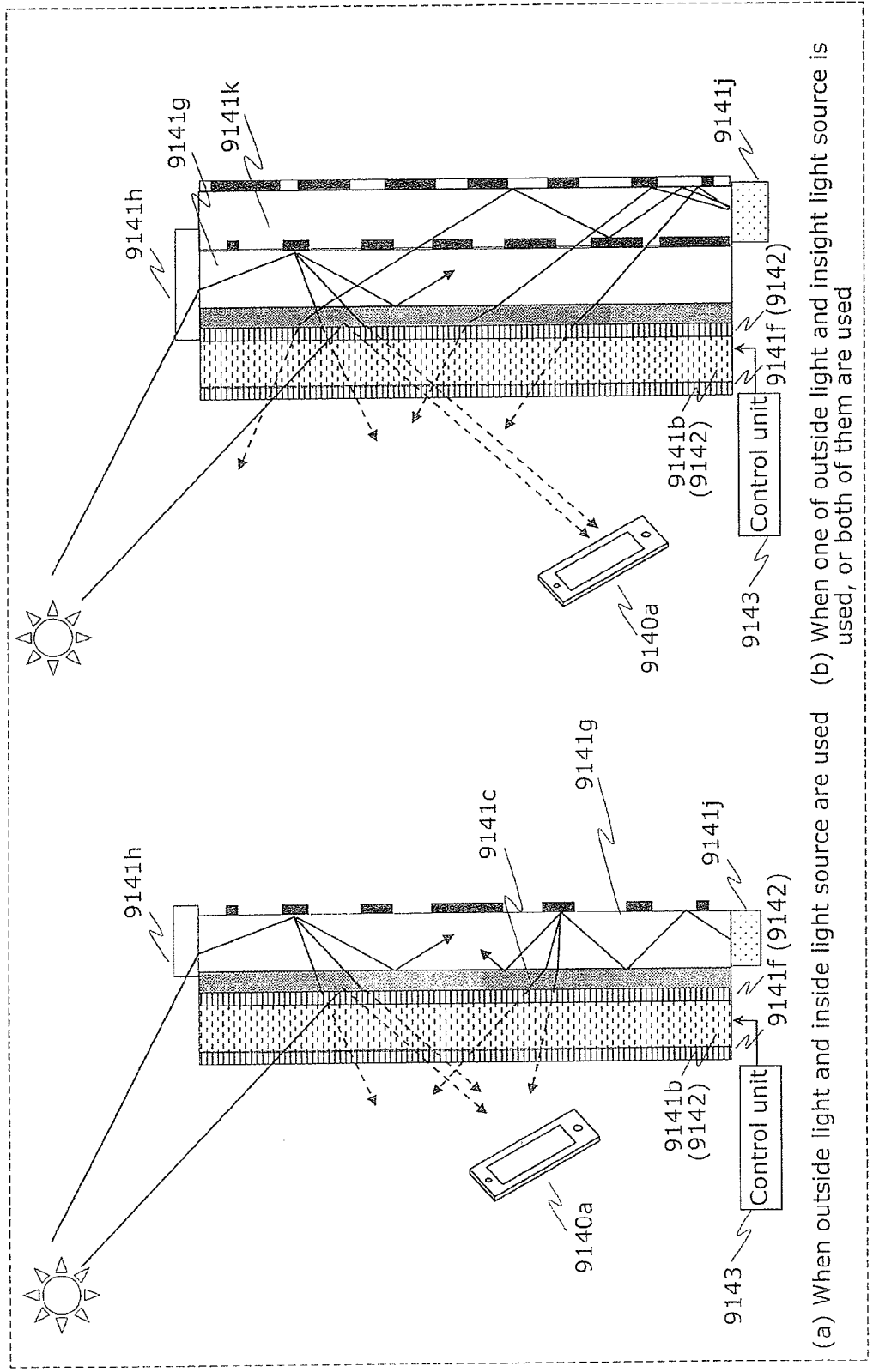
FIG. 8 is a diagram illustrating another example of a transmitter of a reflective type in Embodiment 1.

FIG. 8 is a diagram illustrating another example of a transmitter of a reflective type in the present embodiment.

As illustrated in (a) in FIG. 8, the transmitter, as similarly to the configuration in (a) in FIG. 7, includes the light guide 9141g, the light collection unit 9141h, and the backlight 9141j. However, the backlight 9141j is disposed at the lower end of the light guide 9141g, instead of the upper end or the back surface side of the light guide 9141g. In this case, each of the reflective dots of the light guide 9141g is formed more widely as the position of the reflective dot in a vertical direction is closer to the center.

With this, when the transmittance of the liquid crystal board 9142 is high and there is outside light, the front surface of the upper half of the semi-translucent reflection board 9141c is brightly illuminated by outside light to be irradiated via the liquid crystal board 9142 and outside light to be irradiated via the light collection unit 9141h and the light guide 9141g. The front surface of the lower half of the semi-translucent reflection board 9141c is brightly illuminated by outside light to be irradiated via the liquid crystal board 9142 and outside light to be irradiated via the light guide 9141g after being emitted from the backlight 9141j.

In other words, the light guide 9141g further guides light from the backlight 9141j in the light guide 9141g so that light from the backlight 9141j incident to the end portion of the light guide 9141g is spread to the reflected light receiving surface of the liquid crystal board 9142 via the reflection board 9141c. With this, when light from the backlight 9141j is incident to the end portion of the light guide 9141g, the light from the backlight 9141j is also spread to the reflected light receiving surface of the liquid crystal board 9142. Therefore, it is possible to dispose the backlight 9141j toward the end portion of the light guide 9141g. In other words, a degree of freedom of the disposition of the backlight 9141j can be increased.

Furthermore, the light collection unit 9141h and the backlight 9141j in the present embodiment are disposed at both ends of the light guide 9141g to interpose the light guide 9141g therebetween. With this, the amount of each of sunlight and light from the backlight 9141j in each position in the light guide 9141g that is incident from each end portion of the light guide 9141g and is guided toward the center of the light guide 9141g is larger as the position is closer to the end of the light guide 9141g, and is smaller as the position is closer to the center of the light guide 9141g. Therefore, in the light guide 9141g in the present embodiment, a plurality of reflective dots for scattering light are formed in a direction connecting the light collection unit 9141h and the backlight 9141j. The width of each of the reflecting tots and its direction is smaller as the position of the reflection dot is close to one of both ends, and is larger as the position of the reflective dot is closer to the center of the light guide 9141g. With this, in each of the positions of the light guide 9141g, a ratio of light emitted from the light guide 9141g to the liquid crystal board 9142 via the reflection board 9141c can be smaller as the position is closer to the end of the light guide 9141g, and is larger as the position is closer to the center of the light guide 9141g. As a result, in each of the positions of the light guide 9141g, the amount of light emitted from the light guide 9141g to the liquid crystal board 9142 via the reflection board 9141c can be substantially even. As a result, a signal can be transmitted according to an appropriate luminance change.

Moreover, as illustrated in (b) in FIG. 8, the transmitter may further include a light guide 9141k. The light guide 9141k is configured similarly to the light guide 9141g, and is disposed to be upside down with respect to the light guide 9141g at the back surface side of the light guide 9141g. In other words, each of the reflective dots of the light guide 9141k is formed more widely as the position of the reflective dot in a vertical direction is closer to the upper end. Then, the backlight 9141j is disposed at the lower end of the backlight 9141k.

With this, when the transmittance of the liquid crystal board 9142 is high and there is outside light, the front surface of the semi-translucent reflection board 9141c is brightly illuminated by outside light to be irradiated via the liquid crystal board 9142, outside light to be irradiated via the light collection unit 9141h and the light guide 9141g, and light to be irradiated via the light guide 9141k and the light guide 9141g after being emitted from the backlight 9141j. Moreover, when there is no outside light, the front surface of the semi-translucent reflection board 9141c is brightly illuminated by light to be irradiated to the back surface of the reflection board 9141c via the light guide 9141k and the light guide 9141g after being emitted from the backlight 9141j.

It should be noted that the light emitted from the front surface of the light guide 9141k, when irradiated on a portion in which there is no reflective dot in the back surface of the light guide 9141g, is incident within the light guide 9141g. Meanwhile, the light directing to the back surface in the light guide 9141g is reflected by the bask surface without being emitted toward the light guide 9141k.

Figure 9:
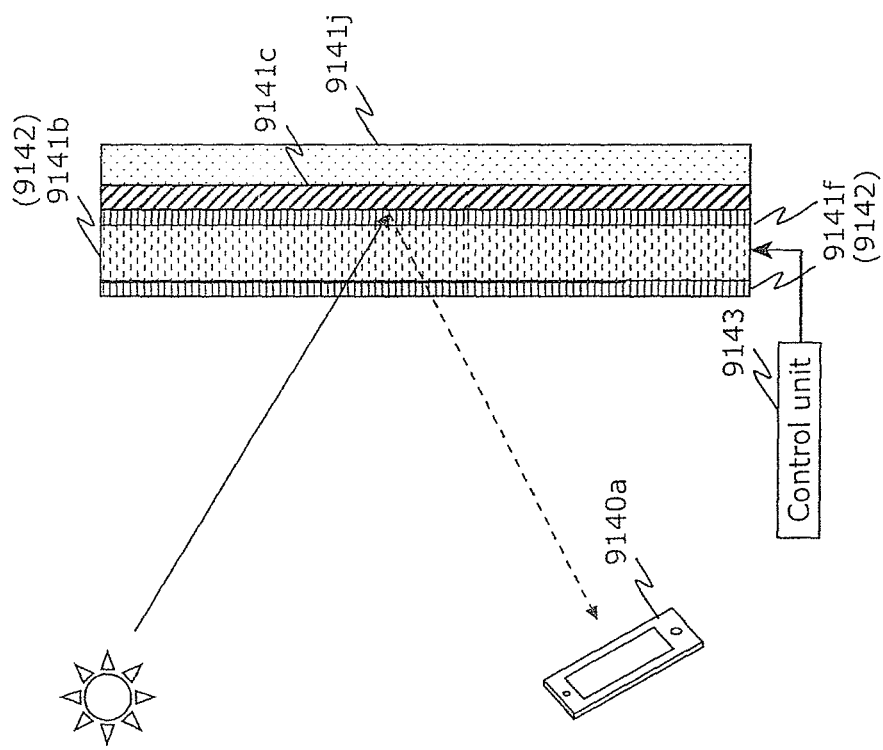
FIG. 9 is a diagram illustrating another example of a transmitter of a reflective type in Embodiment 1.

FIG. 9 is a diagram illustrating another example of a transmitter of a reflective type in the present embodiment.

As illustrated in FIG. 9, the front surface of the reflection board 9141c (the surface reflecting sunlight) may be formed in a specular surface. When outside light such as sunlight that includes a plurality of optical elements having different vibration directions is irradiated to the front surface of the liquid crystal board 9142 set to have high transmittance, an only optical element having a specific vibration direction passes from the front surface side to the back surface side of the liquid crystal board 9142, by the polarizing board 9141f. Therefore, the outside light is reduced to ½. Here, when the optical element in a specified vibration direction that passed through the liquid crystal board 9142 hits the front surface of the reflection board 9141c that is not a specular surface, the optical element is reflected again as light that includes a plurality of optical elements having different vibration directions. Then, this reflected light is further reduced to ½ when passing from the back surface side to the front surface side of the liquid crystal board 9142. Therefore, the outside light reflected by the reflection board 9141c is reduced to ¼ by passing through the liquid crystal board 9142 twice.

However, when the front surface of the reflection board 9141c is formed as a specular surface, the specific optical element that passed through the liquid crystal board 9142 vibrates only in the specific vibration direction even when being reflected by the front surface of the reflection board 9141c. Therefore, the light reflected by the front surface of the reflection board 9141c passes from the back surface side to the front surface side of the liquid crystal board 9142 without almost any reduction. Therefore, the outside light reflected by the reflection board 9141c is reduced to approximately ½ instead of ¼ by passing through the liquid crystal board 9142 twice. In other words, by unifying the light phases, the reduction of light when reflection takes place can be prevented. With this configuration, the reflected light can remain bright.

Figure 10:
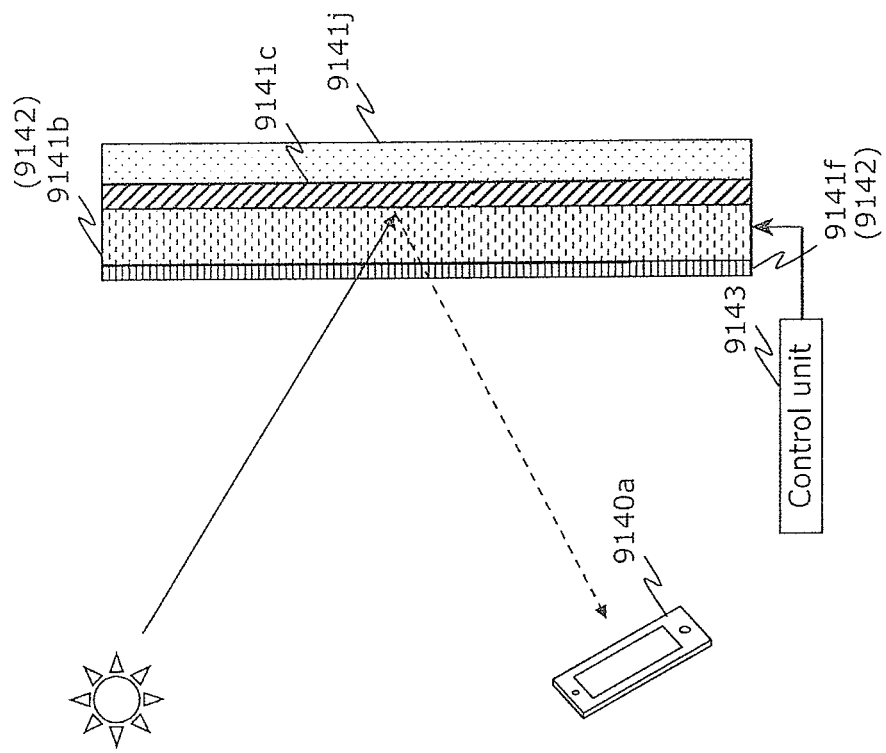
FIG. 10 is a diagram illustrating another example of a transmitter of a reflective type in Embodiment 1.

FIG. 10 is a diagram illustrating another example of a transmitter of a reflective type in the present embodiment.

When the front surface of the reflection board 9141c is formed in the specular surface, the liquid crystal board 9142 of the transmitter does not have to include the polarizing board 9141f on the back surface side, among the two polarizing boards 9141f illustrated in FIG. 9, and may include only the polarizing board 9141f on the front surface side. In the transmitter, when a voltage value of the control voltage is 0 V, the liquid crystal 9141b twists a vibration direction of the light passing through the liquid crystal 9141b by 45 degrees. When a voltage value of the control voltage is an operating voltage value, the liquid crystal 9141b does not twist a vibration direction of the light.

Therefore, when the control voltage is 0 V, the vibration direction of outside light that passes through the polarizing board 9141f and then is incident to the liquid crystal 9141b is the same as the polarizing direction of the polarizing board 9141f, and is twisted by 45 degrees when the outside light passes through the liquid crystal 9141b. Then, the outside light is reflected while being twisted by the front surface formed in the specular surface of the reflection board 9141c, and then passes through the liquid crystal 9141b again. As a result, the vibration direction of the outside light is twisted further by 45 degrees. With this, the outside light that passes through the polarizing board 9141f and then is incident to the liquid crystal 9141b returns to the polarizing board 9141f again while the vibration direction is twisted by 90 degrees. However, since the vibration direction is twisted by 90 degrees, the outside light is not emitted from the front surface of the liquid crystal board 9142.

Meanwhile, when the voltage value of the control voltage is an operating voltage value, the vibration direction of outside light that passes through the polarizing board 9141f and is incident to the liquid crystal 9141b is the same as the polarizing direction of the polarizing board 9141f, and is not twisted even when the outside light passes through the liquid crystal 9141b. Then, the outside light is reflected while not being twisted by the front surface formed in the specular surface of the reflection board 9141c, and then passes through the liquid crystal 9141b again. With this, the outside light that passes through the polarizing board 9141f and then is incident to the liquid crystal 9141b returns to the polarizing board 9141f again without the vibration direction being twisted. Therefore, the outside light is emitted from the front surface of the liquid crystal board 9142.

Even in this transmitter, the transmittance of the liquid crystal board 9142 is changed according to the control voltage, and a signal can be transmitted appropriately. Moreover, since the transmitter includes only one polarizing board, and makes it possible to keep reflected light bright. Moreover, by reducing the number of polarizing boards, cost reduction and miniaturization can be realized.

Figure 11:
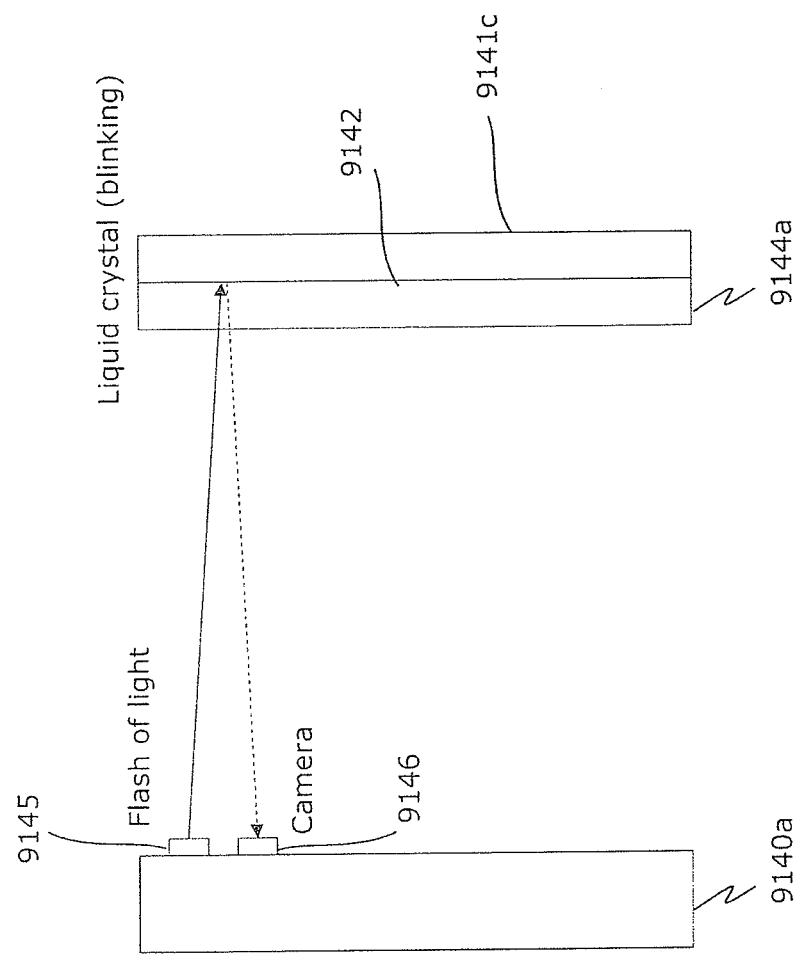
FIG. 11 is a diagram illustrating another example of communication between the transmitter and a receiver in Embodiment 1.

FIG. 11 is a diagram illustrating another example of communication between a transmitter and a receiver in the present embodiment.

A transmitter 9144a in the present embodiment is the aforementioned transmitter, and includes the control unit 9143 (not illustrated), the liquid crystal board 9142, and the reflection board 9141c. The receiver 9140a includes a light emitting unit 9145, and a camera 9146 that is an imaging unit. When receiving a signal from the transmitter 9144a, this receiver 9140a emits flash of light from the light emitting unit 9145 to the transmitter 9144. The transmitter 9144a uses the flash of light from the light emitting unit 9145 as outside light. In other words, by changing the transmittance of the liquid crystal board 9142 according to a signal to be transmitted, the transmitter 9144a illuminates the reflection board 9141c brightly and makes the reflection board 9141c dark. With this, the transmitter 9144a transmits a signal to be transmitted to the camera 9146 of the receiver 9140a.

As described above, a receiving method according to the present embodiment is a receiving method of receiving a signal from the transmitter 9144a, and the receiving method includes emitting flash of light to the transmitter 9144a, and receiving a signal indicated by a change in the amount of light emitted from the transmitter 9144a, by imaging the transmitter 9144a illuminated by the flash of light. Then, the reflection board 9141c of the transmitter 9144a reflects flash of light instead of sunlight. The liquid crystal board 9142 of the transmitter 9144a changes, according to the control voltage to be applied to the liquid crystal board 9142, the amount of light emitted by allowing reflected light that is reflected flash of light to pass through the liquid crystal board 9142. With this, by using flash light instead of sunlight when there is no sunlight or the sunlight is weak, a signal from the transmitter 9144a can be appropriately received.

Figure 12:
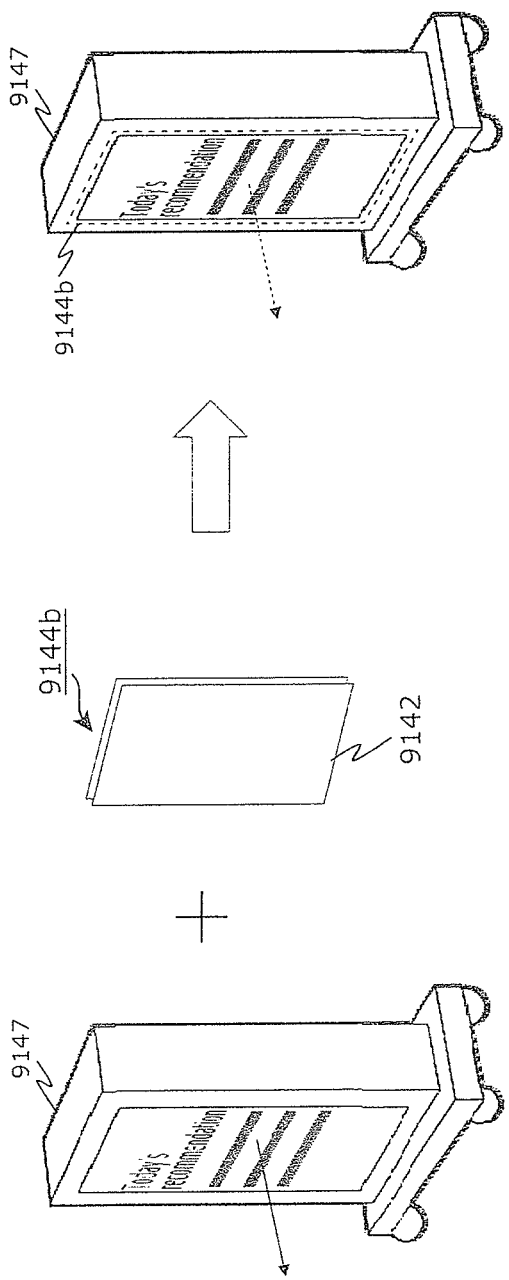
FIG. 12 is a diagram illustrating an example of an application of a transmitter of a reflective type according to Embodiment 1.

FIG. 12 is a diagram illustrating an example of an application of a transmitter of a reflective type in the present embodiment.

A transmitter 9144b in the present embodiment is the aforementioned transmitter, and includes the control unit 9143 (not illustrated) and the liquid crystal board 9142. This transmitter 9144b is used by installing on a signboard 9147. The transmitter 9144b installed on the signboard 9147 uses, as the reflection board 9141c, a portion of the signboard 9147 opposed to the liquid crystal board 9142. Moreover, when the aforementioned portion of the signboard 9147 is translucent and a light source is provided in the signboard 9147, the transmitter 9144b uses the light source as the backlight 9141j.

Figure 13:
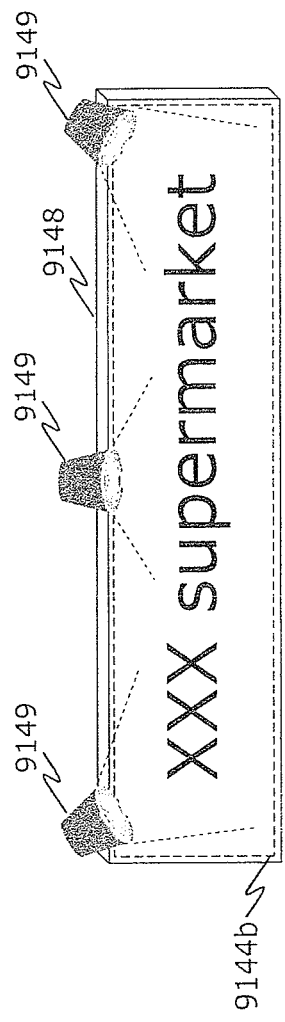
FIG. 13 is a diagram illustrating another example of an application of a transmitter of a reflective type in Embodiment 1.

FIG. 13 is a diagram illustrating another example of an application of a transmitter of a reflective type in the present embodiment.

The transmitter 9144b in the present embodiment may be installed on a signboard 9148 illuminated by a plurality of lighting devices 9149. The transmitter 9144b installed on the signboard 9148 uses, as the reflection board 9141c, a portion of the signboard 9148 opposed to the liquid crystal board 9142. Moreover, the transmitter 9144b uses the light from the lighting devices 9149 as the aforementioned outside light such as sunlight. Here, when the lighting devices 9149 transmit signals by luminance change, the luminance changes of the lighting devices 9149 need to be synchronized. In the present embodiment, however, since the transmitter 9144b transmits a signal to be transmitted by changing the transmittance of the liquid crystal board 9142, the aforementioned synchronization is not necessary even when there is a plurality of the lighting devices 9149.

FIG. 14 is a diagram illustrating another example of a transmitter in the present embodiment.

A transmitter 9150 in the present embodiment includes the aforementioned control unit 9143 (no illustrated) and the liquid crystal board 9142, and further includes a light source 9155 and two solar cells 9151. One of the solar cells 9151 is installed on the front surface side of the liquid crystal board 9142, and the other is installed on the back surface side of the liquid crystal board 9142. Therefore, one of the solar panels 9151 generates power by receiving outside light such as sunlight, and provides the power obtained by the generation to the control unit 9143. Therefore, the other solar cell 9151 generates power by receiving light from the light source 9155, and supplies the power obtained by the generation to the control unit 9143. With this, the transmitter 9150 can transmit a signal by changing the transmittance of the liquid crystal board 9142 without power being supplied from outside.

FIG. 15 is a block diagram illustrating a configuration of the transmitter 9150 in the present embodiment.

The transmitter 9150 includes the liquid crystal board 9142, the control unit 9143, a solar power generation unit 9152, a signal storage unit 9153, an illuminance measurement unit 9154, and a light source 9155.

The solar power generation unit 9152 includes two solar cells 9151, generates power according to outside light or light of the light source 9155, and supplies the power obtained by the power generation to the control unit 9143. The signal storage unit 9153 holds, for example, identification information (ID) for identifying the transmitter 9150. The control unit 9143 reads, from the signal storage unit 9153, the identification information as a signal to be transmitted. The illuminance measurement unit 9154 measures illuminance of outside light in a surrounding area of the transmitter 9150, and notifies the measured illuminance to the control unit 9143. When the notified illuminance is low, the control unit 9143 switches ON the light source 9155. It should be noted that the power of the light source 9155 may be supplied from the power supply installed on the light source 9155, and may be supplied from outside of the transmitter 9150.

The receiver 9140a that receives a signal from this transmitter 9150 obtains, on reception of ID that is a signal of the transmission signal, related information associated with the ID from a server. For example, when the transmitter 9150 is installed in the bus stop, the receiver 9140a obtains, from the server, information indicating the service situation of the bus corresponding to the current time at the bus stop. Moreover, the control unit 9143 of the transmitter 9150 regularly accesses the server and obtains, every time accessing to the server, information indicating the service situation of the bus corresponding to the current time at the bus stop (bus service information). The control unit 9143 of the transmitter 9150 may store the information, instead of ID, in the signal storage unit 9153. In this case, the transmitter 9150 transmits, instead of ID, the latest information of the bus service. Therefore, the receiver 9140a can directly obtain the bus service information without access to the server.

FIG. 16 is a diagram illustrating an example of an application of a transmitter of a transmissive type in the present embodiment. As illustrated in FIG. 16, the transmitter includes the liquid crystal board 9140b configured as a roof that is translucent and installed in the bus stop, for example. As illustrated in (a) and (b) in FIG. 16, this transmitter measures illuminance (brightness) of outside light such as sunlight that passed through the liquid crystal board 9140b, and controls the transmittance of the liquid crystal board 9140b to ensure that the illuminance is constant. It should be noted that the control of the transmittance is performed by the control unit 9143 (not illustrated) included in the transmitter.

It should be noted that although the transmitter illustrated in FIG. 16 is a transmissive type, the transmitter of the reflective type may also measure illuminance (brightness) of outside light such as sunlight that passed through the liquid crystal board 9142 after being reflected by the reflection board, and may control the transmittance of the liquid crystal board 9142 to ensure that the illuminance is constant.

Figure 17:
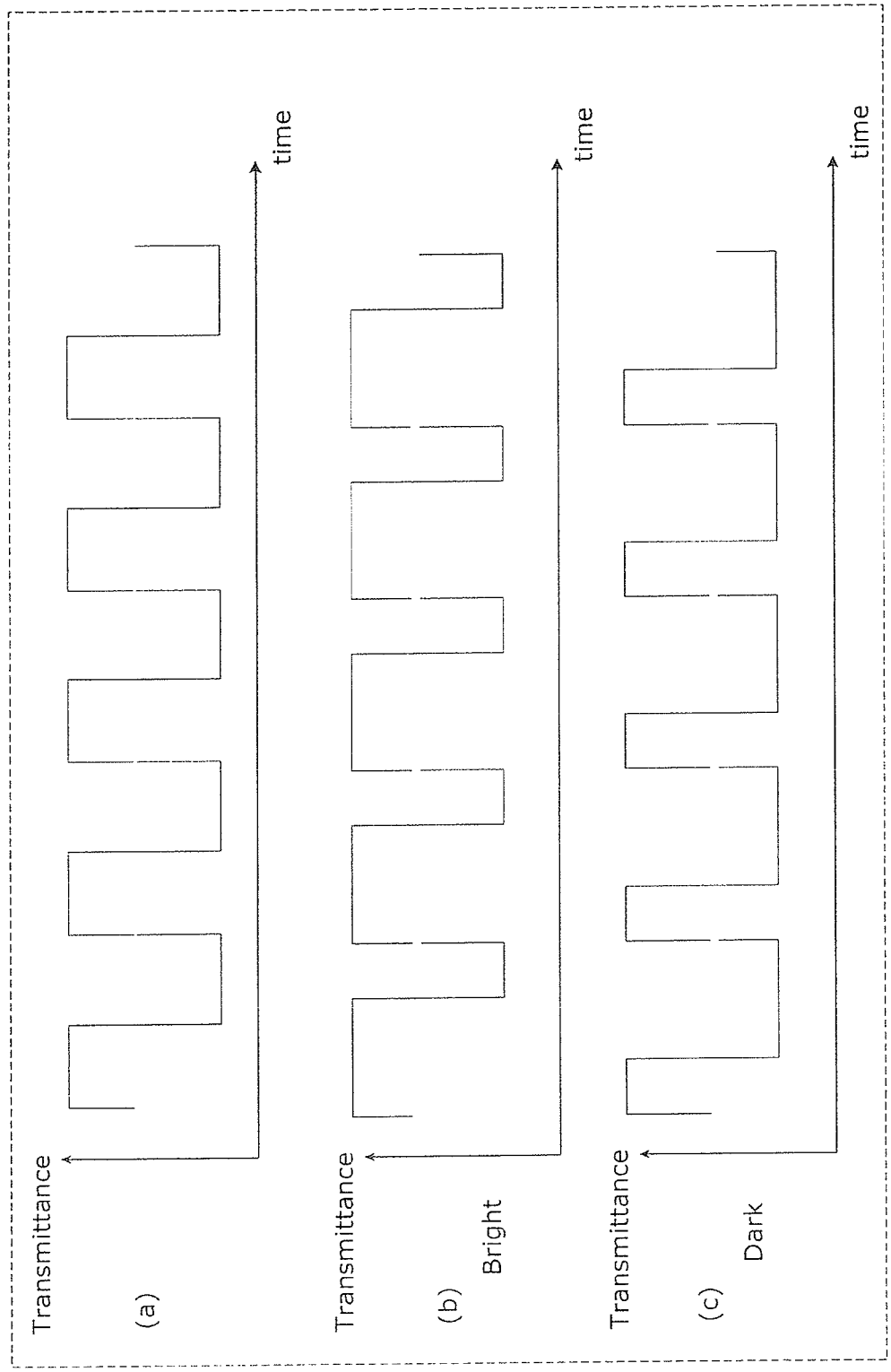
FIG. 17 is a diagram illustrating an example of control of a liquid crystal board in Embodiment 1.

FIG. 17 is a diagram illustrating an example of control of a liquid crystal board in the present embodiment.

When transmitting a signal indicated by a predetermined frequency, the transmitter, as illustrated in (a) in FIG. 17, changes the transmittance of the liquid crystal board 9140b with the frequency so that the ratio of a period of low transmittance (dark portion) with respect to a period of high transmittance (bright portion) is 1. Here, when outside light that passed through the liquid crystal board 9140b is dark, the transmitter, as illustrated in (b) in FIG. 17, changes the transmittance of the liquid crystal board 9140b with the frequency so that the ratio of a dark portion with respect to a period of a bright portion is less than 1. With this, even when outside light is dark, the transmitter can transmit the aforementioned signal by luminance change of bright and large contrast. Conversely, when outside light that passed through the liquid crystal board 9140b is bright, the transmitter, as illustrated in (c) in FIG. 17, changes the transmittance of the liquid crystal board 9140b with the frequency so that the ratio of a period of a dark portion with respect to a period of a bright portion is more than 1. With this, even when outside light is too bright, the transmitter can transmit the aforementioned signal by luminance change of appropriately controlled contrast.

With this, regardless of whether the outside light is bright or dark, the same signal can be appropriately transmitted. In other words, Fourier series expansion is performed on the process of the transmittance illustrated in FIG. 17, the brightness is adjusted so that the term of the largest coefficient is not changed. It should be noted that the transmitter does not have to be a rectangular wave illustrated in FIG. 17, and may control the transmittance of the liquid crystal board 9140b according to a sine wave.

FIG. 18 is a diagram illustrating a spectrum of a luminance change of a liquid crystal board obtained by control of transmittance by the transmitter in the present embodiment.

For example, as illustrated in (a) in FIG. 18, when the transmittance is changed according to a rectangular wave so that the ratio of a period of a bright portion and a period of a dark portion is 1:1, a signal component and a rectangular component appear in the spectrum of luminance change. The signal component is a component that indicates a frequency of a rectangular wave, and the rectangular component is a component that appears due to a difference between the rectangular wave and a sine wave.

Moreover, as illustrated in (b) in FIG. 18, when the transmittance is changed according to a rectangular wave so that the ratio of a period of a bright portion and a period of a dark portion is 3:1, a signal component and a rectangular component as well as an asymmetric component appear in the spectrum of luminance change. The asymmetric component is a component that appears because the rectangular wave is asymmetric. It should be noted that also when the ratio of a period of a bright portion and a period of a dark portion is 3:1, the spectrum of luminance change is the same as the spectrum illustrated in (b) in FIG. 18.

Moreover, as illustrated in (c) in FIG. 18, when the transmittance is changed according to a rectangular wave so that the ratio of a period of a bright portion and a period of a dark portion is 7:1, a signal component and a rectangular component as well as an asymmetric component appear in the spectrum of luminance change. It should be noted that also when the ratio of a period of a bright portion and a period of a dark portion is 1:7, the spectrum of luminance change is the same as the spectrum illustrated in (c) in FIG. 18.

Here, a frequency of the asymmetric component and a frequency of the rectangular component is higher than a frequency of the signal component. Therefore, by imaging the liquid crystal board in which the luminance change is performed by the transmittance control, the receiver obtains only the lowest frequency among the frequencies of the components (peaks) that appear in the spectrum of luminance change, as a frequency indicating a signal to be transmitted.

As described above, the transmitter and the transmitting method according to an aspect of the present disclosure have been described with reference to Embodiment 1. The transmitter and the transmitting method according to an aspect of the present disclosure are not limited to only the configuration of Embodiment 1.

FIG. 19A is a block diagram illustrating a configuration of a transmitter according to an aspect of the present disclosure.

A transmitter 100 in the present embodiment is a transmitter that transmits a signal to the receiver 9140a by changing the amount of light emitted, and includes a control unit 101 that generates a control voltage corresponding to a signal to be transmitted, a reflector 102 that reflects sunlight, and a liquid crystal board 103 that receives reflected light that is sunlight reflected by the reflector 102 and changes, according to a control voltage, the amount of light emitted toward the receiver 9140a by allowing the reflected light to pass through. It should be noted that the reflector 102 does not have to be included in the transmitter 100. In other words, the transmitter 100 in the present embodiment is a transmitter that transmits a signal to the receiver 9140a by changing the amount of light emitted, and includes a control unit 101 that generates a control voltage corresponding to a signal to be transmitted, and a liquid crystal board 103 that receives sunlight and changes, according to a control voltage, the amount of light emitted toward the receiver 9140a by allowing the sunlight to pass through.

FIG. 19B is a block diagram illustrating a configuration of a transmitting method according to an aspect of the present disclosure.

A transmitting method according to an aspect of the present disclosure is a transmitting method of transmitting a signal to the receiver 9140a by changing the amount of light emitted, and includes a voltage generation step S101 of generating a control voltage corresponding to a signal to be transmitted, and a transmittance control step S103 of receiving, through a liquid crystal board, reflected light that is sunlight reflected by a reflector, and changing, according to a control voltage to be applied to the liquid crystal board, the amount of light emitted toward the receiver 9140a by allowing the reflected light to pass through the liquid crystal board. It should be noted that in the transmittance control step S103, without using the reflection board as described above, the amount of light emitted toward the receiver 9140a may be changed by allowing sunlight directly irradiated to the liquid crystal board to pass through the liquid crystal board.

With this, the transmitter and the transmitting method according to an aspect of the present disclosure make it possible to perform visible light communication using sunlight and do not need a light source for visible light communication, thus making it difficult to be affected by structural constraints.

Embodiment 2

(Application to Shopping Cart)

FIGS. 20A to 22 are each a diagram illustrating an information communication method (signal receiving method) in Embodiment 2.

Figure 20A:
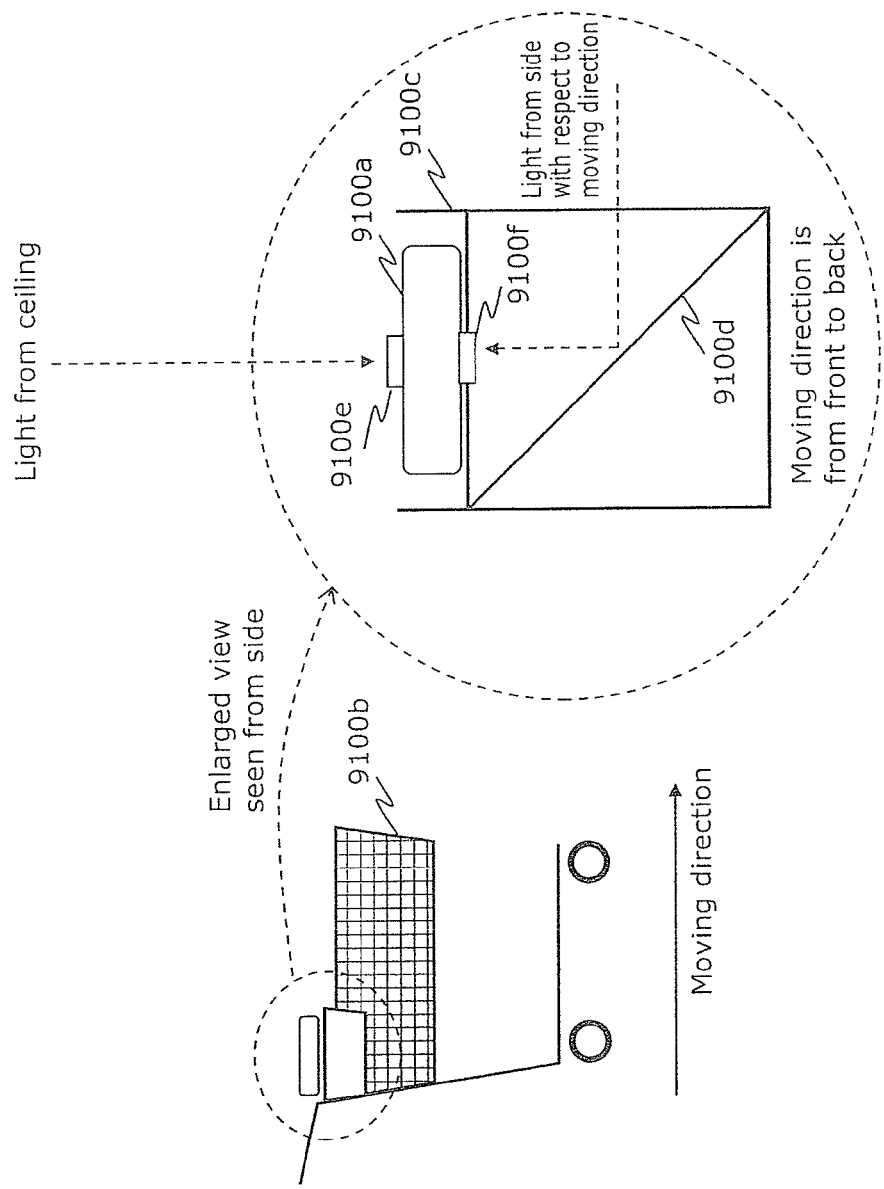
FIG. 20A is a diagram illustrating an example of an application of an information communication method in Embodiment 2 to a shopping cart.

As illustrated in FIG. 20A, a shopping cart 9100b in the present embodiment includes a setting board 9100c. The setting board 9100c has a structure in which a receiver 9100a which is configured as a smartphone (multifunctional mobile phone), for example, is installed in the upper part, and includes a reflection board 9100d in the lower part. Light incident from the side with respect to a moving direction of the shopping cart 9100b is reflected as reflected light in an upper direction with respect to the reflection board 9110d.

Figure 20B:
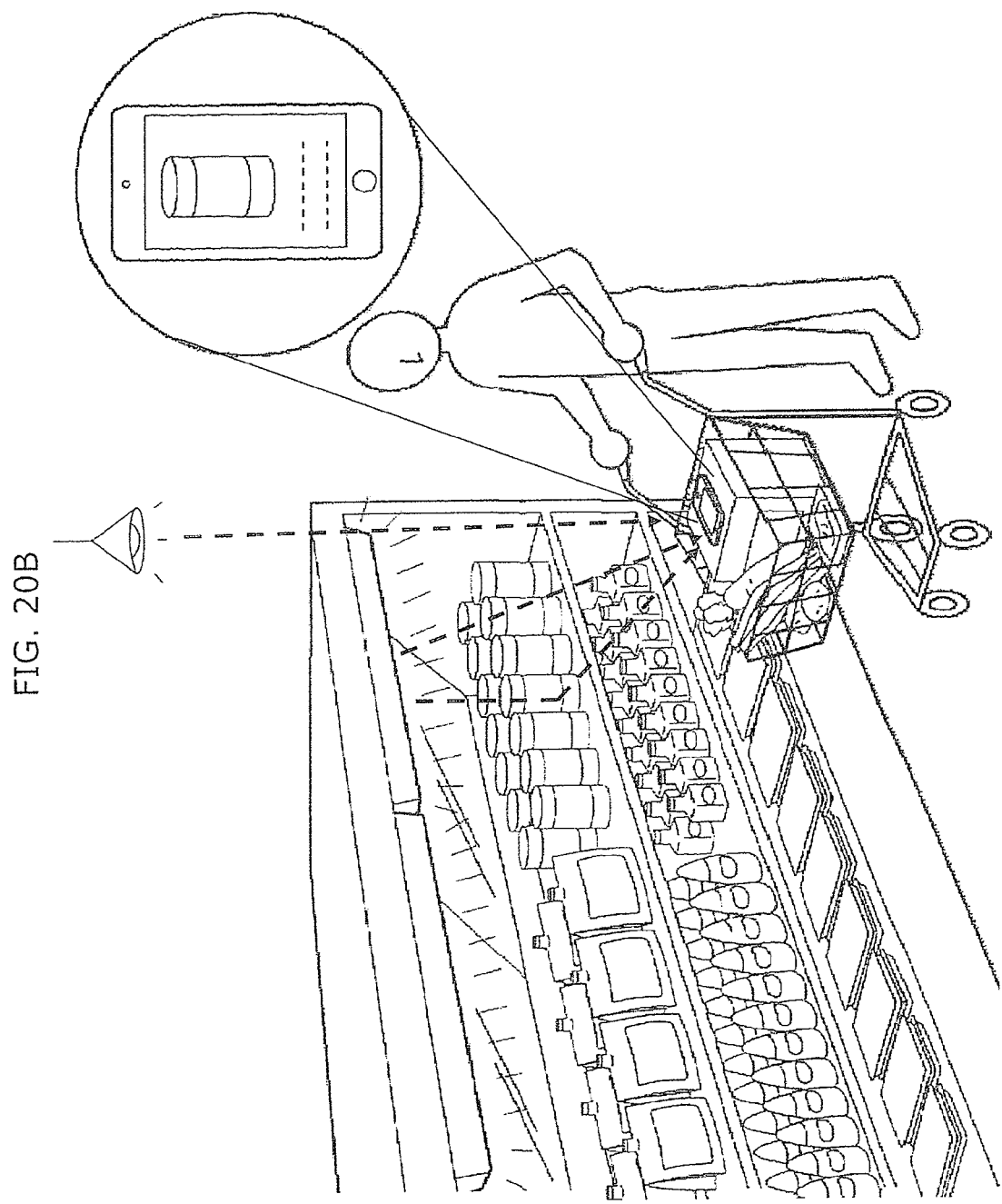
FIG. 20B is a diagram illustrating an example of an application of the information communication method in Embodiment 2 to a shopping cart.

The receiver 9100a includes receiving units 9100e and 9100f that capture an image or receive light. The receiver 9100a receives a signal indicated by the reflected light using the receiving unit 9100f provided on the lower surface. Moreover, the receiver 9100a receives a signal indicated by light from a transmitter configured as a ceiling lighting device provided in the upper surface, for example, by the receiver 9100e provided in the upper surface. The receiver 9100a, as illustrated in FIG. 20B, notifies, to the user, sale information and detailed information about a product, for example, by displaying information on the display according to the received signal and by reproducing sound.

Figure 21:
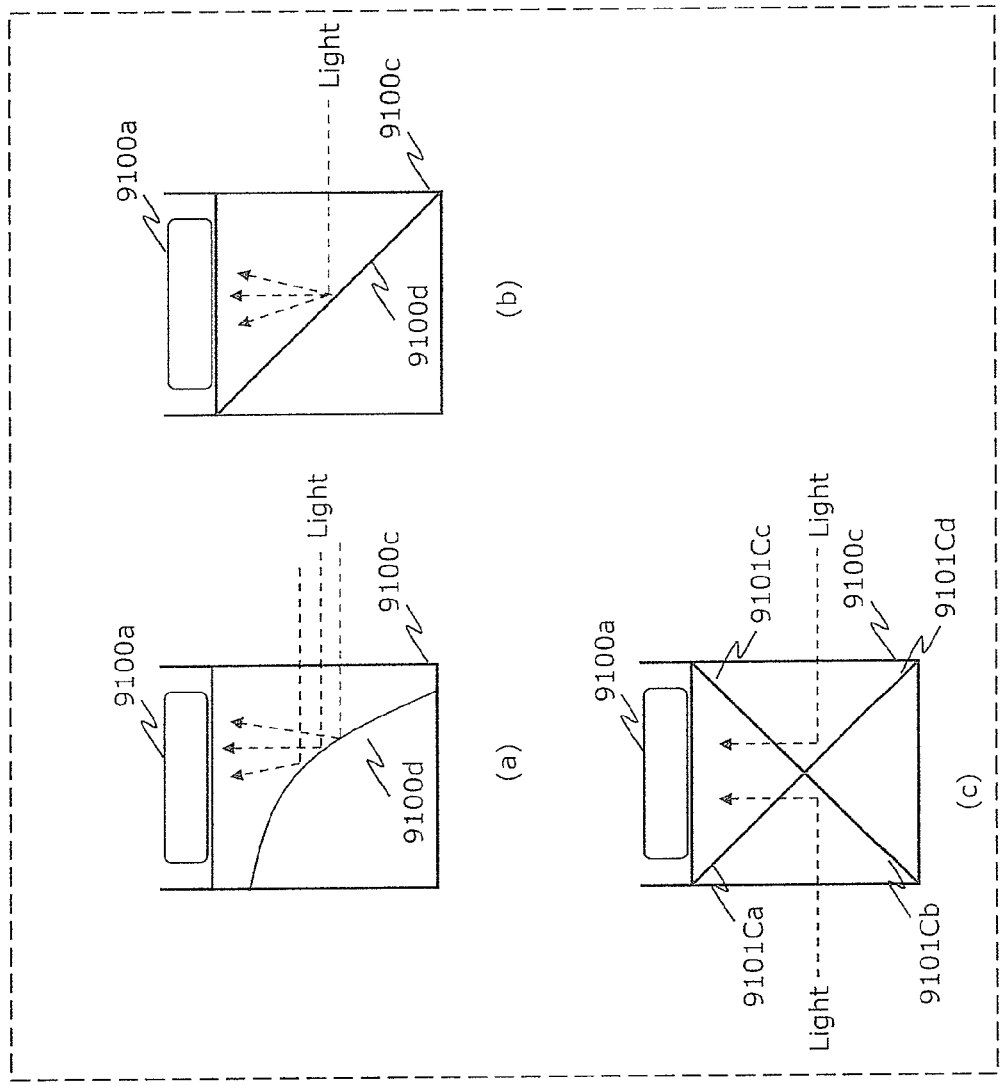
FIG. 21 is a diagram illustrating an example of an application of the information communication method in Embodiment 2 to a shopping cart.

As illustrated in (a) in FIG. 21, the reflection board 9100d may be shaped in convex. With this, since the receiver 9100a can receive light from a light source via the reflection board 9100d more widely compared with when the reflection board 9100d is planar, the receiver 9100a can capture an image having the light source largely projected. With this, it is possible to receive a signal from a light source at a distance, and increase a receiving speed.

As illustrated in (b) in FIG. 21, the reflection board 9100d may have diffuse reflection of light. With this, since the receiver 9100a can receive light from a light source via the reflection board 9100d more widely compared with when the reflection board 9100d has specular reflection of light, the receiver 9100a can capture an image having the light source largely projected. With this, it is possible to receive a signal from a light source at a distance, and increase a receiving speed.

As illustrated in (c) in FIG. 21, the setting board 9100c may include a half mirror 9101Ca, a half mirror 9101Cc, a reflection board 9101Cb, and a reflection board 9101Cd, instead of the reflection board 9100d. With this, a signal indicated by light incident from both sides can be received by the receiver 9100a.

The user causes the receiver 9100a to image barcode and label of the product, and the receiver 9100a displays the information of the imaged product on the display.

Moreover, the receiver 9100a stores the captured product as a product on the shopping list. The receiver 9100a passes the information about the product on the shopping list to a checkout counter by communicating, with the checking counter, using visible light communication, radio wave communication, or near field communication. This can remove a checking operation at the checkout counter, thus making it possible to quickly complete the purchasing process. Moreover, when the user pays the bill by credit card or electronic money that is associated with the receiver 9100a, the communication with the checkout counter is not necessary. The receiver 9100a obtains the weight of the product on the shopping list from a server, and then passes the weight to the shopping cart 9100b. The shopping cart 9100b includes a weighing unit, and checks whether or not the weight measured by the weighing unit and the weight of the product on the shopping list are equal to each other. When the weights are not equal to each other, the weighing unit notifies this to the receiver 9100a, and then issues a warning. The weighing unit may be included in the checkout counter instead of the shopping cart 9100b. In this case, the receiver 9100a notifies the weight of the product on the shopping list to the checkout counter. Moreover, the receiver 9100a may notify only the product on the shopping list to the checkout counter, and then the checkout counter may measure the weight.

Figure 22:
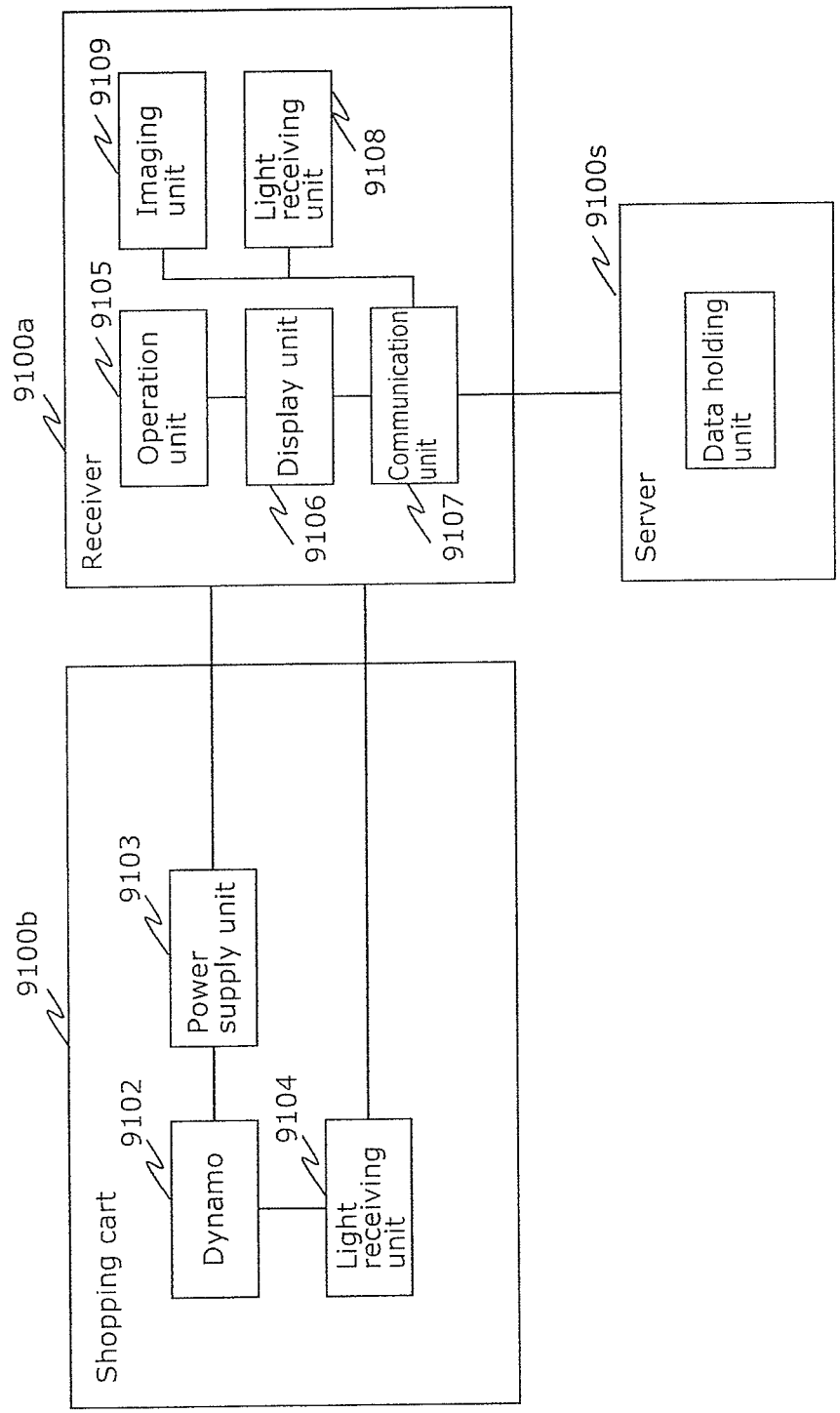
FIG. 22 is a configuration diagram of a receiver and a shopping cart used in the information communication method in Embodiment 2.

FIG. 22 is a block diagram of the receiver 9100a and the shopping cart 9100b.

The shopping cart 9100b includes a dynamo 9102, a power supply unit 9103, and a light receiving unit 9104. The dynamo 9102 generates power using force when the user pushes the shopping cart 9100b. Using the generated power, the light receiving unit 9104 performs communication with the receiver 9100a, and receives a signal indicated by light from a transmitter such as a ceiling lighting device. Moreover, the power supply unit 9103 operates as a charger of the receiver 9100a, by transmitting the surplus power of the power generated by the dynamo 9102.

The receiver 9100a includes an operation unit 9105, a display unit 9106, a communication unit 9107, a light receiving unit 9108, and an imaging unit 9109. The operation unit 9105 receives an operation on the receiver 9100a and the shopping cart 9100b by the user. The display unit 9106 displays an image according to the operation received by the operation unit 9105. Each of the light receiving unit 9108 and the imaging unit 9109 is the aforementioned receiving unit 9100e or the aforementioned receiving unit 9100f, and images an image or receives light. By communication with a server 9100s that is the aforementioned server, the communication unit 9107 obtains, for example, the product on the shopping list held in a data holding unit of the server 9100s.

Figure 23:
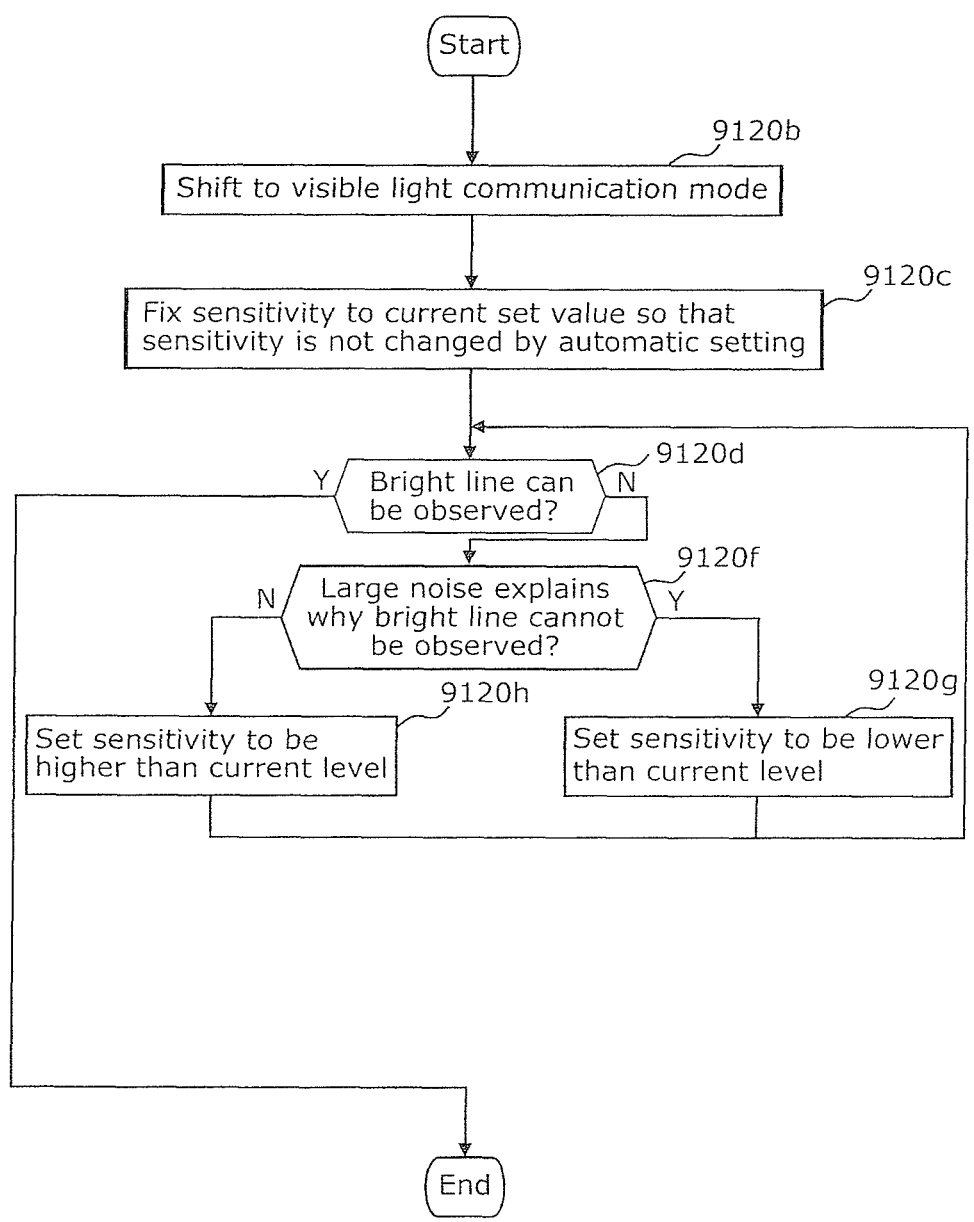
FIG. 23 is a flowchart illustrating another example of an operation of the receiver in Embodiment 2.

FIG. 23 is a flowchart illustrating another example of an operation of the receiver 9100a.

First, the receiver 9100a shifts to a visible light communication mode in Step 9120b. Next, in Step 9120c, the receiver 9100a fixed the sensitivity to the current set value so that the sensitivity of the light receiving unit included in the receiver 9100a is not changed by automatic setting. Then, in Step 9120d, the receiver 9100a determines whether or not a bright line can be observed. When it is determined that the bright line can be observed (Y in Step 9120d), the receiver ends a setting process of the sensitivity for visible light communication. When the bright line cannot be observed (N in Step 9120d), the receiver 9100a determines in Step 9120f whether or not large noise explains why the bright line cannot be observed. When it is determined that large noise explains why the bright line cannot be observed (Y in Step 9120f), in Step 9120g, the receiver 9100a repeats the process of Step 9120d by setting the sensitivity of the light collecting unit to a value lower than the current set value (low sensitivity). When it is determined that large noise does not explain why the bright line cannot be observed (N in Step 9120f), in Step 9120h, the receiver 9100a repeats the process of Step 9120d by setting the sensitivity of the light collecting unit to a value higher than the current set value (high sensitivity).

Embodiment 3

(Museum Service)

Figure 24:
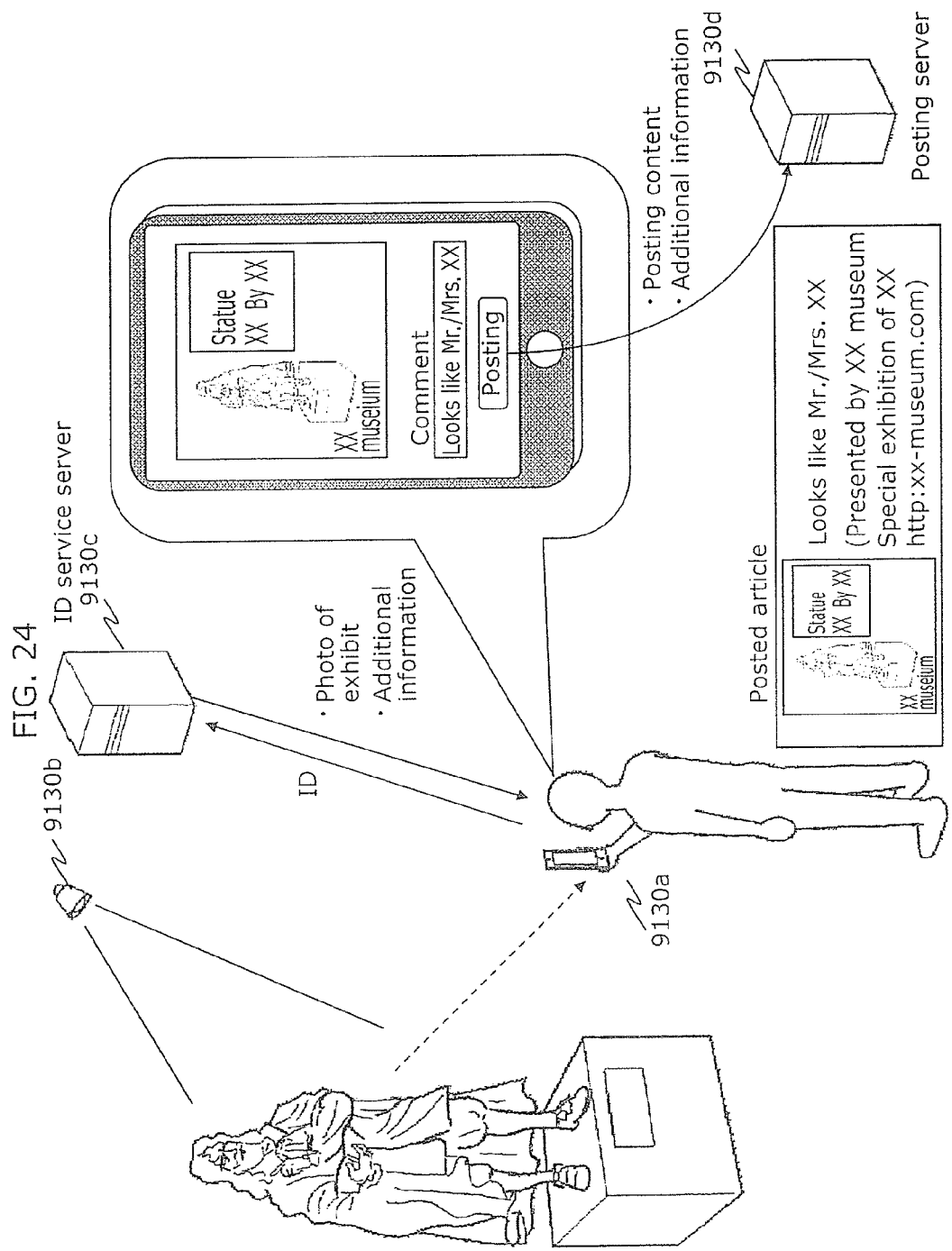
FIG. 24 is a diagram illustrating an example of control of a signal transmitting and receiving system in Embodiment 3.

FIG. 24 is a diagram illustrating an example of a signal transmitting and receiving system in Embodiment 3.

This signal transmitting and receiving system includes a receiver 9130a, a transmitter 9130b, an ID service server 9130c, and a posting server 9130d. The transmitter 9130b illuminates an exhibit and its surrounding area with light including a visible light signal. The receiver 9130a is configured as the smartphone, for example, and receives a visible light signal from the transmitter 9130b by imaging the exhibit with light that is illuminated by the transmitter 9130b, that is, by imaging light that is emitted from the transmitter 9130b and is reflected by the exhibit. The receiver 9130a transmits, to the ID service server 9130c, information indicated by the received visible light signal (for example, ID). Then, by using the information as a key, the receiver 9130a obtains information about an exhibit, an exhibition facility, and the like (for example, the photo of the exhibit and additional information) from the ID service server 9130c, and displays the information on the screen. According to an operation by the user via the screen, the receiver 9130a adds the obtained information about the exhibit and the like to a user's comment, and then posts it to a posting server 9130d. With this, the posting server 9130d discloses, as the posted article via a communication line network, the photo of the exhibit, a user's comment, and additional information (for example, URL: Uniform Resource Locator indicating a Web site of the exhibition facility, such as an art museum, which displays the exhibit) that are indicated by the information. Moreover, the receiver 9130a displays the comment posted by another user.

(Control of Directional Speaker)

Figure 25:
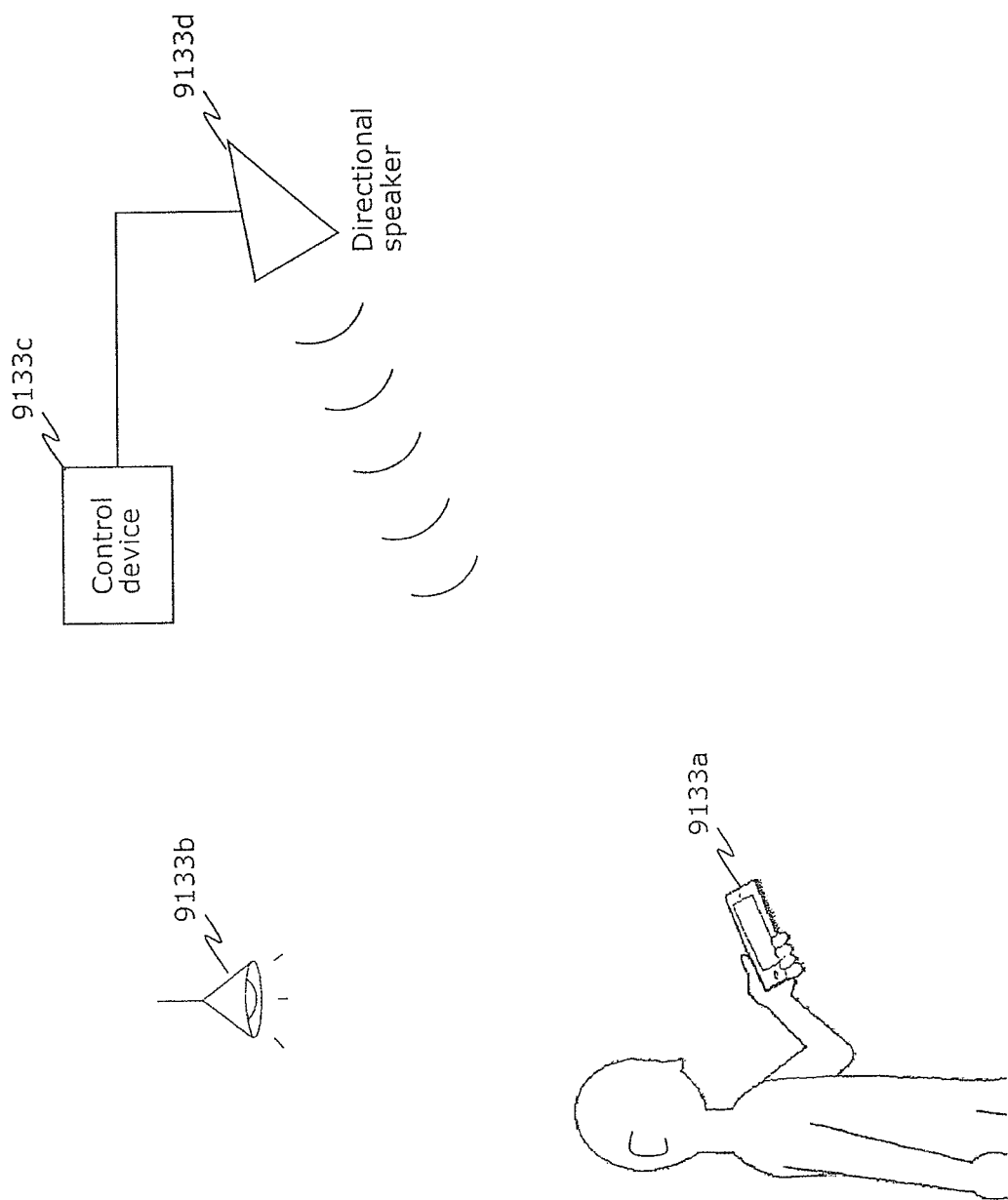
FIG. 25 is a diagram illustrating another example of control of a signal transmitting and receiving system in Embodiment 3.

FIG. 25 is a diagram illustrating another example of a signal transmitting and receiving system in Embodiment 3.

This signal transmitting and receiving system includes a receiver 9133a, a transmitter 9133b, a control device 9133c, and a directional speaker 9133d. The transmitter 9133b is configured as a lighting device that illuminates the surrounding area, and transmits a signal (visible light signal) by luminance change. The receiver 9133a is configured as a smartphone, for example, and receives a signal from the transmitter 9133b by imaging the transmitter 9133b with the light receiving unit (imaging unit) included in the receiver 9133a. Then, the receiver 9133a estimates self-position that is a process of estimating the position of the receiver 9133a, using the position of the transmitter 9133b indicated by the signal, for example. For example, the receiver 9133a estimates self-position based on the position and size of the transmitter 9133b indicated by the received signal, the position, size, and orientation in the image of the transmitter 9133b which is projected by image capture by the light receiving unit. Moreover, the receiver 9133a images the user's face, and estimates a position and orientation of the user's face viewed from the receiver 9133a, based on the position and orientation of the user's face which is projected in an image obtained by the imaging. As a result, the receiver 9133a identifies the position and orientation of the user's face in a space in which the signal transmitting and receiving system is disposed (global coordinate system), based on the position of the receiver 9133a obtained by self-position estimation, and the position and orientation of the user's face viewed from the receiver 9133a. The receiver 9133a transmits, to the control device 9133c, information indicating the position and orientation of the user's face. The control device 9133c identifies, on reception of the information, a position of the user's ears in a global coordinate system. Then, the control device 9133c directs an output direction of sound of the directional speaker 9133d to the identified position (the user's ears). With this, the directional speaker 9133d can convey, to the user, the sound information about the exhibit that the user is watching and the content designated by the user, by limiting the target to the user.

(Transmission by Inserting Non-Signal Period)

Figure 26:
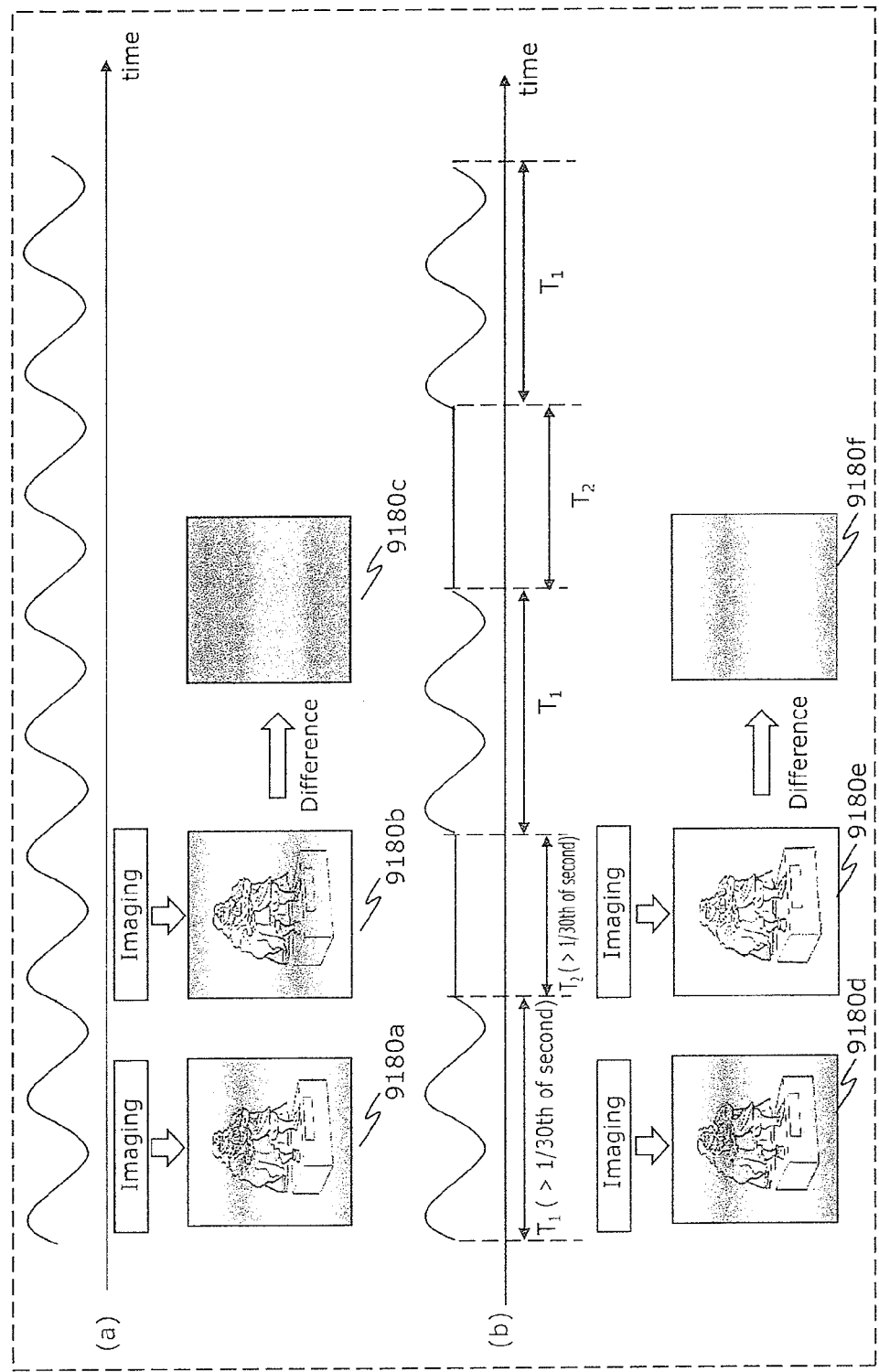
FIG. 26 is a diagram illustrating an example of a signal format in Embodiment 3.

FIG. 26 is a diagram illustrating an example of a signal format in Embodiment 3.

As illustrated in (a) in FIG. 26, the transmitter transmits a signal of a frequency-ID method that indicates specific information at a frequency of specific luminance change. The receiver obtains two images 9180a and 9180b by imaging them at a different timing. In these images, contrast of light and dark due to luminance change of the transmitter appears across the board as a signal that is transmitted from the transmitter, and a landscape (image of the exhibit) also appears. Here, the transmitter obtains an image 9180c in which a landscape is removed, by taking a difference between the two captured images 9180a and 9180b. However, the difference image 9180c is superimposed with a signal when the image 9180a and the image 9180b are captured.

Therefore, as illustrated in (b) in FIG. 26, the transmitter may set a period in which no signal is transmitted. With this, the receiver can obtain a difference image 9180f on which no signal is superimposed. In other words, the receiver obtains an image 9180d in which the contrast of light and dark appears along with the landscape, by imaging in a period in which a signal is transmitted by the transmitter. Furthermore, the receiver obtains an image 9180e in which only the landscape appears, by imaging, through the transmitter, in a period in which no signal is transmitted. Therefore, the receiver can obtain, as the difference image, an image 9180f from which the landscape is removed and on which a plurality of signals are not superimposed by taking the difference between the image 9180d and the image 9180e.

By extending time T1 in which a signal is transmitted and time T2 in which a signal is not transmitted to be longer than a time in which the receiver images an image (many of the cameras have ⅓₀th of a second), it is possible to definitely obtain an image such as the difference image 9180f. It should be noted that in the signal non-transmission period, a high frequency that cannot be recognized by the exposure time set in the receiver may be used, instead of not transmitting a signal. With this, even when the transmitter cannot express halftone, average luminance of an image in the signal transmission period and an image in the signal non-transmission period can be equal. Moreover, since the luminance can be continuously changed, flicker can be reduced. Moreover, even in the case of a frequency shift keying (FSK) modulation method in which a signal is expressed by changing the frequency, the same advantageous effect can be obtained from this configuration. In the case of the FSK modulation method, by inserting an interval in which a signal is not transmitted at a timing of a frequency shift, an advantageous effect of notifying the timing of a frequency shift to the receiver can be obtained. In this case, the signal non-transmission period T2 may be a length of no less than one cycle of a signal before the shift.

(Phase Modulation)

Figure 27:
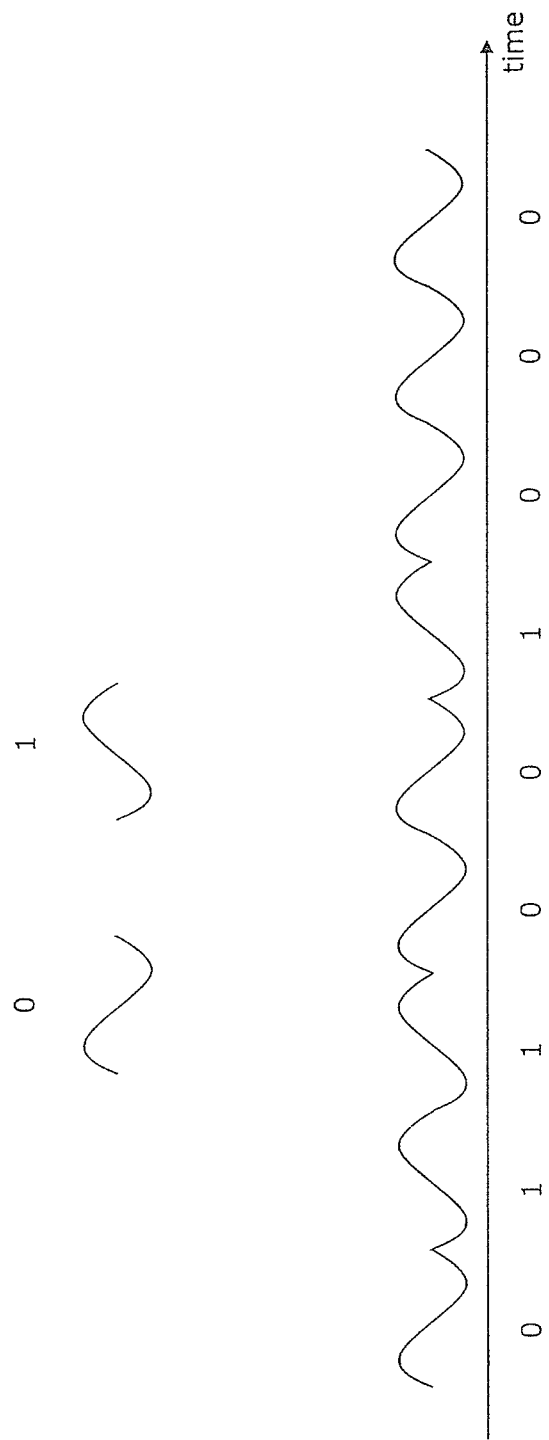
FIG. 27 is a diagram illustrating an example of the signal format in Embodiment 3.

FIG. 27 is a diagram illustrating another example of a signal format in Embodiment 3.

The transmitter expresses a signal by changing the phase according to time. In other words, the transmitter transmits a signal indicating 0 through luminance change according to a waveform of a cycle in a predetermined phase and transmits a signal indicating 1 through luminance change according to a waveform of a cycle in a phase different from the phase by 180 degrees.

(Combined Use of Phase Modulation and Frequency Modulation)

Figure 28:
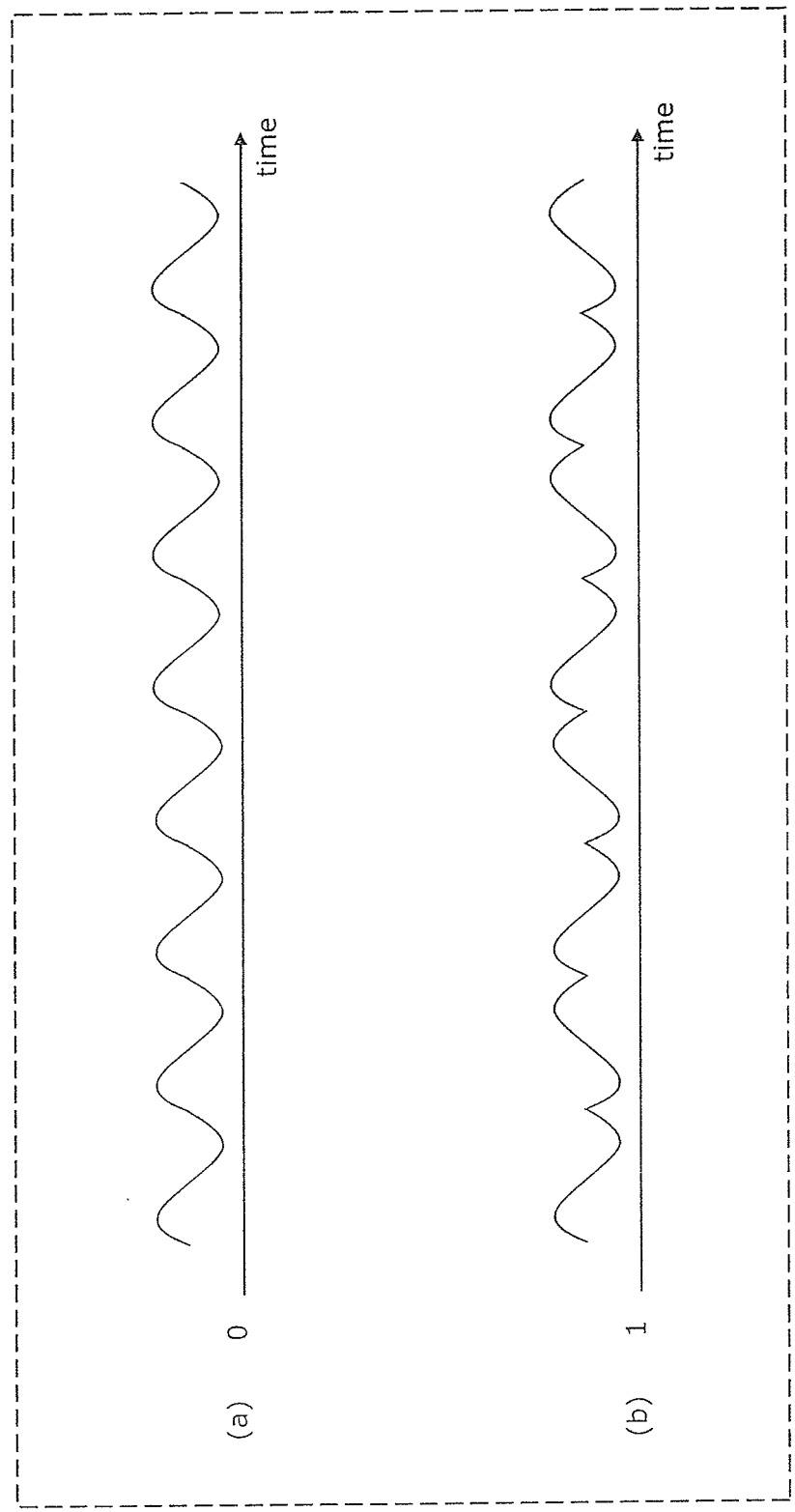
FIG. 28 is a diagram illustrating another example of the signal format in Embodiment 3.

FIG. 28 is a diagram illustrating another example of a signal format in Embodiment 3.

As illustrated in (a) in FIG. 28, the transmitter transmits a signal indicating 0 through luminance change without changing a phase. As illustrated in (b) in FIG. 28, the transmitter transmits a signal indicating 1 through luminance change by changing the phase at every cycle by 180 degrees. By the combined use of the signal format and a frequency modulation illustrated in FIG. 28, this transmitter can transmit a signal having 1 bit more than when only the frequency modulation is used. Moreover, by increasing the number of change patterns of the phase and the number of cycle patterns for changing the phase, the transmitter can transmit a more amount of information.

(Frequency Pattern Used in FSK Modulation Method)

Figure 29:
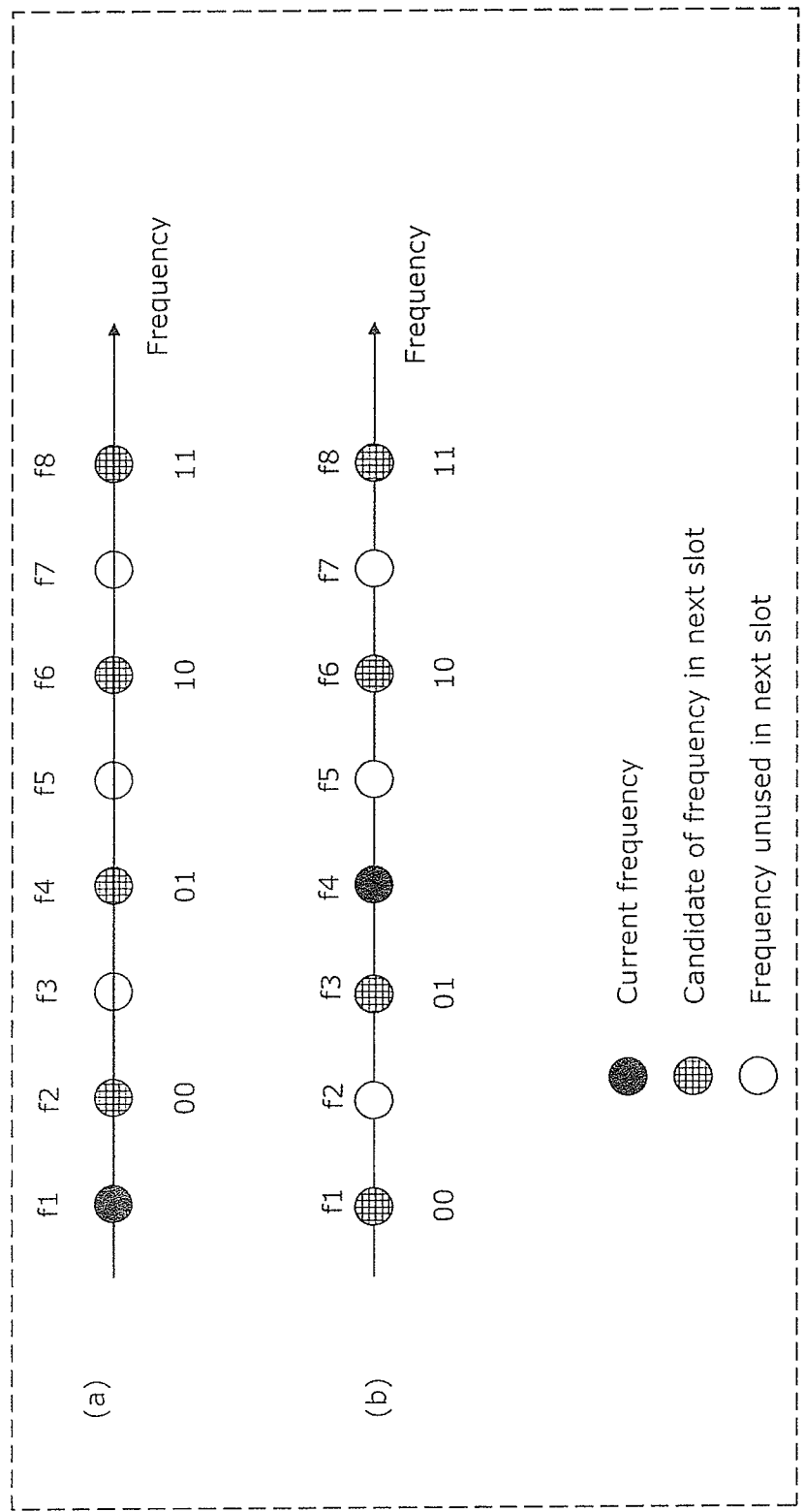
FIG. 29 is a diagram illustrating another example of the signal format in Embodiment 3.

FIG. 29 is a diagram illustrating another example of a signal format in Embodiment 3.

The transmitter transmits a signal according to a FSK modulation method. Specifically, as illustrated in FIG. 29, the transmitter transmits, through luminance change using eight frequencies f1 to f8, a signal identified by each of the frequencies. Here, as illustrated in (a) in FIG. 29, when a signal "00" is transmitted during luminance change at the frequency f1, the transmitter transmits the signal by changing the frequency f1 of the luminance change to the frequency f2. Similarly, when a signal "01" is transmitted during luminance change at the frequency f1, the transmitter transmits the signal by changing the frequency f1 of the luminance change to the frequency f2. Here, as illustrated in (b) in FIG. 29, when a signal "00" is transmitted during luminance change at the frequency f4, the transmitter transmits the signal by changing the frequency f4 of the luminance change to the frequency f1. Similarly, when a signal "01" is transmitted during luminance change at the frequency f4, the transmitter transmits the signal by changing the frequency f4 of the luminance change to the frequency f3.

The four frequencies selected from among the frequencies f1 to f8 according to a frequency of the current luminance change is allocated to "00", "01", "10", and "11", respectively. The current frequency is not included in the selected four frequencies, and among the eight frequencies f1 to 48, the frequencies that are adjacent to each of the selected four frequencies are not used. It should be noted that the luminance change by any of the frequencies f1 to f8 is performed at every slot that is a unit time.

When this receiver does not use the same frequency continuously, the receiver can definitely recognize a shift of slot (timing of frequency shift). Moreover, since the cycle of shift does not have to be strictly determined, it is possible to use an inexpensive clock device. Moreover, the cycle of shift can be indefinite and information can be embedded in the cycle of shift.

Furthermore, by setting the frequencies having a possibility of being used at the next slot not to be adjacent to each other, the number of receiving errors can be reduced.

Moreover, in the FSK modulation method, a start signal indicating the start point of a signal is necessary. By determining, as a start signal, a state in which the luminance is not changed for a constant period of time or a state in which the luminance change is underway at a fast speed unrecognized by the receiver, it is possible to make effective use of a frequency recognizable by the receiver and to extend the expression range of a signal.

(Crossfade of Frequency Shift)

Figure 30:
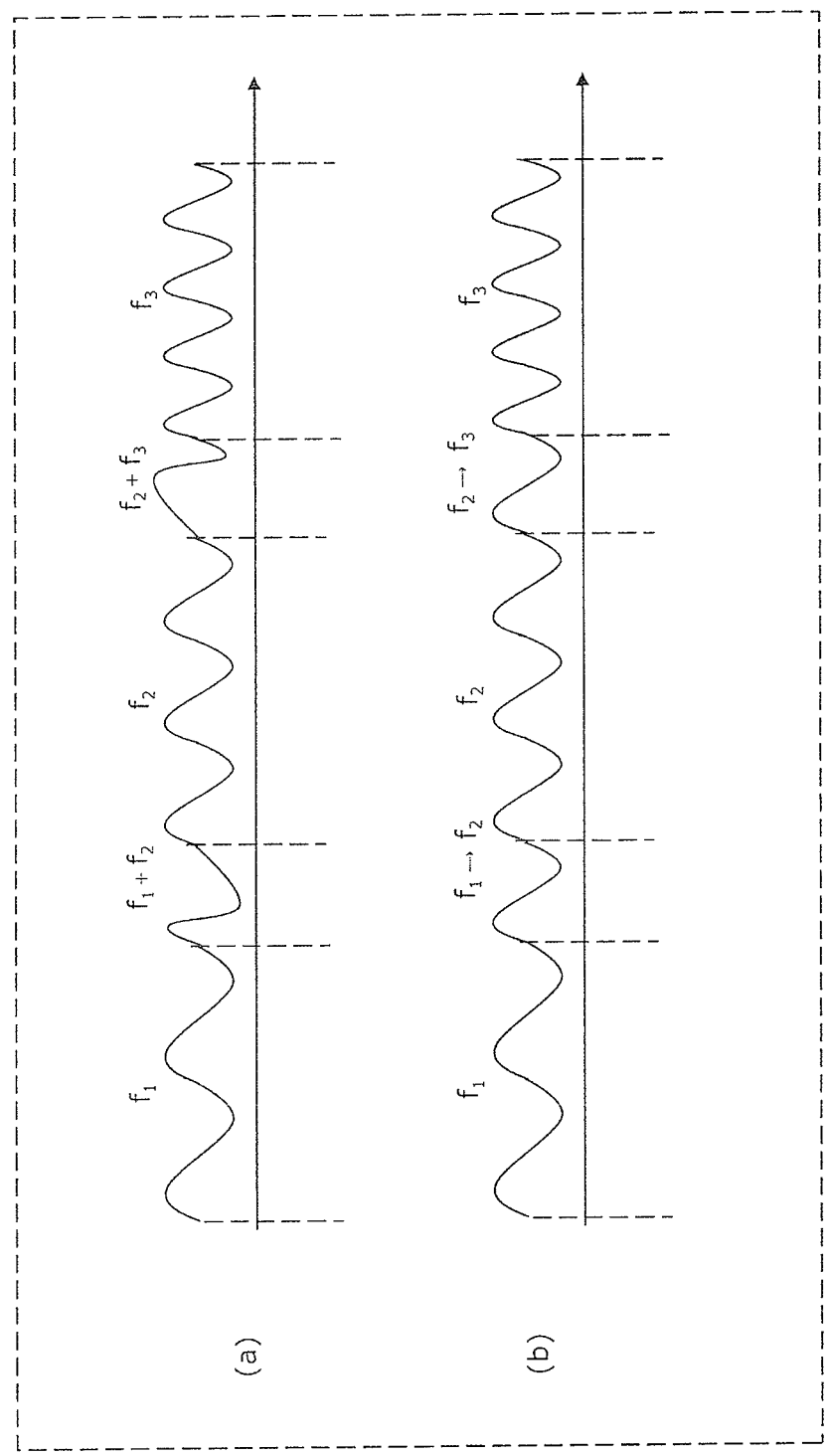
FIG. 30 is a diagram illustrating another example of the signal format in Embodiment 3.

FIG. 30 is a diagram illustrating another example of a signal format in Embodiment 3.

When a frequency of luminance change is rapidly changed, there is flicker when seen with the human eye. In view of this, as illustrated in (a) in FIG. 30, the transmitter performs crossfade of the frequency f1 and the frequency f2 when the frequency f1 of luminance change is changed to the frequency f2. As described above, this flicker can be reduced by shifting during crossfade of the frequency before and after the shift. Moreover, as illustrated in (b) in FIG. 30, the transmitter gradually bring the frequency f1 closer to the frequency f2 when the frequency f1 of luminance change is changed to the frequency f2. As described above, this flicker can be reduced even when the frequency before the shift is gradually brought closer to the frequency after the shift. By inserting a high frequency that cannot be observed by exposure time set in the receiver between the frequencies before and after the shift, flicker can be further reduced.

Embodiment 4

Figure 31:
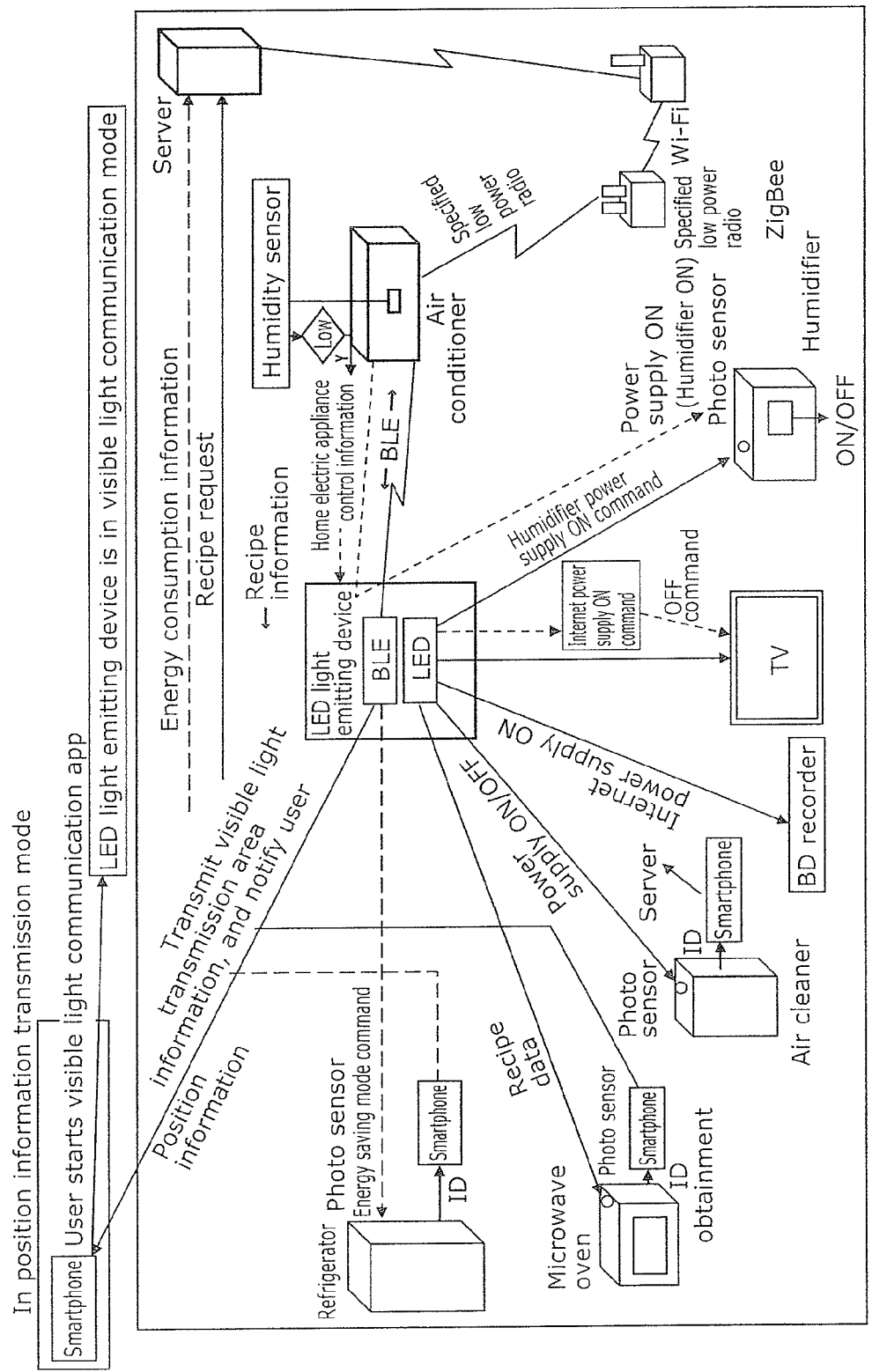
FIG. 31 is a diagram illustrating an example of a signal transmitting and receiving system in Embodiment 4.

FIG. 31 is a diagram illustrating an example of a signal transmitting and receiving system in Embodiment 4.

The signal transmitting and receiving system includes a smartphone that is a multifunctional mobile phone (smapho), an LED light emitting device that is a lighting device, a home electric appliance such as a refrigerator, and a server. The LED light emitting device performs communication using Bluetooth® Low Energy (BTLE) and visible light communication using light emitting diode (LED). For example, the LED light emitting device controls a refrigerator and communicates with an air conditioner using BTLE. Moreover, the LED light emitting device controls the power supply of a microwave oven, an air cleaner, or a television (TV), or the like, using visible light communication.

The TV includes a sunlight power generation element, and uses this sunlight power generation element as an optical sensor. In other words, when the LED light emitting device transmits a signal by luminance change, the TV detects the luminance change of the LED light emitting device with a change of power generated by the sunlight power generation element. Then, the TV obtains the signal transmitted from the LED light emitting device, by demodulating the signal indicated by the detected luminance change. The TV switches its main power supply to ON when the signal indicates a command of turning ON. The TV changes its main power supply to OFF when the signal indicates a command of turning OFF.

Moreover, the server can communicate with the air conditioner via a router and a specified low power radio station (specified low power radio). Furthermore, since the air conditioner can communicate with the LED light emitting device via BTLE, the server can communicate with the LED light emitting device. Therefore, the server can switch the main power source of the TV between ON and OFF via the LED light emitting device. Moreover, the smartphone can control the power supply of TV via the server, by communicating with the server via Wireless Fidelity (Wi-Fi).

(Microcell Method)

Figure 32:
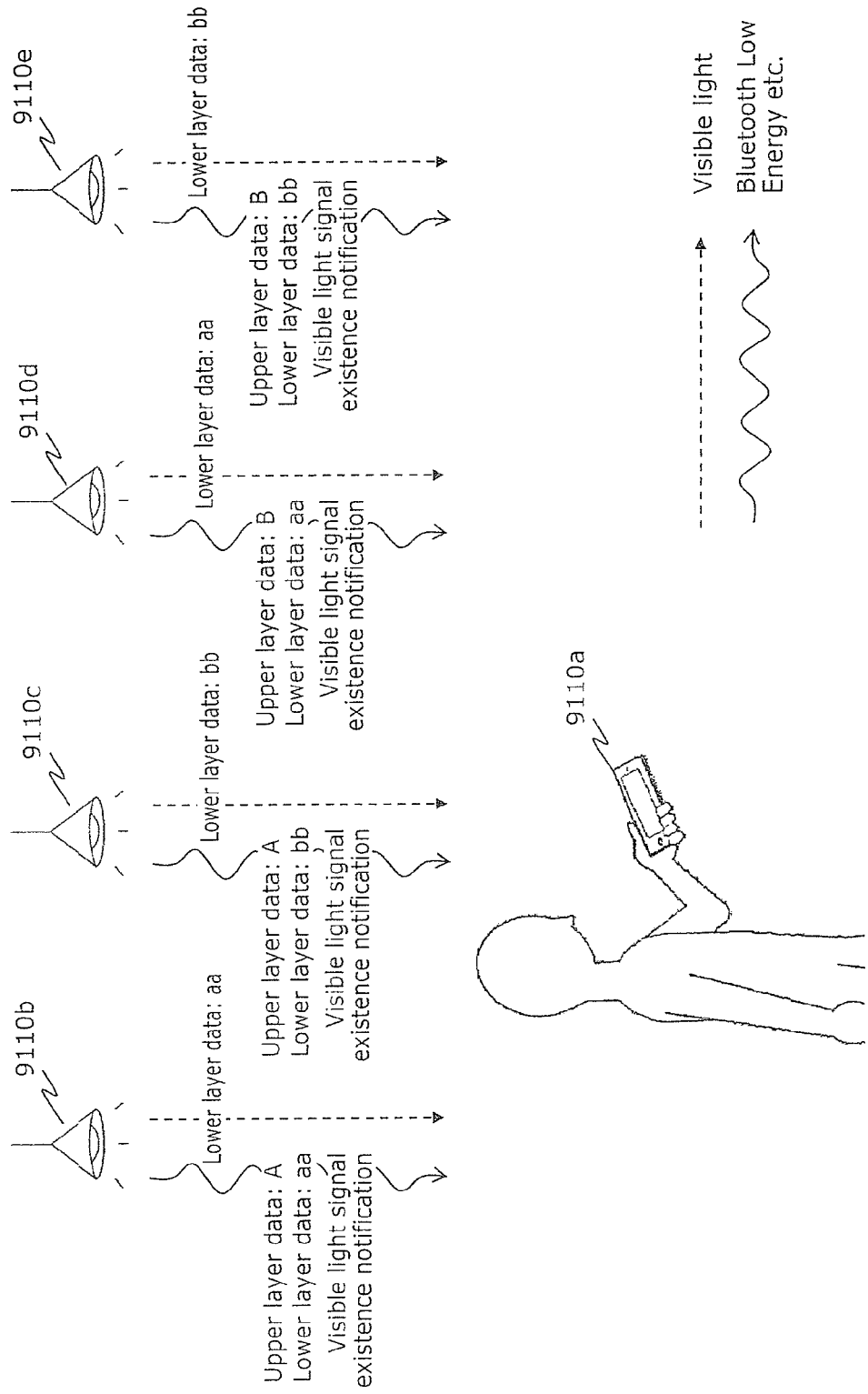
FIG. 32 is a diagram illustrating an example of a signal transmitting and receiving method in Embodiment 4.
Figure 33:
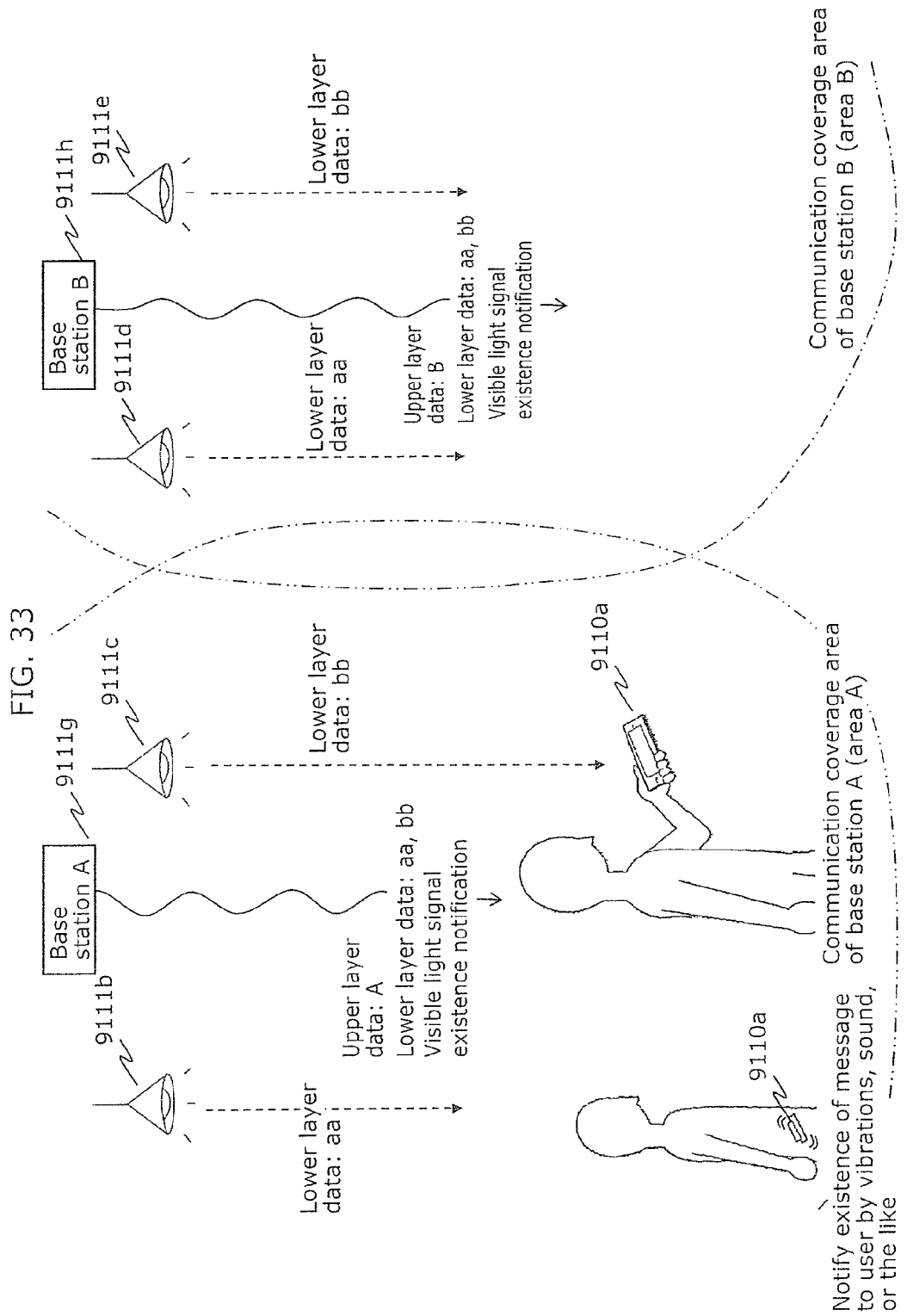
FIG. 33 is a diagram illustrating an example of a signal transmitting and receiving method in Embodiment 4.

FIG. 32 and FIG. 33 are each a diagram illustrating an example of a signal transmitting and receiving method in Embodiment 4.

For example, transmitters 9110*b* to 9110*e* configured as lighting devices transmit a signal (data) using both radio wave and visible light. For example, a protocol such as Wi-Fi, or Bluetooth® (especially, BTLE) is used for radio wave communication. When transmitting data indicating ID "Aaa" of itself, the transmitter 9110*b*, for example, divides the data into upper layer data "A" and lower layer data "a", transmits the upper layer data and the lower layer data by radio wave, and transmits only the lower layer data by visible light. When transmitting data indicating ID of itself, the transmitters 9110*c* to 9110*e* also divide the data into upper layer data "A" and lower layer data "a", transmit the upper layer data and the lower layer data by radio wave, and transmit only the lower layer data by visible light. Moreover, the transmitters 9100*b* to 9100*e* may transmit a signal indicating the transmission of data by visible light (visible light existence notification), by radio wave. It should be noted that although the transmitter 9110*b* includes a visible light transmission unit that transmits the lower layer data by visible light and a radio wave transmission unit that transmits the upper layer data and the lower layer data by radio wave in an integrated manner, the transmitter 9110*b* does not have to include the radio wave transmission unit as illustrated in FIG. 33. When a transmitter such as the transmitter 9110*b* includes a radio wave transmission unit, it is possible to stably provide power by supplying power for operating the radio wave transmission unit from a power supply of the lighting device. Therefore, it is possible to transmit data at a high frequency and by intense radio wave, and there is no need to replace a battery. Meanwhile, when a transmitter such as the transmitter 9111*b* does not include a radio wave transmission unit, it is possible to dispose the radio wave transmission unit at a position convenient for transmitting radio wave (base station A or base station B in FIG. 33, or a corresponding unit). Therefore, it is possible to increase a degree of freedom for the radio wave transmission unit that transmits the lower layer data that is the same as that of the visible light transmission unit.

For example, the receiver 9110*a* configured as a smartphone receives data transmitted each by radio wave and visible light. Since radio wave has a weaker directionality and wider transmission area than visible light, the receiver 9110*a* receives data transmitted by radio wave from the transmitters 9110*b*, 9100*c*, and 9110*d*. The data items to be received at this time are "Aaa", "Abb", and "Baa". At this time, the receiver 9110*a* can determine that the whole data to be processed among the three data items is "Abb" by receiving the lower layer data "bb" using visible light. Moreover, the receiver 9110*a*, when receiving the first "b" that is a part of the lower layer data "bb", can determine that the whole data to be processed is "Abb" and can perform the subsequent process using the data at an early time. Moreover, the receiver 9110*a*, by receiving information from the server by using these data items as a key when receiving the data items "Aaa", "Abb", and "Baa" using radio wave, can quickly perform the process such as display when the received data is determined.

With this configuration, the data amount transmitted or received using visible light can be reduced. With this, the transmitter 9110*a* can receive data at a speed faster than that of receiving the whole data using visible light. Moreover, since the data amount to be transmitted and received by visible light is reduced, it is possible to use a modulation method that can only transmit a small amount of data and a modulation method that can receive data from a distance.

It should be noted that the configuration illustrated in FIG. 33 can obtain the same advantageous effect. In an example illustrated in FIG. 33, for example, the transmitters 9110*b* to 9110*e* configured as lighting devices transmit a signal (data) using only visible light among radio wave and visible light. A transmitter 9111*g* that is the base station A transmits, by radio wave, the upper lower data "A" and the lower layer data items "aa" and "bb". A transmitter 9111*h* that is the base station B has the same configuration as that of the transmitter 9111*g*, and transmits, by radio wave, the upper lower data "B" and the lower layer data items "aa" and "bb". Moreover, the transmitters 9111*g* and 9111*h* may transmit a signal indicating the transmission of data by visible light (visible light existence notification) by radio wave. In the case of the configuration as illustrated in FIG. 33, it is possible to set a communication coverage area having a different upper layer data item according to each of the base station A and the base station B.

Figure 34:
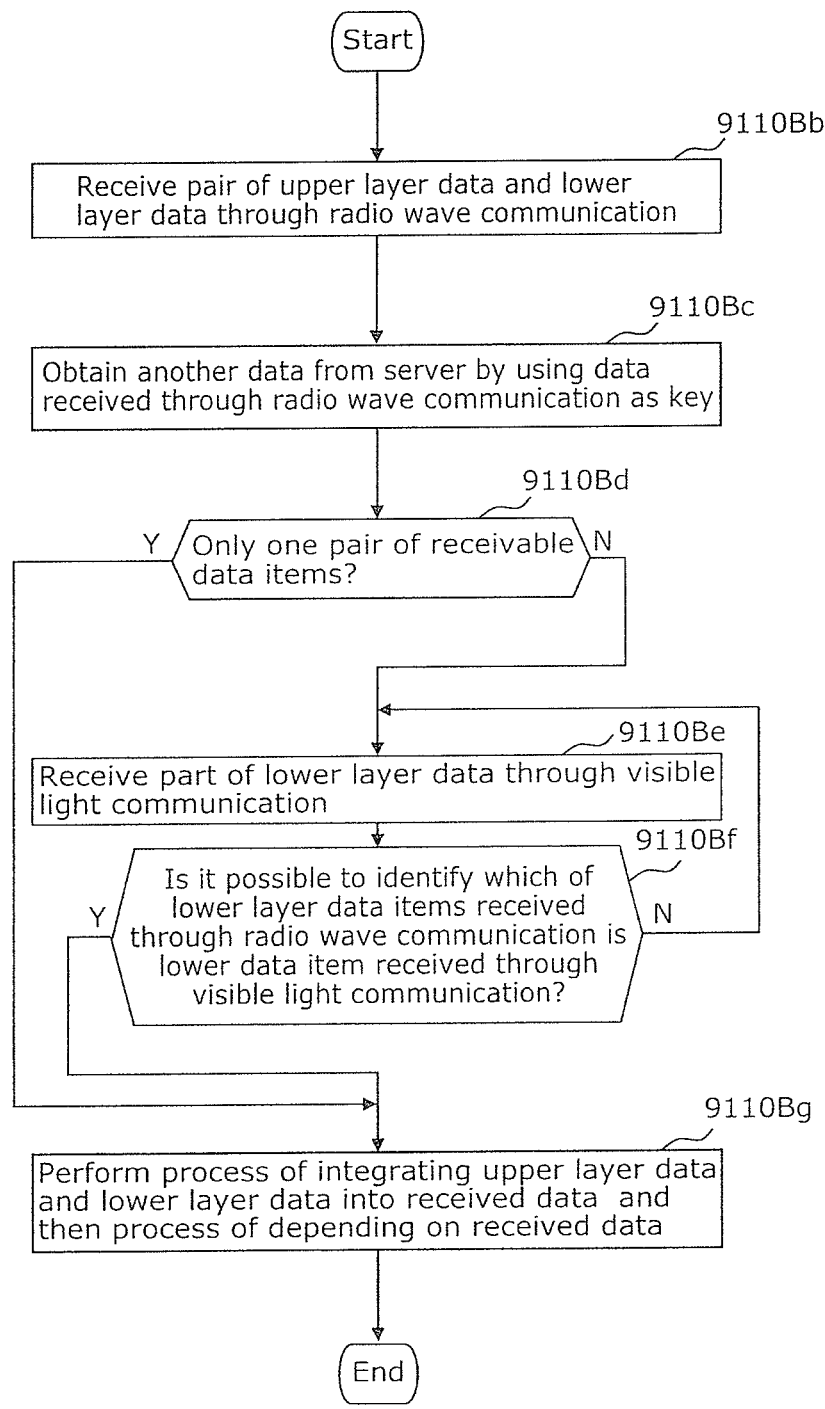
FIG. 34 is a flowchart illustrating an example of an operation of a receiver in Embodiment 4.

FIG. 34 is a flowchart illustrating an example of an operation of the receiver 9110*a*.

As illustrated in FIG. 34, the receiver 9110*a* receives one or more pairs of the upper layer data and the lower layer data in Step 9110Bb through radio wave communication. In Step 9110Bc, the receiver 9110*a* obtains another data from the server by using the data (one or more pairs) received through radio wave communication as a key. In Step 9110Bd, the receiver 9110*a* checks whether or not only one pair of data items is received in Step 9110Bb. Here, when only one pair (Y in Step 9110Bb), the receiver 9110*a* in Step 9110Bg generates received data by combining the one pair of the upper layer data and the lower layer data, and then performs a process of depending on the received data. Meanwhile, when not the one pair (N in Step 9110Bd), the receiver 9110*a* in Step 9110Be receives part of the lower layer data through visible light communication. Next, the receiver 9110*a*, in Step 9110Bf, checks whether or not it is possible to identify which of each of the pairs of lower layer data items received through radio wave communication is (part of) the lower layer data received through visible light communication. Here, when it can be identified (Y in Step 9110Bf), the receiver 9110*a* in Step 9110Bg generates the received data by combining the upper layer data belonging to the same pair of the identified lower layer data, and then performs a process of depending on the received data. Meanwhile, when it cannot be identified (N in Step 9110Bf), the receiver 9110*a* repeats the process from Step 9110Be.

FIG. 35 is a flowchart illustrating another example of an operation of the receiver 9110*a*.

The receiver 9110*a* receives data through radio wave communication such as Bluetooth Low Energy in Step 9110Bh. Next, the receiver 9110*a* in Step 9110Bi obtains, by making an inquiry to the server by using the received data as a key, information associated with the key. Then, the receiver 9110*a* in Step 9110Bj and Step 9110Bk determines whether or not (i) the obtained information belongs to information for the user of the receiver 9110*a* (first information) or information that is a type registered by the user of the receiver 9110*a* (second information), or (ii) the obtained information does not belong to any of the two. Here, when the receiver 9110*a* determines that the obtained information does not belong to any of the first information and the second information (N in Step 9110Bj and N in Step 9110Bk), the process ends without displaying the obtained information. Meanwhile, when the receiver 9110*a* determines that the obtained information belongs to the first information or the second information (Y in one of Step 9110Bj and Step 9110Bk), the receiver 9110*a* notifies the user that it has received the information, by sound, light, or vibrations, and then is placed in a visible light receiving mode in Step 9110Bl. The receiver 9110*a* that is placed in this visible light receiving mode receives data through visible light communication in Step 9110Bm. Furthermore, at this time, in Step 9110Bn, the receiver 9110*a* displays information about the obtained advertisement or coupon from the server.

(Different Use Depending on Position Recognition Accuracy)

Figure 36:
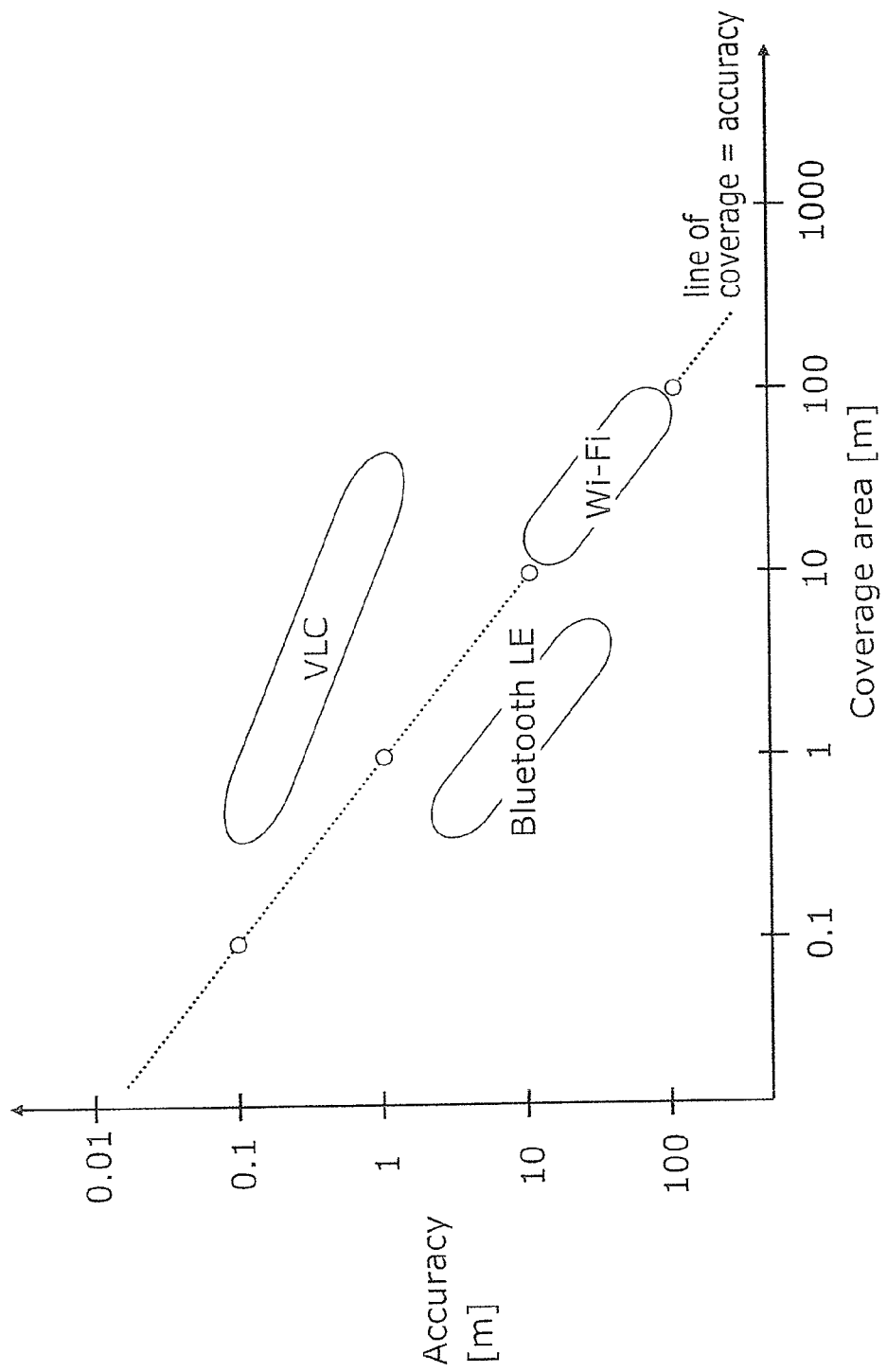
FIG. 36 is a diagram illustrating a relationship between a communication coverage distance and self-position estimation accuracy in each communication method.

FIG. 36 is a diagram illustrating a relationship between a communication coverage distance and self-position estimation accuracy in each communication method.

The communication method includes a visible light communication system in the present invention (VLC), Bluetooth (Bluetooth Low Energy), and Wi-Fi. A horizontal axis in a graph illustrated in FIG. 36 indicates a communication coverage distance (coverage area) that is a distance between the receiver and the transmitter that are communicable by adjusting the size of the light emitting unit and radio wave intensity. Then, a vertical axis in the graph indicates self-position estimation accuracy that is an accuracy of estimating self-position by the receiver according to the communication method. As illustrated in FIG. 36, VLC is longer in communication coverage distance and higher in self-position estimation accuracy than other communication methods.

Figure 37:
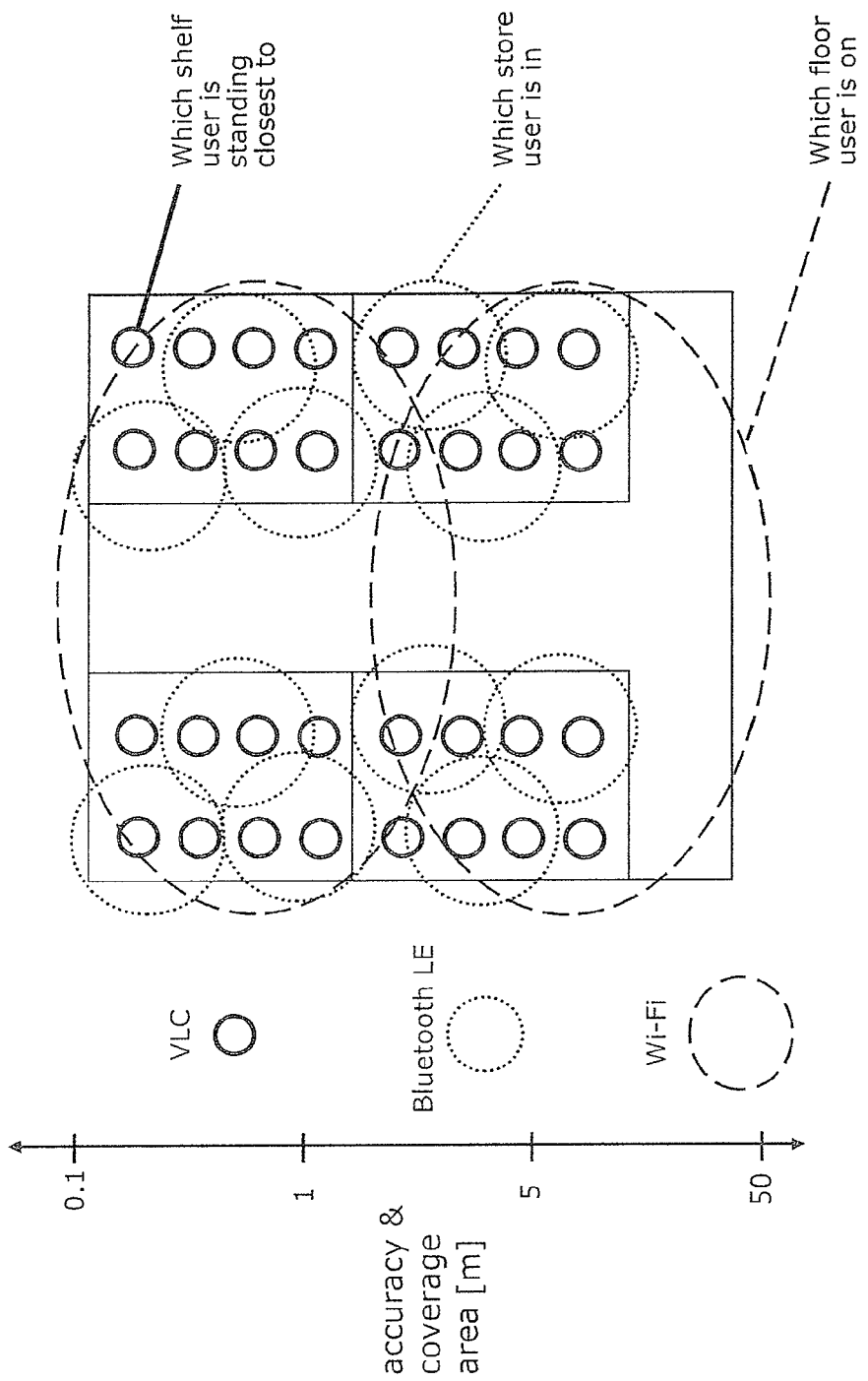
FIG. 37 is a diagram illustrating an example of a position estimation service using three communication methods in Embodiment 4.

FIG. 37 is a diagram illustrating an example of a position estimation service using three communication methods.

Using the Wi-Fi method having low position estimation accuracy, the receiver estimates which position in the building the user is at and which floor in the building the user is on.

Using Bluetooth (Bluetooth Low Energy) having medium level position estimation accuracy, the receiver estimates which store the user is in. At this time, by using in combination with the self-position estimation by Wi-Fi, the receiver can narrow down a communication coverage area of Bluetooth. In other words, when ID that is a signal to be transmitted by Bluetooth is unique to a communication area of Wi-Fi including a communication area of the Bluetooth, it is possible to identify the communication area of the Bluetooth corresponding to the ID. Therefore, the ID management can be simplified. Moreover, the number of necessary ID digits is reduced, and cost required for communication (time and power consumption) is reduced. Moreover, when the user receives, by Wi-Fi, the information that there is no Bluetooth signal nearby for position estimation, power consumption can be reduced by not searching the Bluetooth signal.

Using VLC having high position estimation accuracy, the receiver estimates which shelf the user is standing closest to. At this time, by using in combination with the self-position estimation by Wi-Fi or Bluetooth, the receiver can obtain the advantageous effect that is the same as the aforementioned effect.

It should be noted that although the three communication methods of Wi-Fi, Bluetooth, and VLC are used in the present embodiment, it is possible to use only any two of the three methods. It should be noted that instead of Wi-Fi or Bluetooth, the same advantageous effect can be obtained from another self-position estimation method such as Indoor Messaging System (IMES), sound wave, or ZigBee.

(Rewriting of Transmission Signal)

Figure 38:
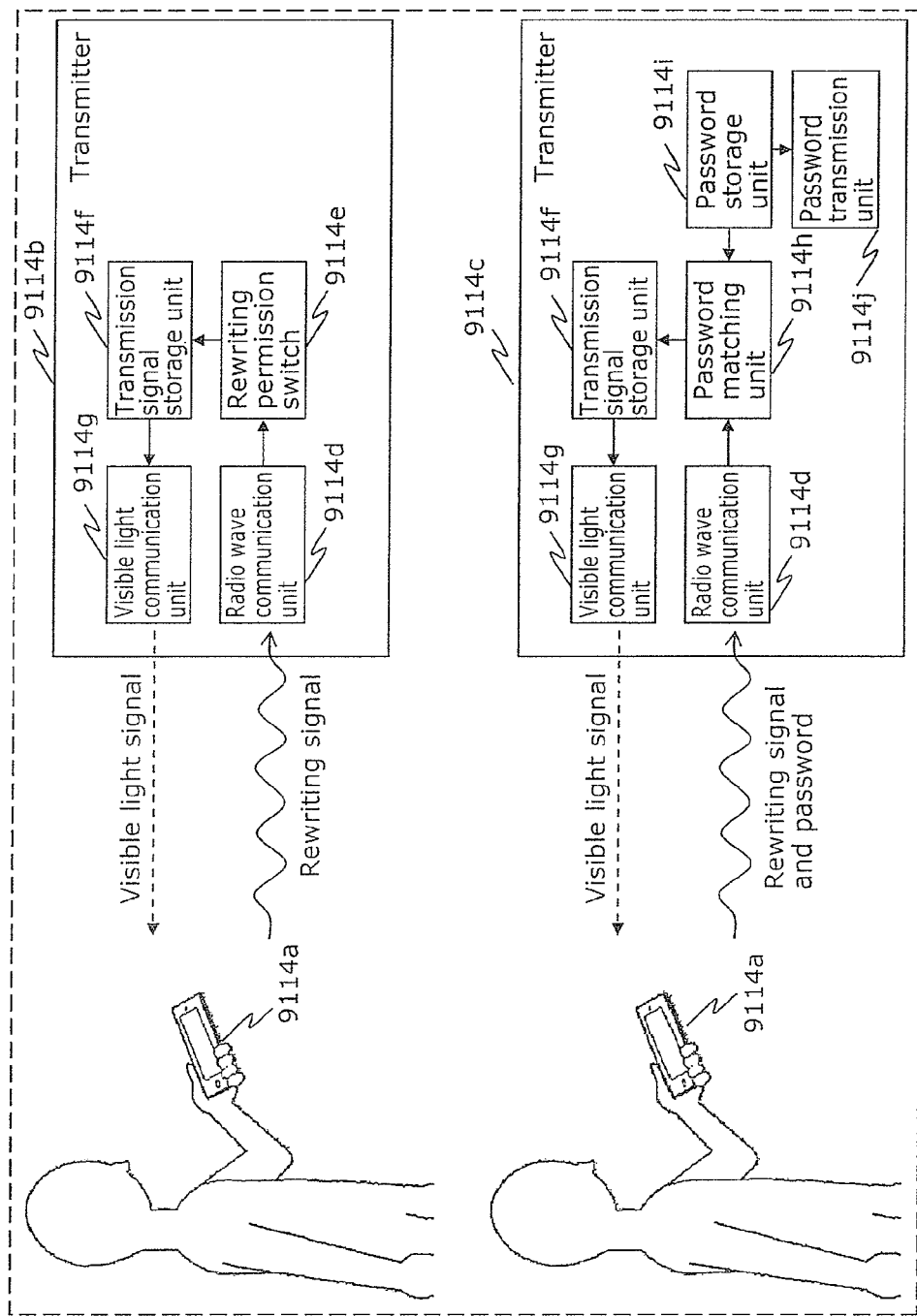
FIG. 38 is a diagram illustrating another example of the signal transmitting and receiving method in Embodiment 4.

FIG. 38 is a diagram describing an example of a signal transmitting and receiving method in Embodiment 4.

For example, an operation terminal 9114a configured as the smartphone transmits, to a transmitter 9114b, a rewriting signal indicating a command of rewriting a visible light signal through radio wave communication such as Bluetooth Low Energy. The transmitter 9114b is, for example, an LED light emitting device illustrated in FIG. 31, and includes a radio wave communication unit 9114d that receives the rewriting signal, a rewriting permission switch 9114e, a transmission signal storage unit 9114f that stores a visible light signal, a visible light communication unit 9114g that transmits the visible light signal, to a device such as the microwave oven in FIG. 31, through visible light communication. The rewriting permission switch 9114e holds setting information indicating whether or not the rewriting of the visible light signal stored in the transmission signal storage unit 9114f is permitted. Then, the rewriting permission switch 9114e rewrites, on reception of a rewriting signal via the radio communication unit 9114d, when indicating that the setting information held in itself is permission, the visible light signal stored in the transmission signal storage unit 9114f according to the rewriting signal. Meanwhile, the rewriting permission switch 9114e, when the setting information indicates no permission, does not rewrite the visible light signal according to the rewriting signal. With this, the operation terminal 9114a can perform remote control for a device such as a microwave oven via the LED light emitting device that is the transmitter 9114b, based on a visible light signal. Moreover, the operation terminal 9114a can perform various types of operations for the device by rewriting the visible light signal. Moreover, the visible light signal is stored in the transmitter 9114b, the rewriting requires a permission by the transmitter 9114b. Therefore, it is possible to prevent the operation terminal 9114a from operating the device improperly.

Moreover, the operation terminal 9114a may transmit the aforementioned rewriting signal and a password to the transmitter 9114c through radio wave communication such as Bluetooth Low Energy. In this case, the transmitter 9114c is an LED light emitting device illustrated in FIG. 31, for example, and includes the aforementioned radio wave communication unit 9114d, the transmission signal storage unit 9114f, the visible light communication unit 9114g, a password matching unit 9114h, a password storage unit 9114i, and a password transmission unit 9114j. The password storage unit 9114i stores a password. The password matching unit 9114h determines, when obtaining a password along with the rewriting signal via the radio wave communication unit 9114d, whether or not the password is the same as the password stored in the password storage unit 9114i. When it is determined that the passwords are the same, the password matching unit 9114h rewrites a visible light signal stored in the transmission signal storage unit 9114f according to the obtained rewriting signal. Meanwhile, when it is determined that the passwords are not the same, the password matching unit 9114h does not rewrite a visible light signal according to the obtained rewriting signal. The password transmission unit 9114j transmits, through near field communication, for example, the password stored in the password storage unit 9114i to the operation terminal 9114a.

When the transmitter 9114c is used, it is possible to prevent control of the device by the improper operation terminal 9114a, and the advantageous effect the same as that when using the aforementioned transmitter 9114b can be obtained.

It should be noted that the transmitter 9114c may store ID of the operation terminal 9114a, and correspond to only a rewriting signal from the operation terminal to be identified by the ID. Moreover, the server may store the aforementioned setting information. In this case, the operation terminal 9114a transmits the rewriting signal to the server. The server determines, upon reception of the rewriting signal, whether or not to transmit the rewriting signal to the transmitter according to the stored setting information. The transmitter performs, upon reception of the rewriting signal from the server, rewriting of a visible light signal according to the rewriting signal.

(Selection of Modulation Method According to Presence of Absence of Position Estimation Information)

Figure 39:
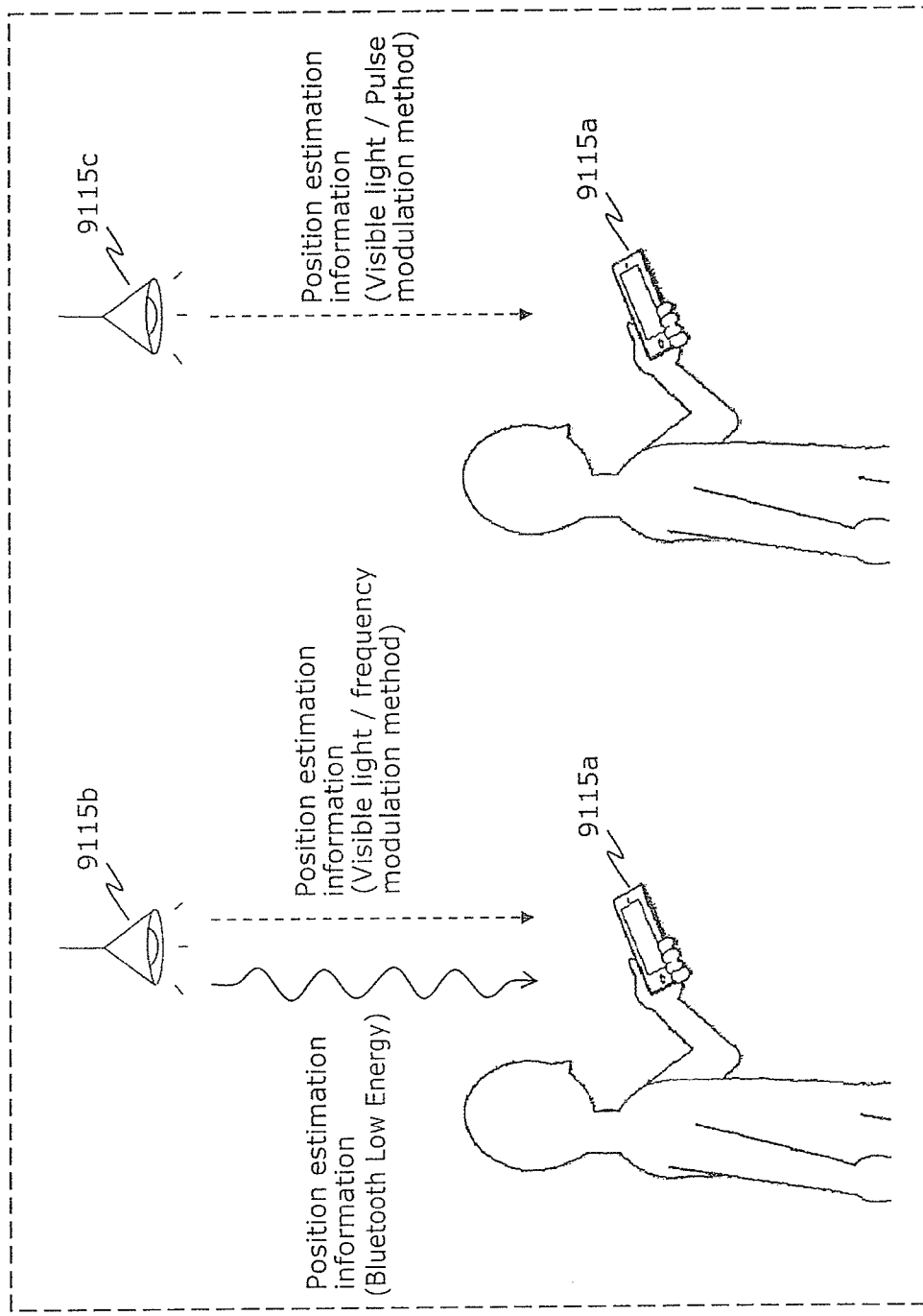
FIG. 39 is a diagram illustrating another example of the signal transmitting and receiving method in Embodiment 4.

FIG. 39 is a diagram describing another example of a signal transmitting and receiving method in Embodiment 4.

A transmitter 9115b configured as the lighting device, as similarly to the transmitters 9110b to 9110e illustrated in FIG.

32, transmits position estimation information including the upper layer data and the lower layer data to the receiver 9115a through BTLE or the like, and transmits position estimation information including only the lower layer data to the receiver 9115a through visible light communication of a frequency modulation method. Moreover, the transmitter 9115c, configured as the lighting device, transmits position estimation information including the upper layer data and the lower layer data to the receiver 9115a through visible light communication of a pulse modulation method (for example, 4PPM method). It should be noted that the amount of data that can be transmitted per unit time is larger in visible light communication of a pulse modulation method than in visible light communication of a frequency modulation method. Therefore, the transmitter 9115b of a frequency modulation method transmits position estimation information including only the lower layer data through visible light communication, and the transmitter 9115c of a pulse modulation method transmits position estimation information including the upper layer data and the lower layer data through visible light communication.

The transmitter 9115a switches the visible light communication method between a frequency modulation method and a pulse modulation method according to whether or not the receiver 9115a receives position estimation information through BTLE, for example.

Figure 40:
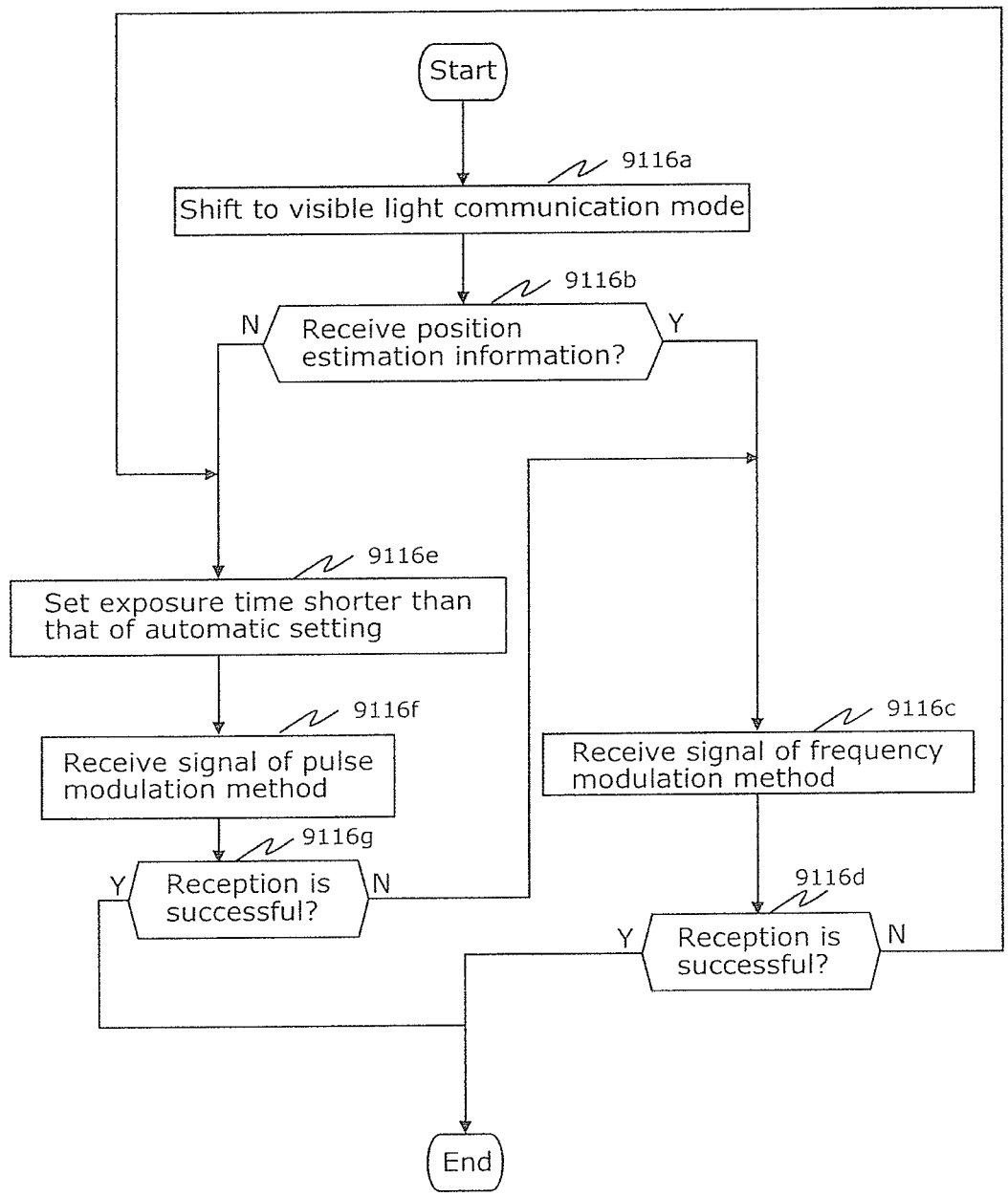
FIG. 40 is a flowchart illustrating an example of the operation of the receiver in Embodiment 4.

FIG. 40 is a flowchart illustrating an example of an operation of the receiver 9115a.

First, the receiver 9115a shifts to a visible light communication mode in Step 9116a. Next, in Step 9116b, the receiver 9115a determines whether or not the receiver 9115a receives position estimation information through communication of Bluetooth (Low Energy), Wi-Fi, or IMES. Here, when it is determined that position estimation information is received (Y in Step 9116b), in Step 9116c, the receiver 9115a receives a visible light signal transmitted from the transmitter according to a frequency modulation method (frequency ID modulation method or FSK modulation method, for example). Then, the transmitter 9115a, in Step 9116d, determines whether or not the reception is successful. When the reception is successful (Y in Step 9116d), the receiving process ends.

Meanwhile, when it is determined that position estimation information is not received (N in Step 9116b) or it is determined that the reception is not successful (N in Step 9116d), the receiver 9115a sets an exposure time in Step 9116e. In other words, the receiver 9115a sets an exposure time set itself to be shorter than the exposure time set by automatic setting. Next, in Step 9116f, the receiver 9115a receives the visible light signal transmitted from the transmitter according to a pulse modulation method (pulse position modulation method or pulse density modulation method, for example). Then, the transmitter 9115a, in Step 9116g, determines whether or not the reception is successful. When the reception is successful (Y in Step 9116g), the receiving process ends. Meanwhile, when it is determined that the reception is not successful (N in Step 9116g), the receiver 9115a performs the process of Step 9116c. It should be noted that in the aforementioned example, when the pulse modulation method is used, an exposure time is set to be short. When the frequency modulation method is used, an exposure time may be set to be short.

With this signal transmitting and receiving method, it is possible to automatically switch between the communication method used in combination with Bluetooth Low Energy or the like and the communication method used without in combination with Bluetooth Low Energy or the like.

Embodiment 5

Figure 41:
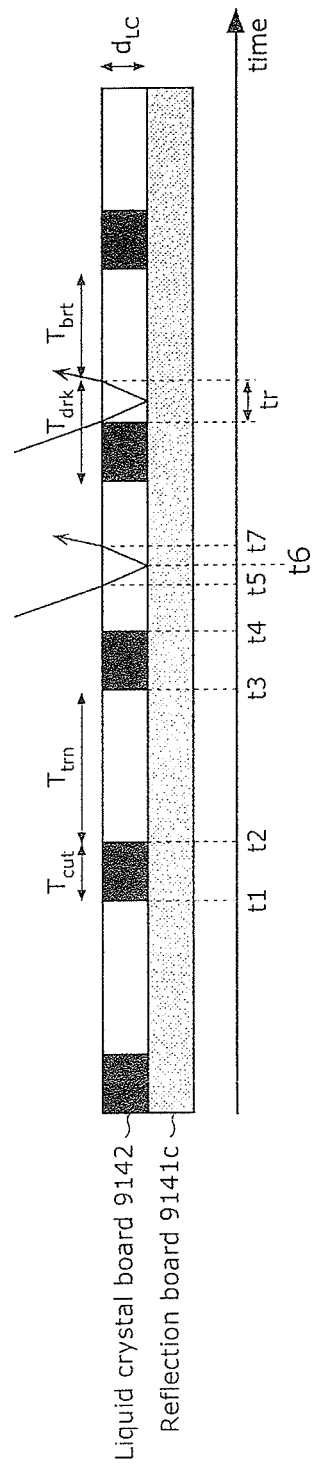
FIG. 41 is a diagram illustrating an example of a method of controlling transmittance by a transmitter in Embodiment 5.

FIG. 41 is a diagram illustrating an example of a method of controlling transmittance by a transmitter in Embodiment 5. It should be noted that this FIG. 41 indicates a temporal change of each of the transmittance and a path of light of the liquid crystal board 9142, and a horizontal axis of FIG. 44 indicates time. Moreover, in FIG. 41, a portion indicated in black in the liquid crystal board 9142 indicates that the liquid crystal board 9142 is in a closed state (in which transmittance is low and light is not allowed to pass therethrough), and a portion indicated in white indicates that the liquid crystal board 9142 is in an open state (in which transmittance is high and light is allowed to pass therethrough).

In other words, the control unit 9143 of the transmitter in the present embodiment switches the state of the liquid crystal board 9142 from an open state to a closed state at time t1, and switches the state of the liquid crystal board 9142 from a closed state to an open state at time t2 which passed $T_{cut}$ from the point of time (closed time). Furthermore, the control unit 9143 switches the state of the liquid crystal board 9142 from an open state to a closed state again at time t3 which passed time $T_{trn}$ (open time) from time t2. The control unit 9143 periodically repeats the switch of the transmittance of the liquid crystal board 9142. For example, when light is incident to the liquid crystal board 9142 that is in an open state at time t5, the light is reflected by the reflection board 9141c at time t6 and then is emitted from the liquid crystal board 9142 at time t7.

Here, where dLC represents the thickness of the liquid crystal board 9142, nLC represents the refractive index, and c represents speed of light, a delay time tr until the light is incident to the liquid crystal board 9142, is reflected by the reflection board 9141c, and then is emitted from the liquid crystal board 9142 is 2×dLC×nLC/c. Where $T_{cut}$ represents time in which the closed state continues and $T_{trn}$ represents time in which the open state continues, dark time $T_{drk}$ in which the liquid crystal board 9142 looks dark is $T_{cut}$+tr and bright time $T_{brt}$ in which the liquid crystal board 9142 looks bright is $T_{trn}$–tr. Where $T_{drk}=T_{brt}$, the frequency which changes the closed state and the open state of the liquid crystal board 9142, that is to say, the frequency f which changes the transmittance of the liquid crystal board 9142 is $1/(2\times T_{drk})$. Because of $T_{drk}$>tr, when f<c/(4×dLC×nLC), a signal can be expressed by luminance change. For example, when dLC=0.01 (m), the frequency f is about no more than 10 GHz.

FIG. 42 is a diagram illustrating another example of a method of controlling transmittance by a transmitter in Embodiment 5. It should be noted that as similarly to FIG. 41, this FIG. 42 indicates a temporal change of each of the transmittance and a path of light of the liquid crystal board 9142, and a horizontal axis of FIG. 42 indicates time.

The transmitter in the present embodiment, as illustrated in (a) and (b) in FIG. 42, includes a liquid crystal board 9142, a reflection board 9141c having translucency, a plate-like transmissive object 9157 having higher translucency than that of the reflection board 9141c, and a plate-like non-transmissive object 9158 having no translucency, and a control unit 9143 (not illustrated). It should be noted that the non-transmissive object 9158 is disposed so that the reflection board 9141c and the transmissive object 9157 are interposed between the non-transmissive object 9158 and the liquid crystal board 9142. In other words, these structural elements of the liquid crystal board 9142, the reflection board 9141c, the transmissive object 9157, and the non-transmissive object 9158 are arranged in this order.

The control unit 9143 changes, by switching the transmittance with respect to outside light of the liquid crystal board 9142 between the first transmittance and the second transmittance through application, to the liquid crystal board 9142, of a control voltage according to a signal to be transmitted, the amount of outside light reflected by the reflection board 9141c and emitted toward the receiver via the liquid crystal board 9142. A state in which the transmittance of the liquid crystal board 9142 is the first transmittance is the aforementioned open state, and a state in which the transmittance of the liquid crystal board 9142 is the second transmittance is the aforementioned closed state.

Here, when the reflection board 9141c has translucency, the outside light incident to the reflection board 9141c via the liquid crystal board 9142 that is in the open state sometimes passes through the reflection board 9141c and the transmissive object 9157, and then is reflected by the non-transmissive object 9158. The reflected outside light passes through the reflection board 9141c and the transmissive object 9157 again, and then reaches the liquid crystal board 9142. When at this time the liquid crystal board 9142 is in an open state, the outside light which reached the liquid crystal board 9142 is emitted by passing through the liquid crystal board 9142.

For example, as illustrated in (a) in FIG. 45, when outside light is incident to the liquid crystal board 9142 that is in an open state at time t10, the outside light passes through the reflection board 9141c and the transmissive object 9157 and then is reflected by the non-transmissive object 9158 at time t12. The reflected outside light passes through the reflection board 9141c and the transmissive object 9157 again, and then reaches the liquid crystal board 9142 at time 13. When at this time the state of the liquid crystal board 9142 is already switched to an open state, the outside light passes through the liquid crystal board 9142 and then is emitted from the liquid crystal board 9142 at time t14.

Here, when at time t11 after time t10, the state of the liquid crystal board 9142 is switched from an open state to a closed state and when the emission of the outside light is tried to be stopped until the aforementioned $T_{drk}$ passes from the time t11, the emission cannot be suppressed when the closed time $T_{cut}$ is short. Specifically, when the closed time $T_{cut}$ already passed from time t11 by time t13 when the outside light reflected by the non-transmissive object 9158 reaches the liquid crystal board 9142, the liquid crystal board 9142 is in an open state at time t13. Therefore, the outside light reflected by the non-transmissive object 9158 is incident to the liquid crystal board 9142 at the time t13, passes through the liquid crystal board 9142, and is emitted from the liquid crystal board 9142 at time t14 when dark time $T_{drk}$ does not pass from the time t11.

Therefore, the control unit 9143 in Embodiment 5, as illustrated in (b) in FIG. 42, sets closed time $T_{cut}$ so that the closed state will continue at least until time t13.

Figure 43A:
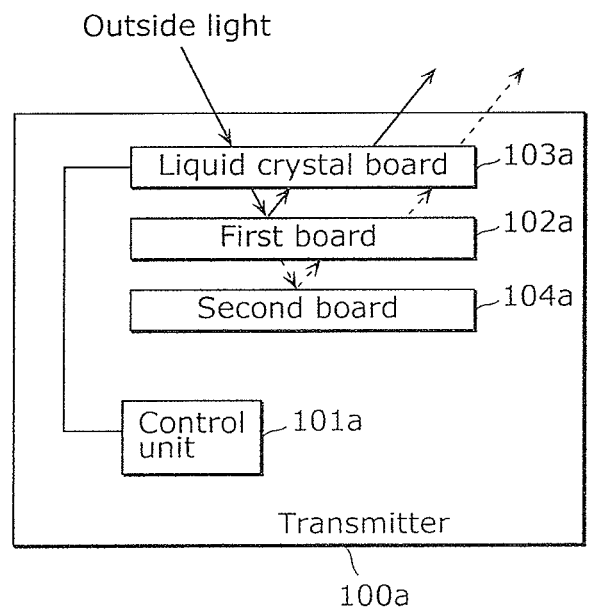
FIG. 43A is a block diagram of the transmitter in Embodiment 5.
Figure 43B:
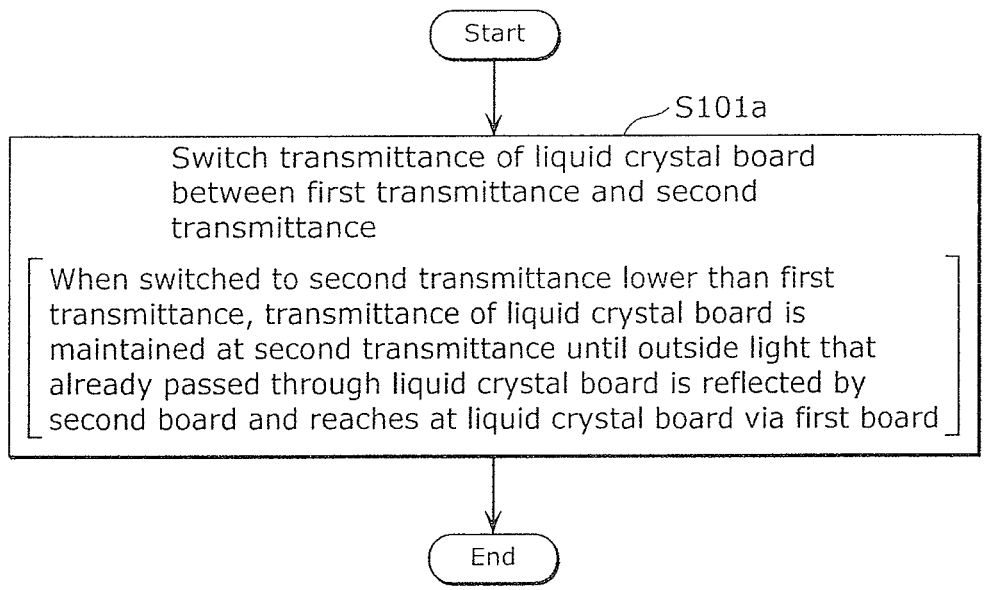
FIG. 43B is a flowchart illustrating a transmitting method in Embodiment 5.

FIG. 43A is a block diagram of the transmitter in Embodiment 5.

A transmitter 100a in the present embodiment is a transmitter 100 that transmits a signal to a receiver by changing an amount of light emitted, and includes a liquid crystal board 103a, a first board 102a having translucency, a second board 104a that sandwiches the first board 102a with the liquid crystal board 103a, and a control unit 101a. It should be noted that the liquid crystal board 103a, the first board 102a, the second board 104a, and the control unit 101a correspond to the aforementioned liquid crystal board 9142, the reflection board 9141c, the non-transmissive object 9158, and the control unit 9143, respectively.

The control unit 101a changes, by switching the transmittance with respect to outside light of the liquid crystal board 103a between the first transmittance (open state) and the second transmittance (closed state) through application, to the liquid crystal board 103a, of a control voltage corresponding to a signal to be transmitted, an amount of outside light reflected by the first board 102a and emitted toward the receiver via the liquid crystal board 103a. Furthermore, when switching the transmittance of the liquid crystal board 103a to the second transmittance (closed state) lower than the first transmittance (open state), the control unit 101a maintains the transmittance of the liquid crystal board 103a at the second transmittance (closed state) until the outside light that passed through the liquid crystal board 103a is reflected by the second board 104a and reaches the liquid crystal board 103a via the first board 102a.

FIG. 43B is a flowchart illustrating a transmitting method according to Embodiment 5.

The transmitting method in the present embodiment is a transmitting method in which the transmitter 100a transmits a signal to a receiver by changing an amount of light emitted. Moreover, the transmitter 100a, as described above, includes the liquid crystal board 103a, the first board 102a having translucency, and the second board 104a that is disposed to sandwich the first board 102a with the liquid crystal board 103a.

In this transmitting method, by switching the transmittance with respect to outside light of the liquid crystal board 103a between the first transmittance (open state) and the second transmittance (closed state) through application, to the liquid crystal board 103a, of a control voltage corresponding to a signal to be transmitted, an amount of outside light reflected by the first board 102a and emitted toward the receiver via the liquid crystal board 103a is changed (Step S101a). Here, when switching the transmittance of the liquid crystal board 103a to the second transmittance (closed state) lower than the first transmittance (open state), the transmittance of the liquid crystal board 103a is maintained at the second transmittance (closed state) until the outside light that passed through the liquid crystal board 103a is reflected by the second board 104a and reaches the liquid crystal board 103a via the first board 102a.

With this, the transmitter 100a can perform visible light communication using outside light by changing the amount of outside light reflected by the first board 102a and emitted toward the receiver, and does not need a light source for visible light communication, thus making it difficult to be affected by structural constraints. Furthermore, when the transmittance of the liquid crystal board 103a is switched to the second transmittance (low transmittance), the liquid crystal board 103a is maintained at a low transmittance until the outside light that passed through the liquid crystal board 103a is reflected by the second board 104a and reaches the liquid crystal board 103a. Therefore, even when outside light passes through the first board 102a due to the translucency of the first board 102a, it is possible to prevent the outside light from being reflected by the second board 104a and being emitted toward the receiver. As a result, it is possible to control the transmission of a visible light signal without considering the reflection of outside light by the second board 104a. In other words, it can be difficult to be affected by constraints also in the control of the transmission of a visible light signal.

FIG. 44 is a diagram illustrating an example of the disposition of the liquid crystal board 9142 of the transmitter in Embodiment 5.

The liquid crystal board 9142 of the transmitter in the present embodiment is installed on a signboard 9147a, for example, as illustrated in (a) in FIG. 44. In this case, the signboard 9142, as illustrated in (b) in FIG. 44, is disposed along a side of the lower end of the surface of the signboard 9147a and disposed opposite to the side. It should be noted that the reflection board 9141c, the transmissive object 9157, the non-transmissive object 9158, and the like illustrated in FIG. 41 and FIG. 42 are included in the signboard 9147a. With this, when the liquid crystal board 9142 is installed on the signboard 9147a or when the liquid crystal board 9147 is disposed before the signboard 9147a, it is possible to add a transmission function to the signboard 9147a. Moreover, since the liquid crystal board 9142 is installed only the end in the surface of the signboard 9147a, it is possible to make it easy to see the signboard 9147a compared with the case where the whole of the signboard 9147a is covered with the liquid crystal board 9142. Moreover, since the portion covered with the liquid crystal board 9142 in the signboard 9147a is difficult to see, it is possible to make the portion less noticeable by printing letters or designs.

Moreover, although the liquid crystal board 9142 may be installed in contact with the signboard 9147a, as illustrated in (c) in FIG. 44, the liquid crystal board 9142 may be disposed with a gap with respect to the surface of the signboard 9147a. With this, outside light can enter the gap not via the liquid crystal board 9142. As a result, outside light is emitted by being directly reflected by the signboard 9147a and passing through the liquid crystal board 9142, it is possible to brighten the liquid crystal board 9142 and the signboard 9147a and make it easy to see them.

It should be noted that the reflection board 9141c, the transmissive object 9157, the non-transmissive object 9158, and the like illustrated in FIG. 41 and FIG. 42 may be installed on the signboard 9147a along with the liquid crystal board 9142. Moreover, the signboard 9147a may be a liquid crystal display. In other words, a signal transmitting unit that includes the liquid crystal board 103a, the first board 102a, and the second board 104a illustrated in FIG. 43A is formed only on the end of the surface of the liquid crystal display. With this, it is possible to make it easy to see the liquid crystal display compared with the case where the whole surface of the liquid crystal display is covered with the signal transmitting unit.

FIG. 45 is a diagram illustrating another example of the disposition of the liquid crystal board 9142 of the transmitter in Embodiment 5.

The liquid crystal board 9142 of the transmitter in the present embodiment is installed on the signboard 9147a, for example, as illustrated in (a) in FIG. 45. In this case, the liquid crystal board 9142, as illustrated in (b) in FIG. 45, is disposed along the rim of the surface of the signboard 9147a and opposite to the rim. It should be noted that as described above, the signboard 9147a may be a liquid crystal display. In other words, a signal transmitting unit that includes the liquid crystal board 103a, the first board 102a, and the second board 104a illustrated in FIG. 43A is formed only in the rim of the surface of the liquid crystal display. With this, it is possible to make it easy to see the liquid crystal display compared with the case where the whole surface of the liquid crystal display is covered with the signal transmitting unit.

Figure 46:
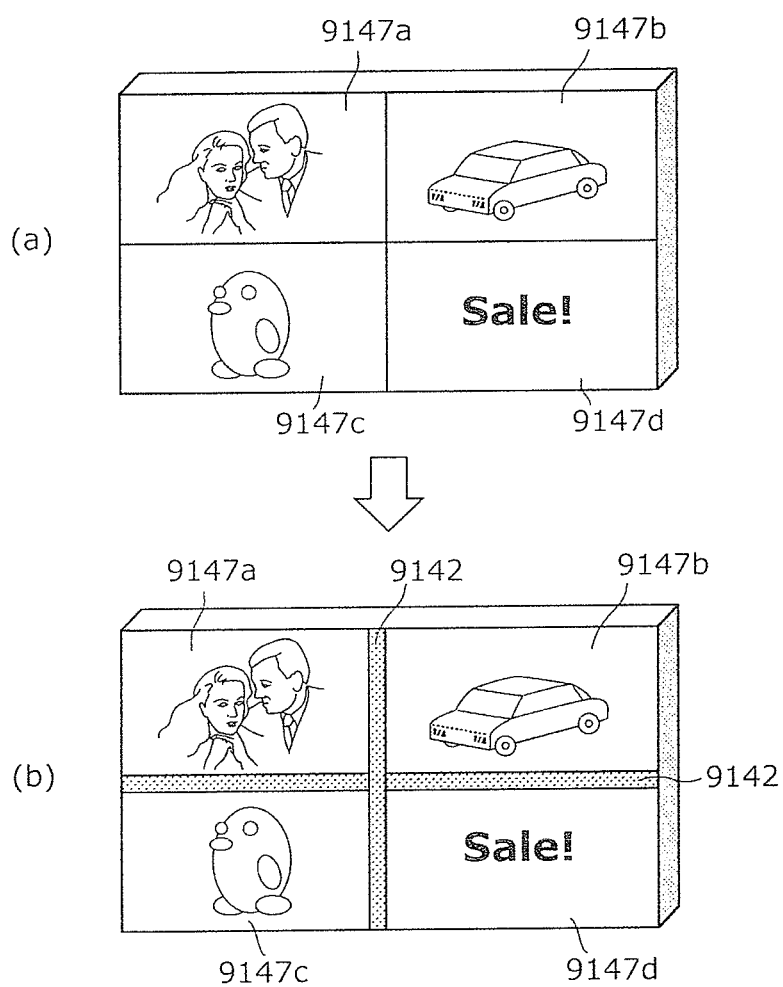
FIG. 46 is a diagram illustrating another example of a disposition of a liquid crystal board in the transmitter in Embodiment 5.

FIG. 46 is a diagram illustrating another example of the disposition of the liquid crystal board 9142 of the transmitter in Embodiment 5.

The liquid crystal board 9142 of the transmitter in the present embodiment may be installed on the signboards 9147a to 9147d that are arranged to be adjacent to each other, for example, as illustrated in (a) in FIG. 46. In this case, the liquid crystal board 9142, as illustrated in (b) in FIG. 46, is disposed only in a portion along a boundary between the signboards 9147a to 9147d that are arranged to be adjacent to each other and opposite to the portion, in each of the surfaces of the signboards 9147a to 9147d. With this, each of the signboards 9147a to 9147d can be easy to see. It should be noted that as described above, the signboards 9147a to 9147d may be a liquid crystal display. In other words, a signal transmitting unit that includes the liquid crystal board 103a, the first board 102a, and the second board 104a illustrated in FIG. 43A is formed only in a portion along a boundary between the liquid crystal displays, in each of the surfaces of the liquid crystal displays that are disposed adjacent to each other. With this, it is possible to make it easy to see each of the liquid crystal displays.

FIG. 47 is a diagram illustrating an example of the configuration of the liquid crystal board 9142 of the transmitter in Embodiment 5.

The liquid crystal board 9142 of the transmitter in the present embodiment may be formed on the surface of a liquid crystal display 9200 included in a liquid crystal display device 9200a illustrated in (b) in FIG. 47. The liquid crystal display 9200 has, as illustrated in (a) in FIG. 47, two polarizing boards 9201 and 9202 and a liquid crystal 9203 interposed between the two polarizing boards 9201 and 9202.

In view of this, the liquid crystal board 9142 of the transmitter in the present embodiment, as illustrated in (c) in FIG. 47, comprises a polarizing board 9201 provided on the surface side of the liquid crystal display 9200, a liquid crystal for transmission 9141b, and a polarizing board 9141f disposed to sandwich the liquid crystal for transmission 9141b with the polarizing board 9201. In other words, as illustrated in (c) and (d) in FIG. 47, a liquid crystal panel for transmission 9142a including the liquid crystal for transmission 9141b and the polarizing board 9141f is installed on the surface of the liquid crystal display 9200. Moreover, the polarizing board 9201 on the surface side of the liquid crystal display 9200 has both a function of projecting video and a part of the function of the liquid crystal board 9142 for visible light communication.

Figure 48:
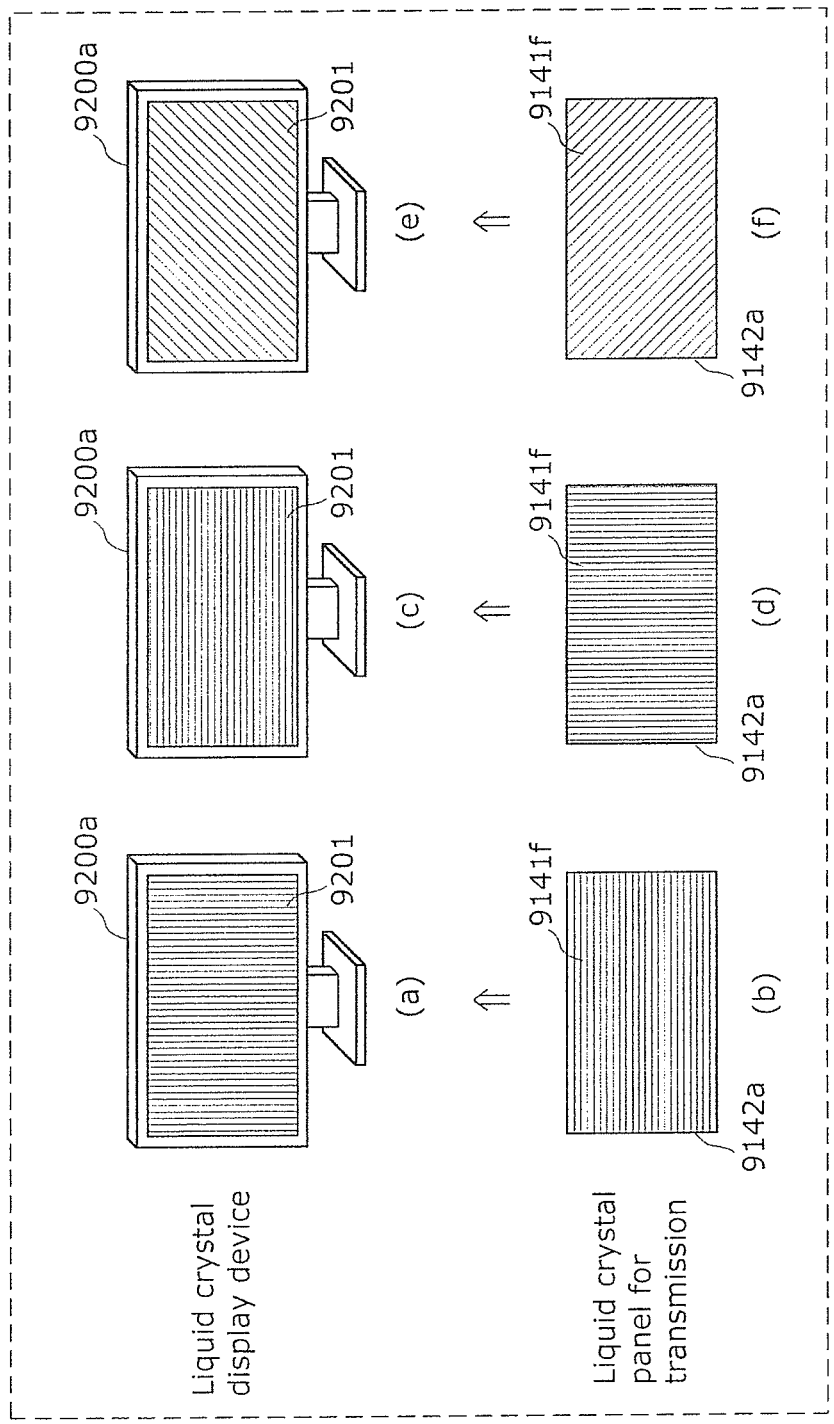
FIG. 48 is a diagram illustrating an example of installation of a liquid crystal panel for transmission in Embodiment 5.

FIG. 48 is a block diagram illustrating an example of installation of the liquid crystal board 9142a for transmission in Embodiment 5.

For example, as illustrated in (a) in FIG. 48, a polarizing direction of the polarizing board 9201 provided on the surface side of the liquid crystal display device 9200a is a perpendicular direction. In this case, as illustrated in (b) in FIG. 48, the liquid crystal panel for transmission 9142a having the polarizing board 9141f whose polarizing direction is a horizontal direction is installed on the surface of the liquid crystal display device 9200a.

Moreover, as illustrated in (c) in FIG. 48, a polarizing direction of the polarizing board 9201 provided on the surface side of the liquid crystal display device 9200a is a horizontal direction. In this case, as illustrated in (d) in FIG. 48, the liquid crystal panel for transmission 9142a having the polarizing board 9141f whose polarizing direction is a perpendicular direction is installed on the surface of the liquid crystal display device 9200a.

Moreover, as illustrated in (e) in FIG. 48, a polarizing direction of the polarizing board 9201 provided on the surface side of the liquid crystal display device 9200a is a diagonal direction (a direction inclined by 45 degrees in a counterclockwise rotation). In this case, as illustrated in (f) in FIG.

48, the liquid crystal panel for transmission 9142*a* having the polarizing board 9141*f* whose polarizing direction is a reverse diagonal direction (direction inclined by 135 degrees in a counterclockwise rotation with respect to a horizontal direction) is installed on the surface of the liquid crystal display device 9200*a*.

As described above, in the present embodiment, the liquid crystal board 9142 comprises the polarizing board 9201 provided on the surface side of the liquid crystal display 9200, the liquid crystal 9203, and the polarizing board for transmission 9141*f* disposed to sandwich the liquid crystal 9203 with the polarizing board 9201. Moreover, the polarizing board for transmission 9141*f* is installed on the liquid crystal display 9200 so that the polarizing direction of the polarizing board for transmission 9141*f* is perpendicular to the polarizing direction of the polarizing board 9201 of the liquid crystal display 9200. With this, since the polarizing board 9201 included in the liquid crystal display 9200 is used as the polarizing board of the liquid crystal board 9142, the number of polarizing board can be reduced compared with the case where the liquid crystal board having two dedicated polarizing boards is installed on the liquid crystal display 9200. As a result, it is possible to simplify the configuration, increase an amount of light emitted from the liquid crystal board 9142, and perform appropriate visible light communication.

Figure 49:
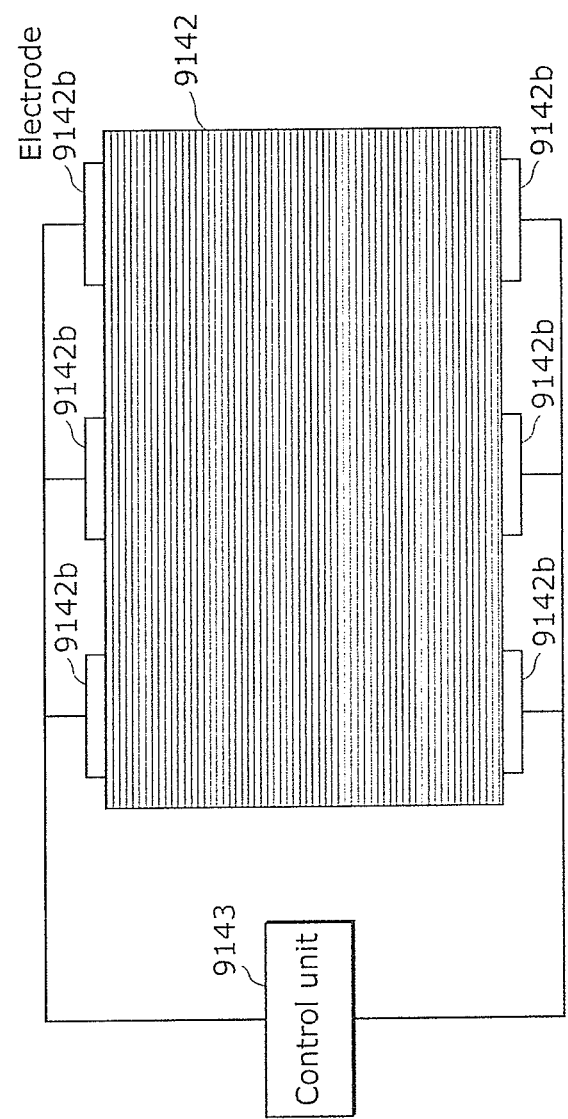
FIG. 49 is an example illustrating an electrode to be installed on the liquid crystal board in Embodiment 5.

FIG. 49 is a diagram illustrating an electrode installed on the liquid crystal board 9142 in Embodiment 5.

As illustrated in FIG. 49, a plurality of pairs of electrodes 9142*b* (for example, three pairs) are installed on the liquid crystal board 9142. The control unit 9143 changes the transmittance of the liquid crystal board 9142, by applying a control voltage to the liquid crystal board 9142 using the plurality of the pairs of the electrodes 9142*b*. With this, it is possible to reduce the time for signal transmission and to switch the transmittance at a high frequency compared with the case where only one pair of the electrodes 9142*b* are installed on the liquid crystal board 9142. In other words, it is possible to transmit a signal having a high frequency.

Figure 50A:
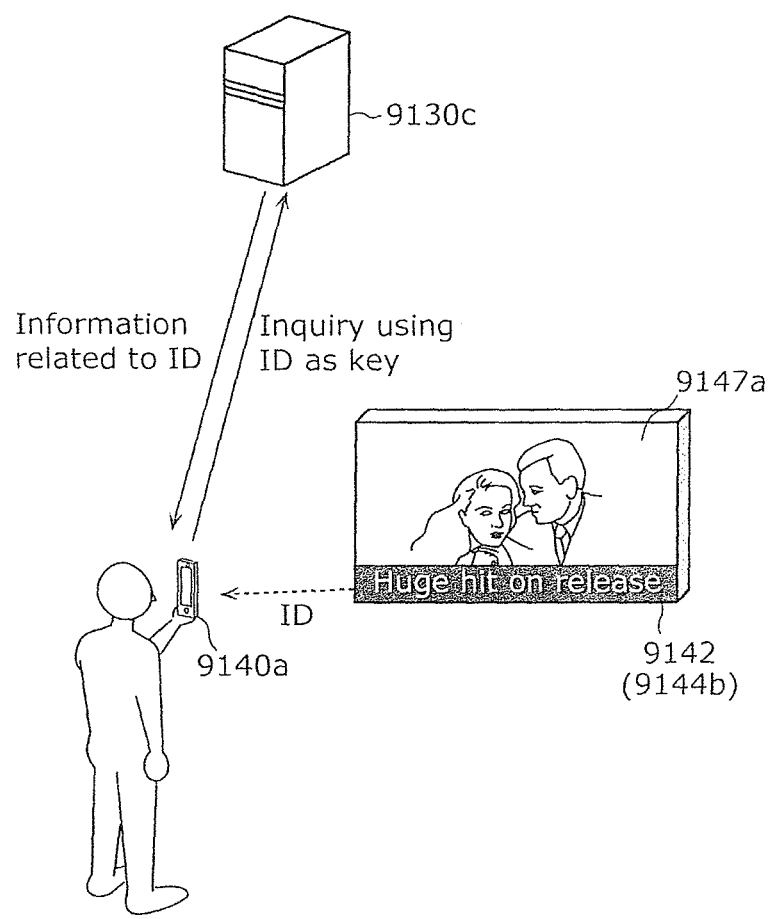
FIG. 50A is a diagram illustrating an example of a signal transmitting and receiving system in Embodiment 5.

FIG. 50A is a diagram illustrating an example of a signal transmitting and receiving system in Embodiment 5.

The signal transmitting and receiving system includes the receiver 9140*a*, the transmitter 9144*b*, and the ID service server 9130*c*. It should be noted that the transmitter 9144*b* in the present embodiment is the aforementioned transmitter, and includes the control unit 9143 (not illustrated) and the liquid crystal board 9142. Moreover, the liquid crystal board 9142 is installed on the surface of the signboard 9147*a*.

In this signal transmitting and receiving system, the receiver 9140*a* receives, by imaging the liquid crystal board 9142, a signal (visible light signal) to be transmitted from the transmitter 9144*b* (liquid crystal board 9142). The receiver 9140*a* obtains, by receiving a signal, identification information (ID) indicated by the signal. Then, the receiver 9140*a* transmits the ID to the ID service server 9130*c*. The ID service server 9130*c* obtains related information associated with the ID, and then transmits the related information to the receiver 9140*a*. With this, as long as the related information is detailed information about the content of the advertisement of the signboard 9147*a*, the receiver 9140*a* can present the user with the detailed information about the content of the advertisement.

Figure 50B:
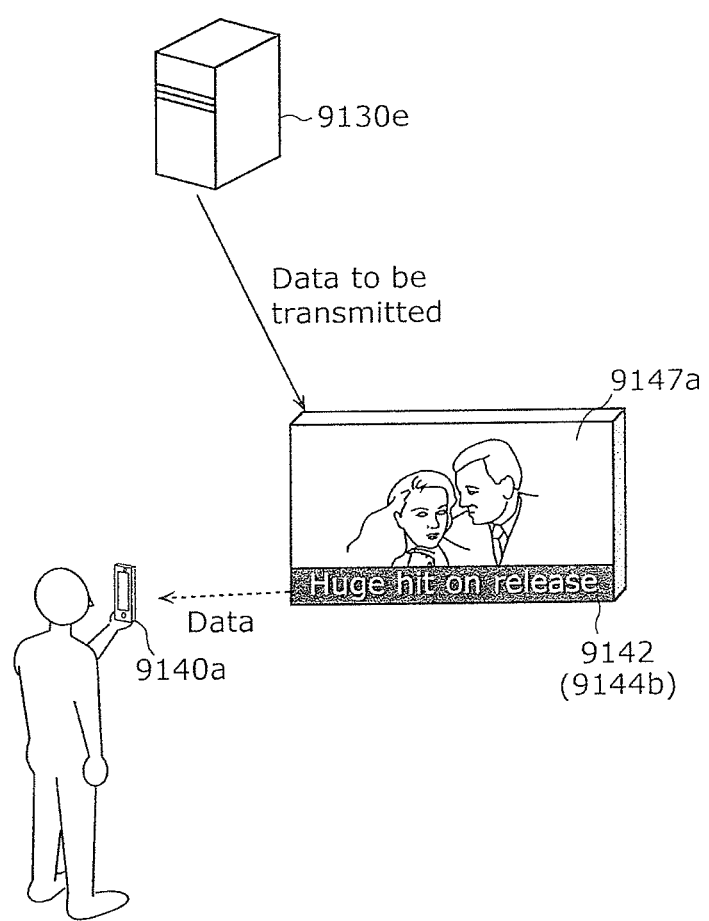
FIG. 50B is a diagram illustrating another example of the signal transmitting and receiving system in Embodiment 5.

FIG. 50B is a diagram illustrating another example of the signal transmitting and receiving system in Embodiment 5.

This signal transmitting and receiving system includes the receiver 9140*a*, the transmitter 9144*b*, and a service server 9130*e*. It should be noted that as described above, the transmitter 9144*b* includes the control unit 9143 (not illustrated) and the liquid crystal board 9142. Moreover, the liquid crystal board 9142 is installed on the surface of the signboard 9147*a*.

In this signal transmitting and receiving system, the service server 9130*e* transmits the detailed information about the content of advertisement of the signboard 9147*a*, as data, to the transmitter 9144*b*. Then, the transmitter 9144*b* transmits the data via visible light, by changing the transmittance of the liquid crystal board 9142. The receiver 9140*a* receives, by imaging the liquid crystal board 9142, the data to be transmitted from the transmitter 9144*b* (liquid crystal board 9142). With this, the receiver 9140*a* can present the user with the detailed information about the content of the advertisement.

FIG. 51 is a diagram illustrating a waveform of a control voltage in Embodiment 5.

As illustrated in FIG. 51, the rise and fall of a control voltage to be applied by the control unit 9143 to the liquid crystal board 9142 takes time. Especially, the fall takes a longer time than the rise. Specifically, the rise takes 120 microseconds and the fall takes 500 microseconds.

FIG. 52 is a diagram illustrating a waveform of a control voltage in Embodiment 5.

As illustrated in FIG. 51, since the rise and fall of the control voltage takes time, the frequency of the repetition cannot be high when the control voltage is switched between 0 V and n V (n>0), as illustrated in (a) in FIG. 52. In other words, the frequency of the switch of the transmittance of the liquid crystal board 9142 and the frequency of the visible light signal cannot be high. However, as illustrated in (b) in FIG. 52, when the control voltage is repeatedly switched between m V (m>0) and p V (p>m), the frequency of the repetition can be high. In other words, the influence of the rise and fall can be suppressed when the control voltage is not reduced to 0 V, and the frequency of the switch of the transmittance of the liquid crystal board 9142 and the frequency of the visible light signal can be high. Moreover, the same effect can be obtained from narrowing the range in which the control voltage is changed.

In other words, the control unit 9143 according to the present embodiment switches, by changing the control voltage to be applied to the liquid crystal board in a range higher than a predetermined voltage value, the transmittance of the liquid crystal board 9142 between the first transmittance and the second transmittance. For example, the predetermined voltage value is 0 V. With this, when each of the rise and fall of the control voltage takes time, it is possible to reduce each time and switch the transmittance of the liquid crystal board at a high frequency. As a result, it is possible to increase a communication speed of the visible light communication.

Figure 53:
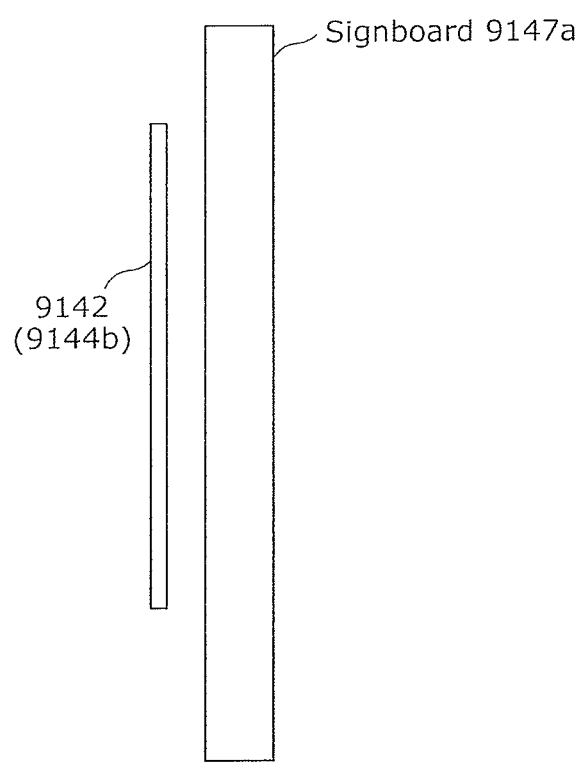
FIG. 53 is a diagram illustrating an example of a disposition of a liquid crystal board in Embodiment 5.

FIG. 53 is a diagram illustrating an example of the disposition of the liquid crystal board 9142 in Embodiment 5.

The liquid crystal board 9142 included in the transmitter 9144*b* is, for example, disposed opposite to the signboard 9147*a* and in a position away from the signboard 9147*a*. With this, outside light can enter between the signboard 9147*a* and the liquid crystal board 9142, not via the liquid crystal board 9142. As a result, the amount of outside light emitted from the liquid crystal board 9147*a* to the opposite side (left side in FIG. 53) of the signboard 9147*a* can be increased compared with the case where the liquid crystal board 9142 is in contact with the signboard 9147*a*. In other words, it is possible to brighten the liquid crystal board 9142 and to transmit a signal to be transmitted from the transmitter 9144*b* appropriately. Furthermore, the light from the opposite side of the signboard 9147*a* of the liquid crystal board 9142 is blocked by the liquid crystal board 9142, and makes it difficult to reach the signboard 9147*a*, and it is possible to obtain a heat insulating effect. It should be noted that when the signboard 9147*a* is configured as the liquid crystal display 9200, the liquid crystal panel for transmission 9142a may be disposed instead of the liquid crystal board 9142. In this case, the liquid crystal panel for transmission 9142a is disposed opposite to the liquid crystal display 9200 and in a position away from the liquid crystal display 9200. Moreover, the signboard 9147a may be a wall.

Figure 54:
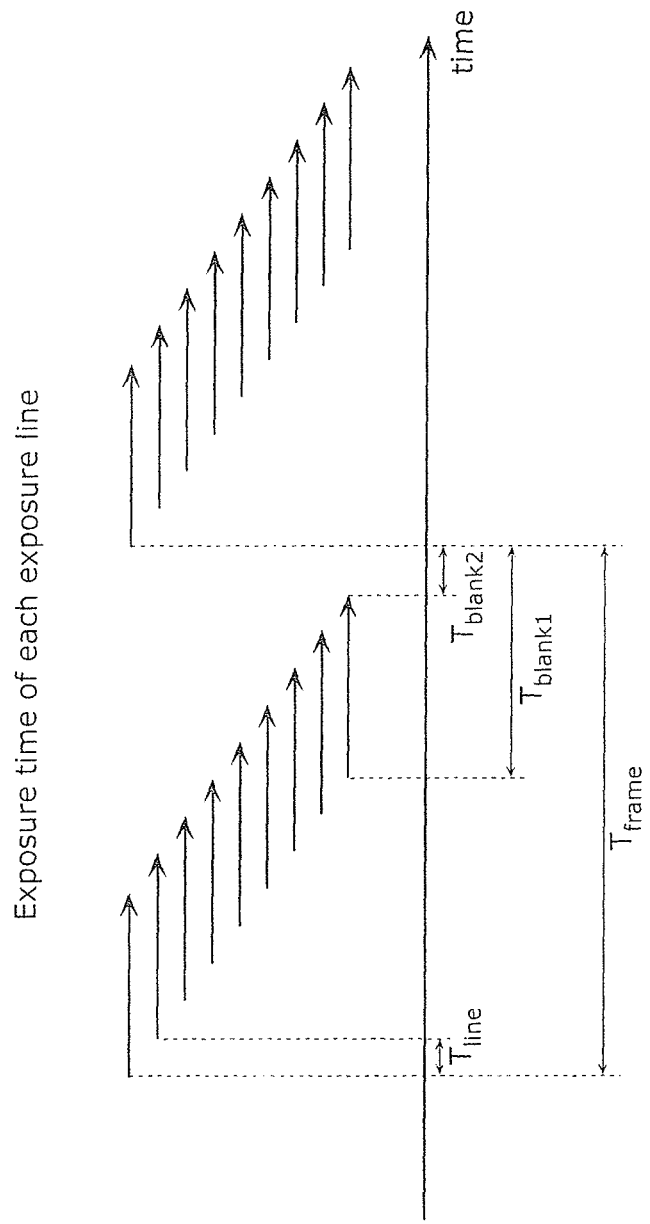
FIG. 54 is a diagram illustrating an exposure time of each exposure line in Embodiment 5.

FIG. 54 is a diagram illustrating an exposure time of each exposure line in Embodiment 5.

The receiver 9140a in the present embodiment obtains image data, by imaging by starting exposure of each exposure line at sequentially different time, by starting exposure of the subsequent exposure line before the exposure of one exposure line is completed, and by imaging at an exposure time shorter than the exposure time in a normal imaging mode. Then, the receiver 9140a obtains information by demodulating data specified by a direction generally perpendicular to the exposure line in a bright line pattern that corresponds to each exposure line and appears in the image data.

In other words, the receiver 9140a, as illustrated in FIG. 54, starts the exposure of the first exposure line when exposing each exposure line of an image sensor, and starts the exposure of the second exposure line after the passage of time $T_{line}$ from the start of the exposure. As described above, when exposing the n-th exposure line, the receiver 9140a starts exposure of the n-th exposure line after the passage of time $T_{line}$ from the start of the exposure of the (n−1)th exposure line. It should be noted that the aforementioned first, second, and n-th is an arrangement sequence of the exposure lines in the image sensor.

Then, the receiver 9140a starts again the exposure of the first exposure line when time $T_{blank2}$ passed after the end of exposure of the last exposure line included in the image sensor, or when time $T_{blank1}$ passed after the start of the exposure of the last exposure line. In other words, the exposure of each exposure line included in the image sensor is sequentially started again. The receiver 9140a repeats the exposure of all exposure lines included in the image sensor by setting time $T_{frame}$ as one period.

Here, the aforementioned time $T_{line}$, time $T_{blank1}$, time $T_{blank2}$, and time $T_{frame}$ are different for each receiver. In view of this, the transmitter 9144a in the present embodiment previously stores at least one of the aforementioned times of each receiver. Then, the transmitter 9144a determines a frequency based on the time corresponding to the receiver of the destination, and switches the transmittance of the liquid crystal board 9142 according to the frequency. With this, it is possible to transmit a visible light signal at a frequency suitable for each receiver. In other words, the receiver can correctly receive a signal transmitted from the transmitter 9144a.

FIG. 55 is a diagram illustrating a relationship between a signal value, a wavelength, and a frequency in Embodiment 5.

For example, in the frequency modulation, a different frequency is assigned to each value represented by the signal (signal value). With this, when transmitting a signal to be transmitted, the transmitter changes the amount of visible light via a frequency assigned to a signal value of the signal. Specifically, as illustrated in (b) in FIG. 55, frequencies (200 Hz, 210 Hz) are assigned to signal values (20, 21), respectively. Frequencies (1000 Hz, 1010 Hz) are assigned to signal values (100, 101), respectively. Frequencies (5000 Hz, 5010 Hz) are assigned to signal values (500, 501), respectively. In this example, regardless of whether the signal value is large or small, the difference is the same between a frequency assigned to the n-th signal value and a frequency assigned to the (n+1)th signal value. In other words, the frequency (200 Hz) assigned to the 0th signal value (20) and the frequency (210 Hz) assigned to the first signal value (21) is 10 Hz. Moreover, the difference between the frequency (5000 Hz) assigned to the 480th signal value (500) and the frequency (5010 Hz) assigned to the 481st signal value (501) is 10 Hz.

However, when a frequency is arithmetically assigned to each signal value, the receiver finds it difficult to identify the assigned frequency. In that case, the receiver cannot obtain the signal value to be transmitted from the transmitter.

In view of this, the transmitter according to the present embodiment, as illustrated in (a) in FIG. 55, assigns a waveform arithmetically to each signal value. In other words, wavelengths (200 microseconds, 210 microseconds) are assigned to signal values (20, 21), respectively. Wavelengths (1000 microseconds, 1010 microseconds) are assigned to signal values (100, 101), respectively. Wavelengths (5000 microseconds, 5010 microseconds) are assigned to signal values (500, 501), respectively. In other words, regardless of whether the signal value is large or small, the difference is the same between a wavelength assigned to the n-th signal value and a wavelength assigned to the (n+1)th signal value. For example, the difference between the wavelength (200 microseconds) assigned to the 0th signal value (20) and the waveform (210 microseconds) assigned to the first signal value (21) is 10 microseconds. Moreover, the difference between the wavelength (5000 microseconds) assigned to the 480th signal value (500) and the waveform (5010 microseconds) assigned to the 481st signal value (501) is also 10 microseconds.

As a result, in the present embodiment, a frequency is assigned non-arithmetically to each signal. In other words, frequencies (5000 Hz, 4671.9 Hz) are assigned to signal values (20, 21), respectively. Frequencies (1000 Hz, 990.1 Hz) are assigned to signal values (100, 101), respectively. Frequencies (200 Hz, 199.6 Hz) are assigned to signal values (500, 501), respectively. As described above, the difference between the frequency assigned to the n-th signal value and the frequency assigned to the (n+1)th signal value is smaller as the ordinal number of the signal value is larger, that is, the signal value is larger.

In other words, the control unit 9143 of the transmitter in the present embodiment, when transmitting a k-th signal (where k is an integer from 0 and to n) in the case where different frequencies are assigned to respective 0th to nth signals (n is an integer at least 0), applies a control voltage that changes at the frequency assigned to the k-th signal the liquid crystal board 9142. Then, in the assignment of the different frequencies, when the value of the i-th signal (i is an integer from 0 to n) is represented by (a+b×i) using constants a and b, the different frequencies are assigned so that the difference between a frequency f (i) assigned to the i-th signal and a frequency f (i−1) assigned to the (i−1)th signal is larger or smaller as i is larger. It should be noted that in an example illustrated in (a) in FIG. 55, a frequency is assigned to each signal (signal value) so that where a=20, and b=1, the difference between the frequency f (i) and the frequency f (i−1) is smaller as i is larger.

As described above, when a wavelength is assigned arithmetically to each signal value and, as a result, a frequency is assigned non-arithmetically to each signal value, the receiver finds it easier to identify the assigned frequency. Therefore, the receiver can obtain the signal value to be transmitted from the transmitter.

Figure 56:
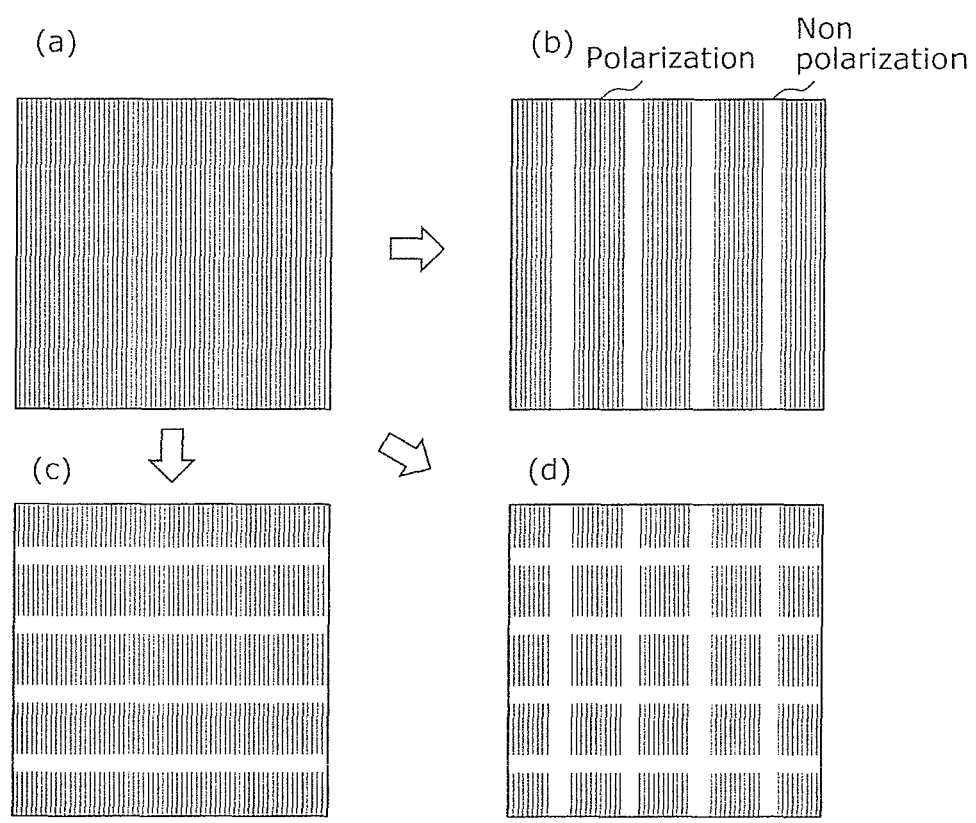
FIG. 56 is a diagram illustrating variations of a polarizing board in Embodiment 5.

FIG. 56 is a diagram illustrating variations of a polarizing board in Embodiment 5.

In the polarizing board included in the liquid crystal board 9142 or the liquid crystal panel for transmission 9142a, as illustrated in (a) in FIG. 56, a polarizing area (polarizing filter) may be formed on the whole surface of the polarizing board, and may, as illustrated in (b) to (d) in FIG. 56, be formed partially on the surface of the polarizing board. It should be noted that a hatched portion in FIG. 56 is the aforementioned polarizing filter. In other words, in the polarizing board, as illustrated in (b) and (c) in FIG. 56, a plurality of non-polarizing areas shaped in stripe may be formed as a non-polarizing area with an equal gap. Moreover, in the polarizing board, as illustrated in (d) in FIG. 56, a non-polarizing area like a grid may be formed. In other words, in at least one of the two polarizing boards comprising the liquid crystal board 9142 in the present embodiment, an area in which polarization is not performed on outside light (non-polarizing area) is formed uniformly with respect to the polarizing board.

Since this non-polarizing area is formed in the polarizing board, it is possible to increase the amount of light passing through the liquid crystal board 9142. As a result, when the liquid crystal board 9142 is installed on the signboard 9147*a*, it is possible to make it easy to see the surface of the signboard 9147*a*. It should be noted that it is desirable that the non-polarizing area is finely and uniformly formed on the polarizing board. When the non-polarizing area is finely and uniformly formed, it is possible to suppress unevenness in the transmittance of the liquid crystal board 9142 and equalize the amount of light emitted from the liquid crystal board 9142. Moreover, it is possible to make the non-polarizing area less noticeable. It should be noted that in an example in FIG. 56, the shape of the non-polarizing area is like a stripe or a grid, any shape is acceptable. Moreover, in each of the two polarizing boards comprising the liquid crystal board 9142, a non-polarizing area having the same shape and size may be formed, and a non-polarizing area having a mutually different shape and size may be formed.

It should be noted that the configurations of the transmitter, receiver, and liquid crystal board in the present embodiment may be those in other embodiments.

Embodiment 6

The following will describe an imaging method according to Embodiment 6. The receiver in each of the aforementioned embodiments may, by imaging the transmitter according to an imaging method in Embodiment 6, receive a signal transmitted from the transmitter (visible light signal). In this case, the receiver includes, as a light receiving unit or an imaging unit, an image sensor including a plurality of exposure lines (imaging element).

(Observation of Luminance of Light Emitting Unit)

Figure 57:
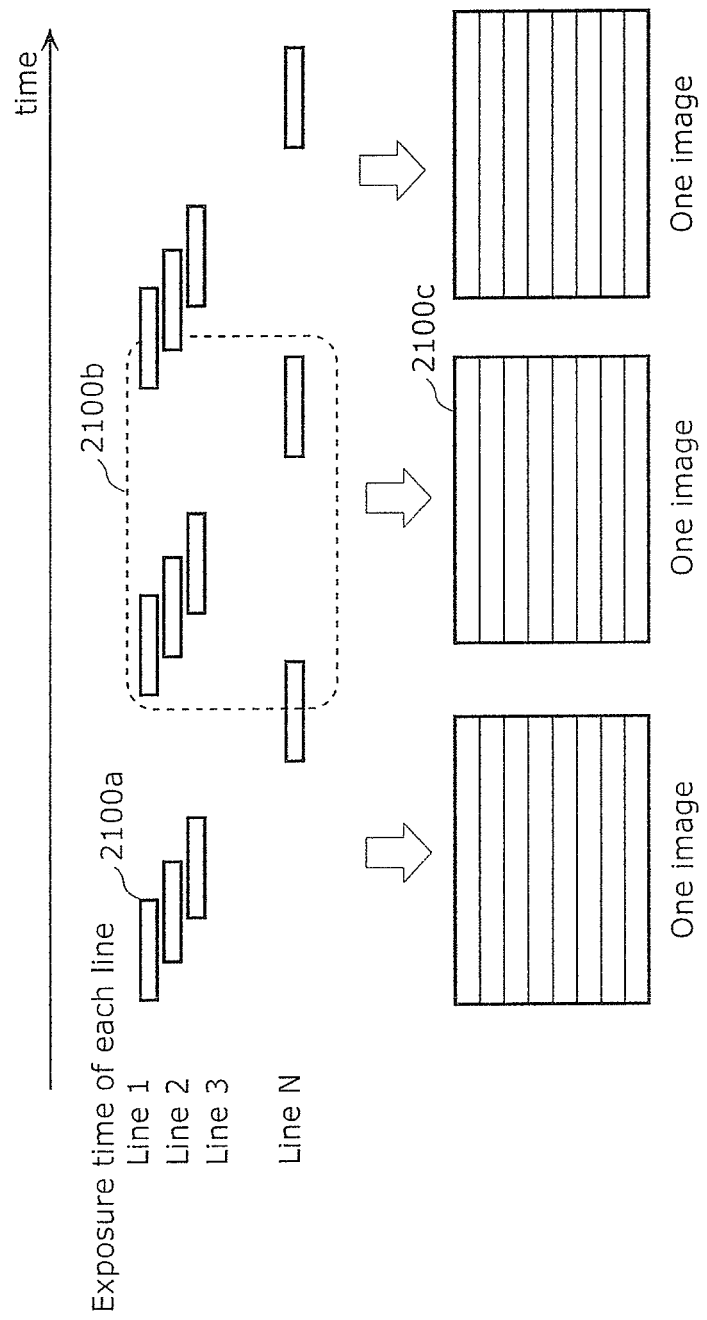
FIG. 57 illustrates an example of an observation method of luminance of a light emitting unit in Embodiment 5.

The following proposes an imaging method in which, when imaging one image, all imaging elements are not exposed simultaneously but the times of starting and ending the exposure differ between the imaging elements. FIG. 57 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 58:
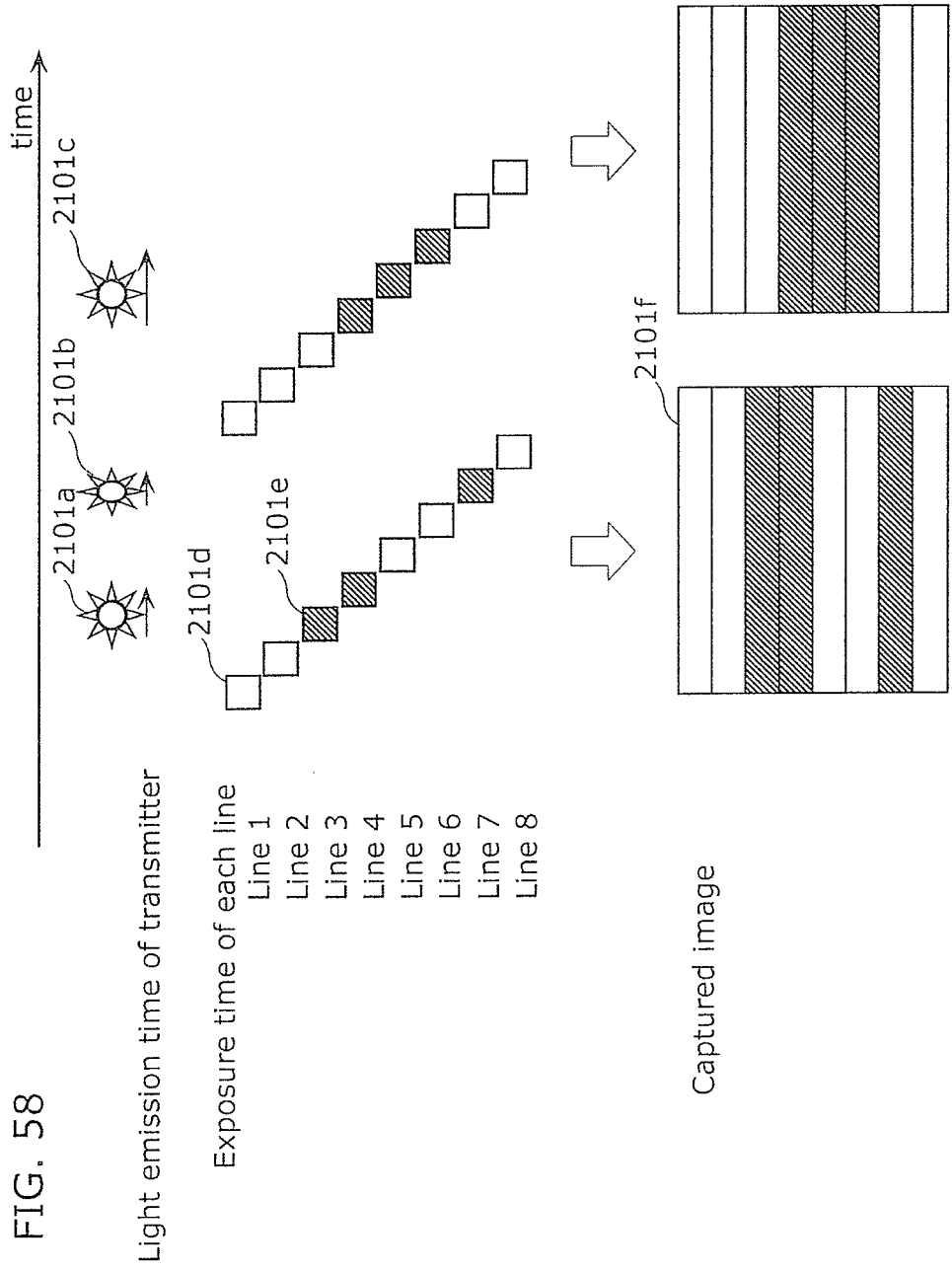
FIG. 58 illustrates an example of an observation method of luminance of a light emitting unit in Embodiment 5.

In the case of imaging a blinking light source shown on the entire imaging elements using this imaging method, bright lines (lines of brightness in pixel value) along exposure lines appear in the captured image as illustrated in FIG. 58. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 milliseconds. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 58 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

If the exposure state of each exposure line caused by the light emission of the light emitting unit is recognizable in a plurality of levels as illustrated in FIG. 59, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 60A:
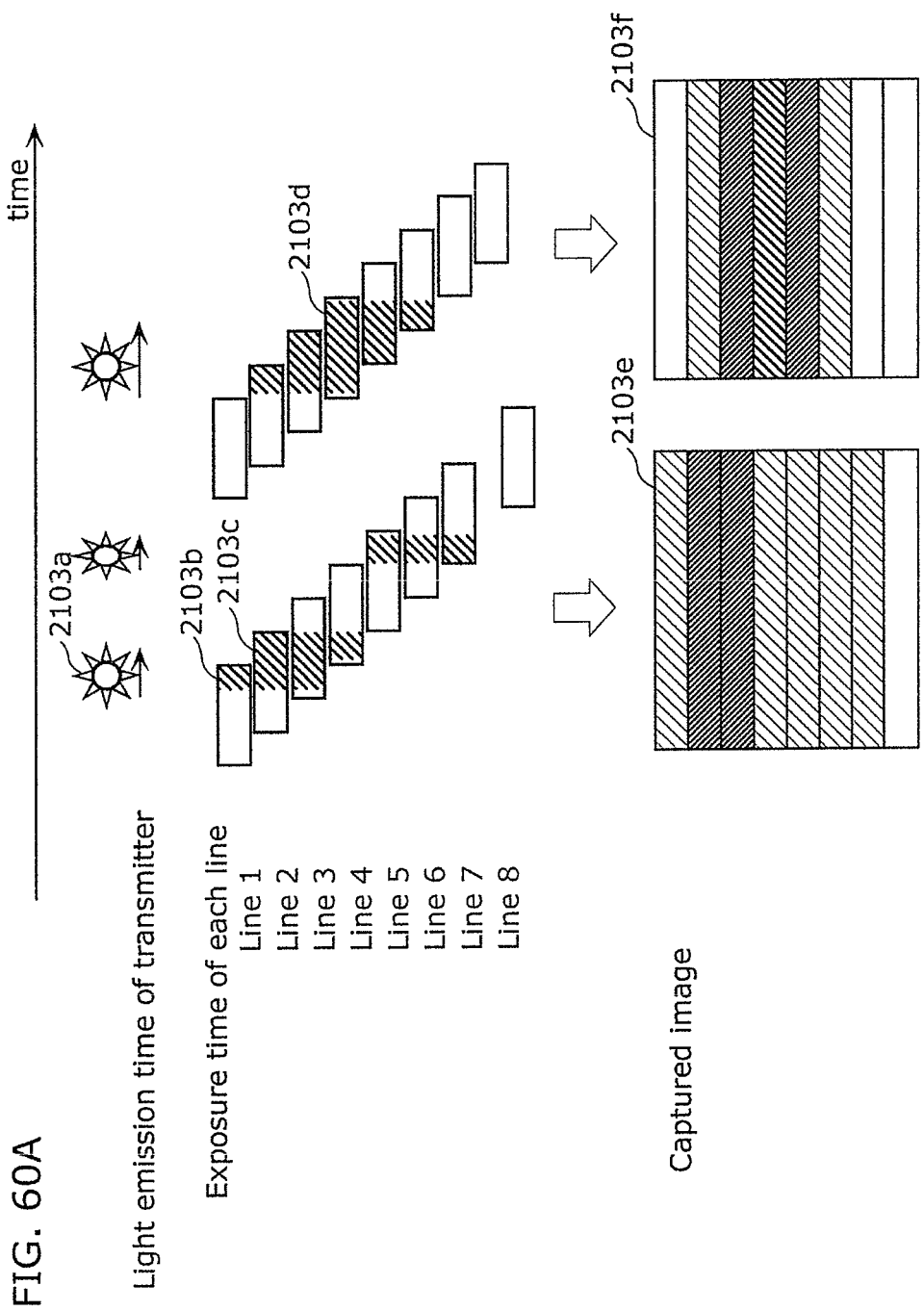
FIG. 60A illustrates an example of an observation method of luminance of a light emitting unit in Embodiment 5.

FIG. 60A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

FIG. 60B illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for imaging an image of the same brightness can be reduced, an image with less noise can be obtained. Communication errors are prevented in this way.

Figure 60C:
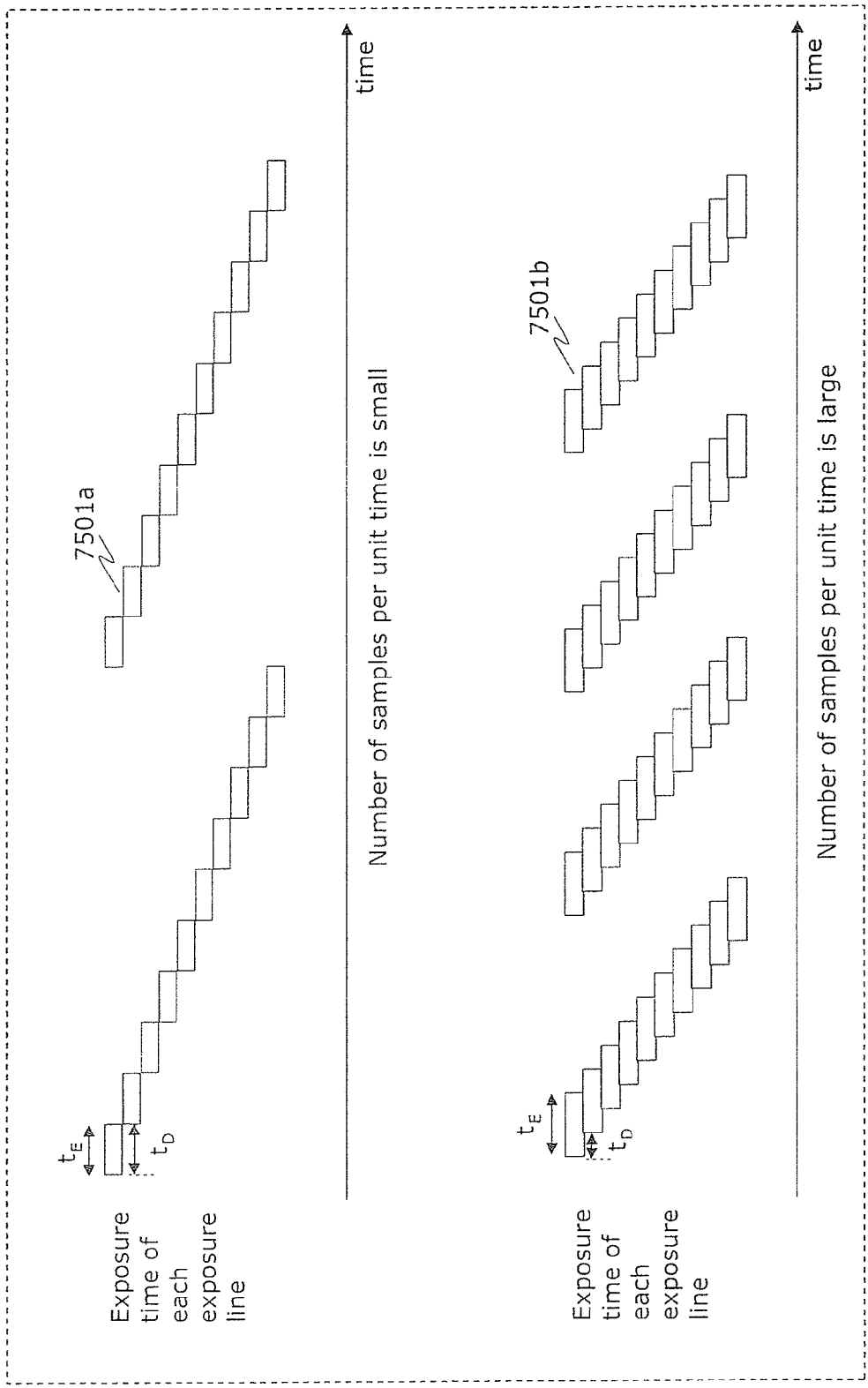
FIG. 60C illustrates an example of an observation method of luminance of a light emitting unit in Embodiment 5.

FIG. 60C illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 60B and 60C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

FIG. 60D illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure blank time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure blank time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

FIG. 60E illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E>t_S$, a bright line pattern different from the luminance change of the light source might be obtained, making it difficult to recognize the luminance change of the light source from the captured image.

FIG. 60F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

FIG. 60G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 60H:
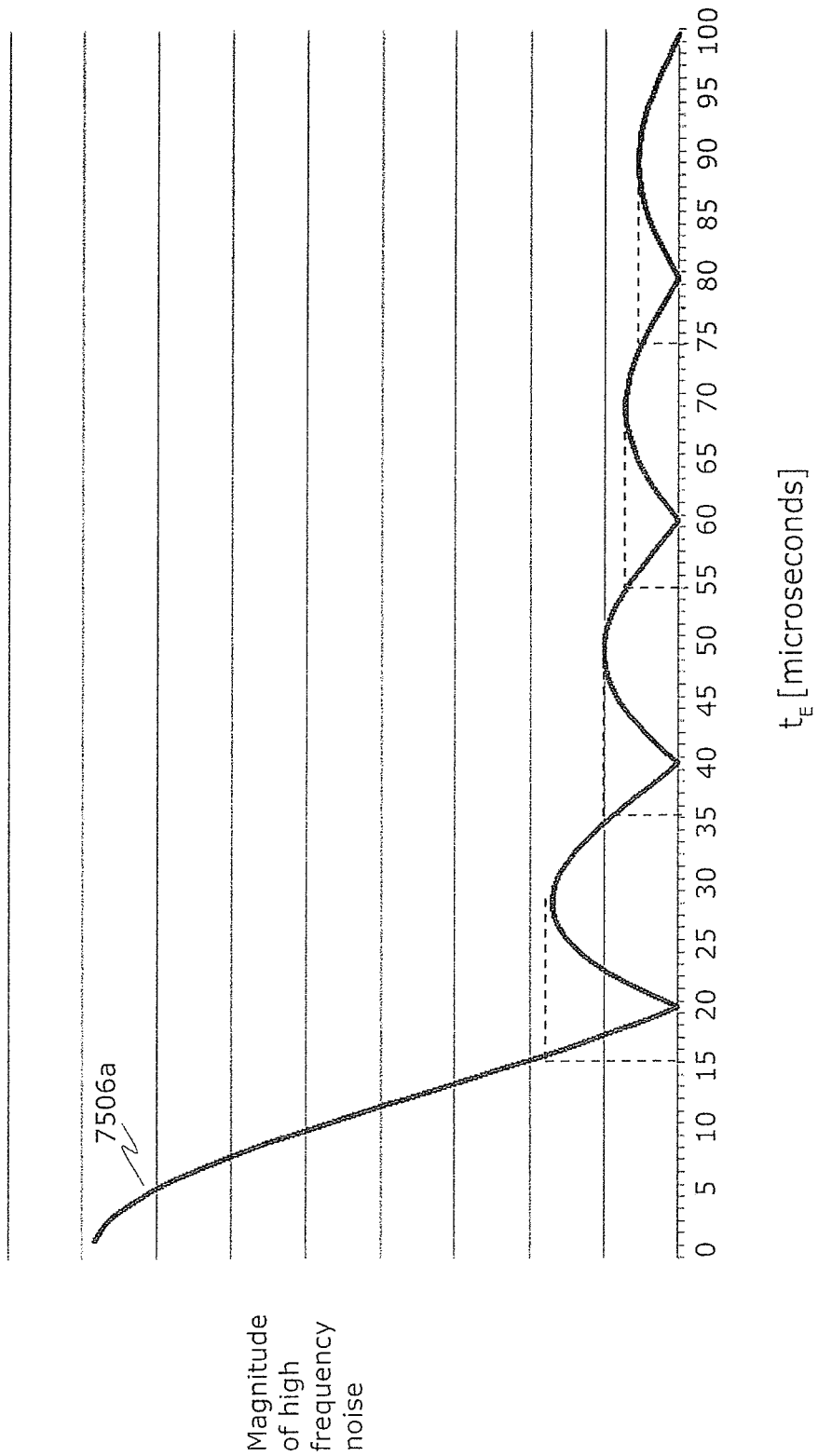
FIG. 60H illustrates an example of an observation method of luminance of a light emitting unit in Embodiment 5.

FIG. 60H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 60I:
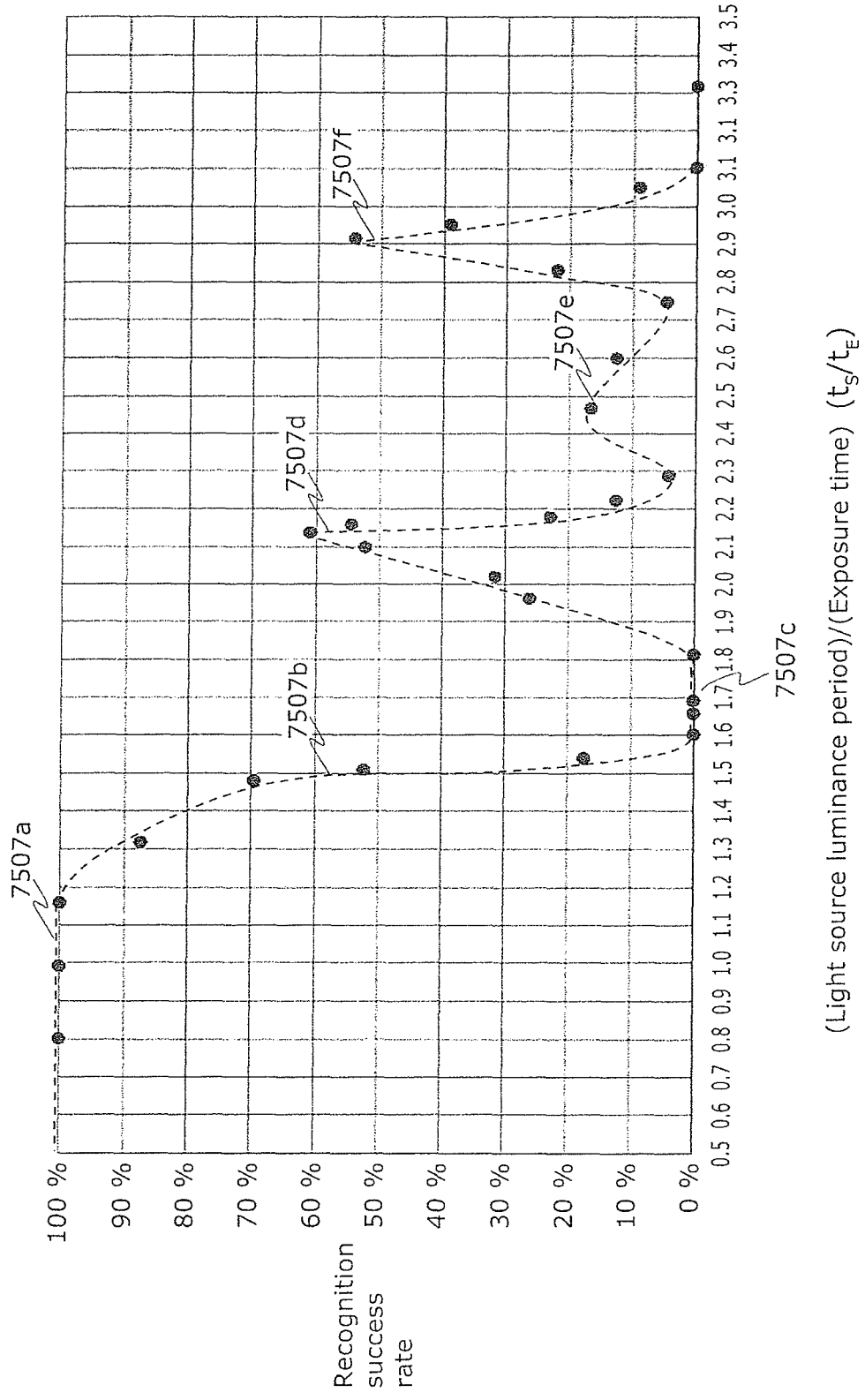
FIG. 60I illustrates an example of an observation method of luminance of a light emitting unit in Embodiment 5.
Figure 62:
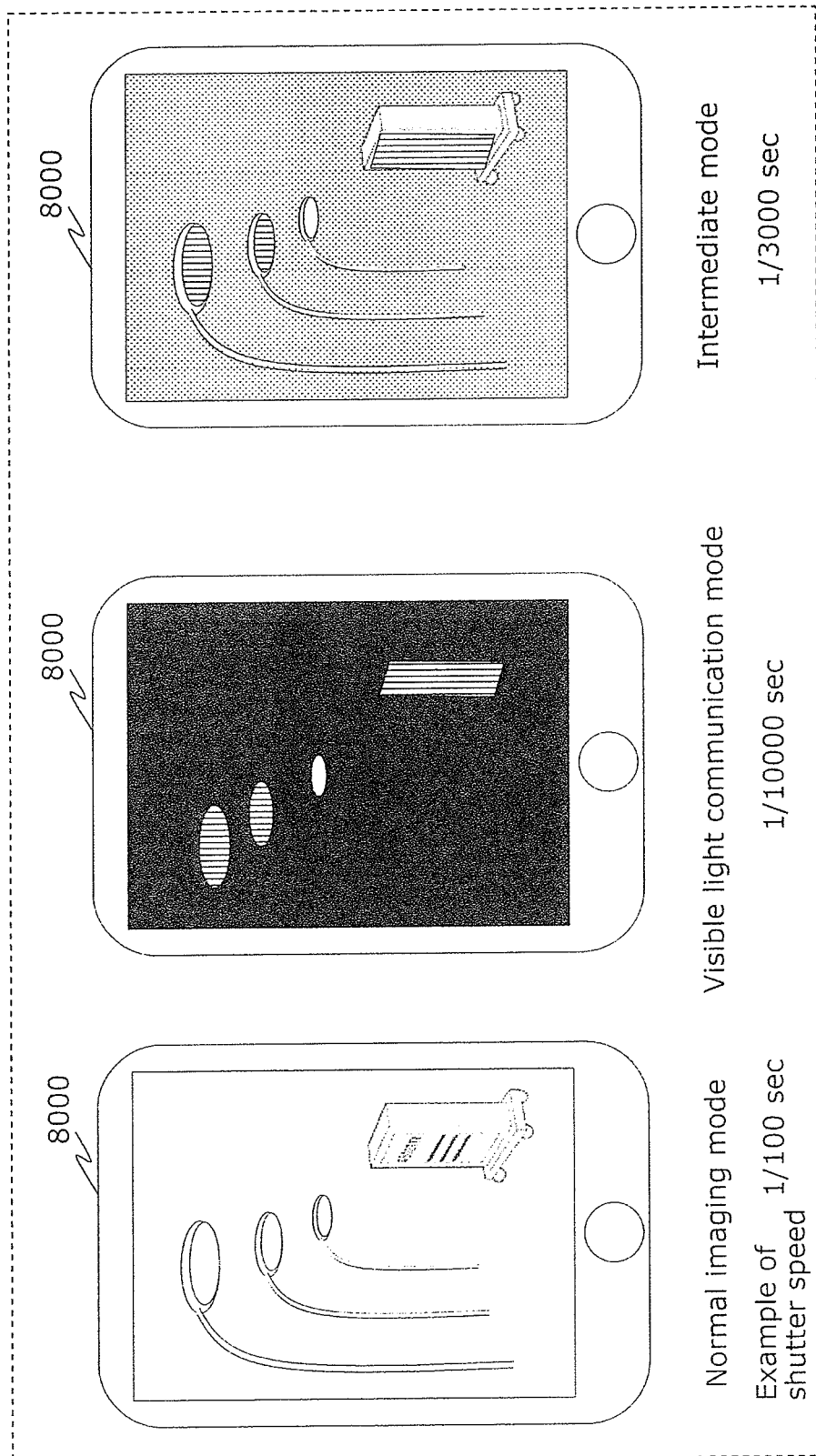
FIG. 62 illustrates an example of each mode of a receiver in Embodiment 5.

FIG. 60I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period is by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 62.

Figure 61:
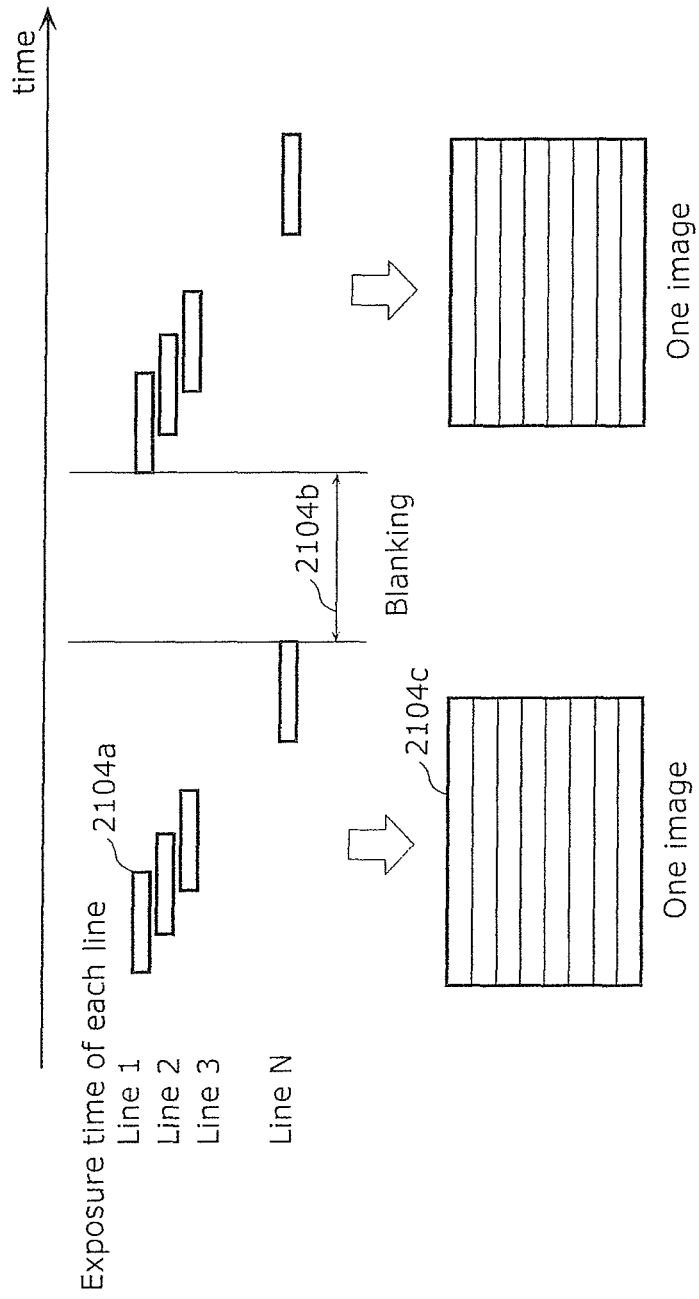
FIG. 61 illustrates an example of an observation method of luminance of a light emitting unit in Embodiment 5.

Depending on imaging devices, there is a time (blanking) during which no exposure is performed, as illustrated in FIG. 61.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 7

Figure 63:
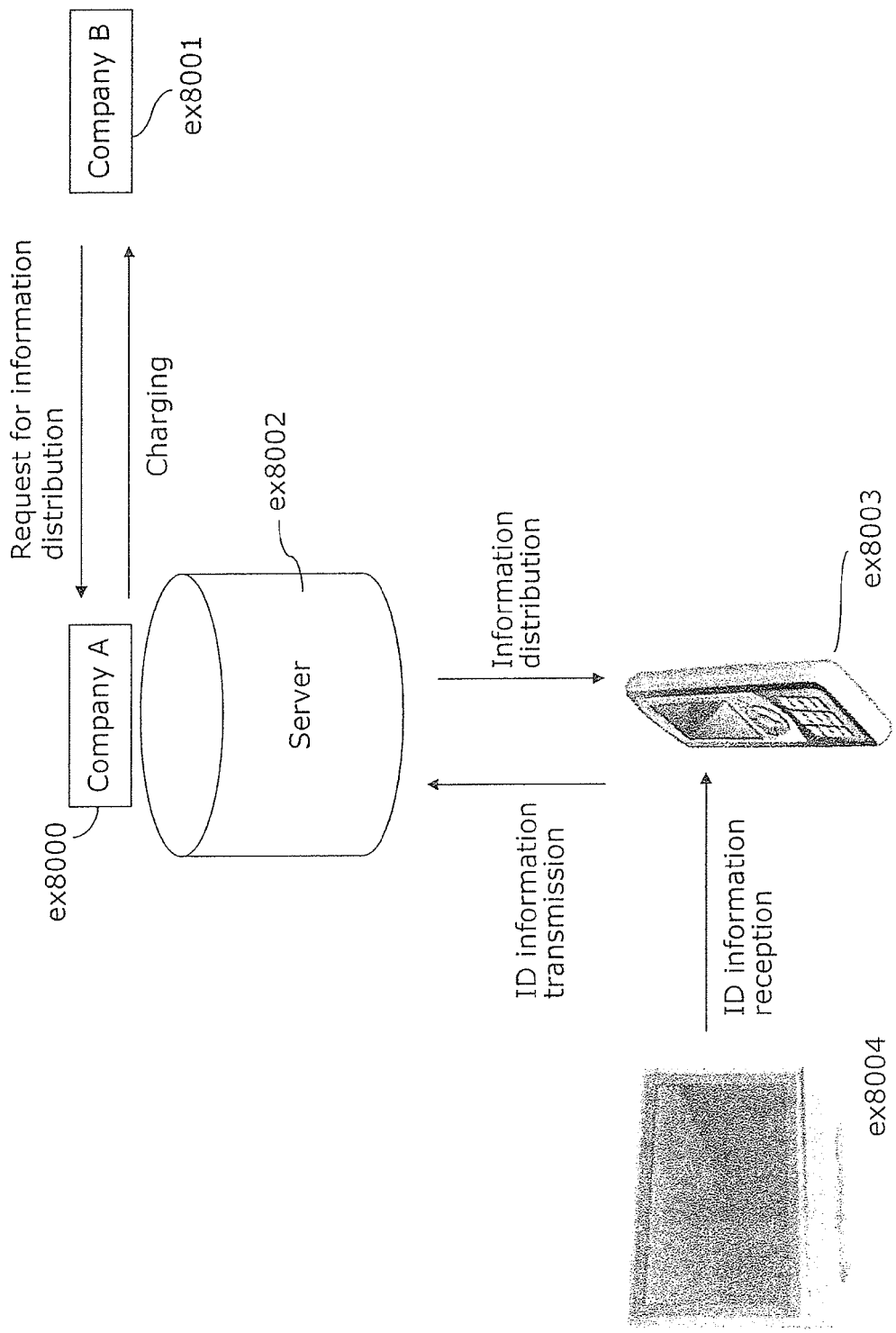
FIG. 63 illustrates a service provision system using the reception method described in any of the foregoing embodiments.

FIG. 63 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 64:
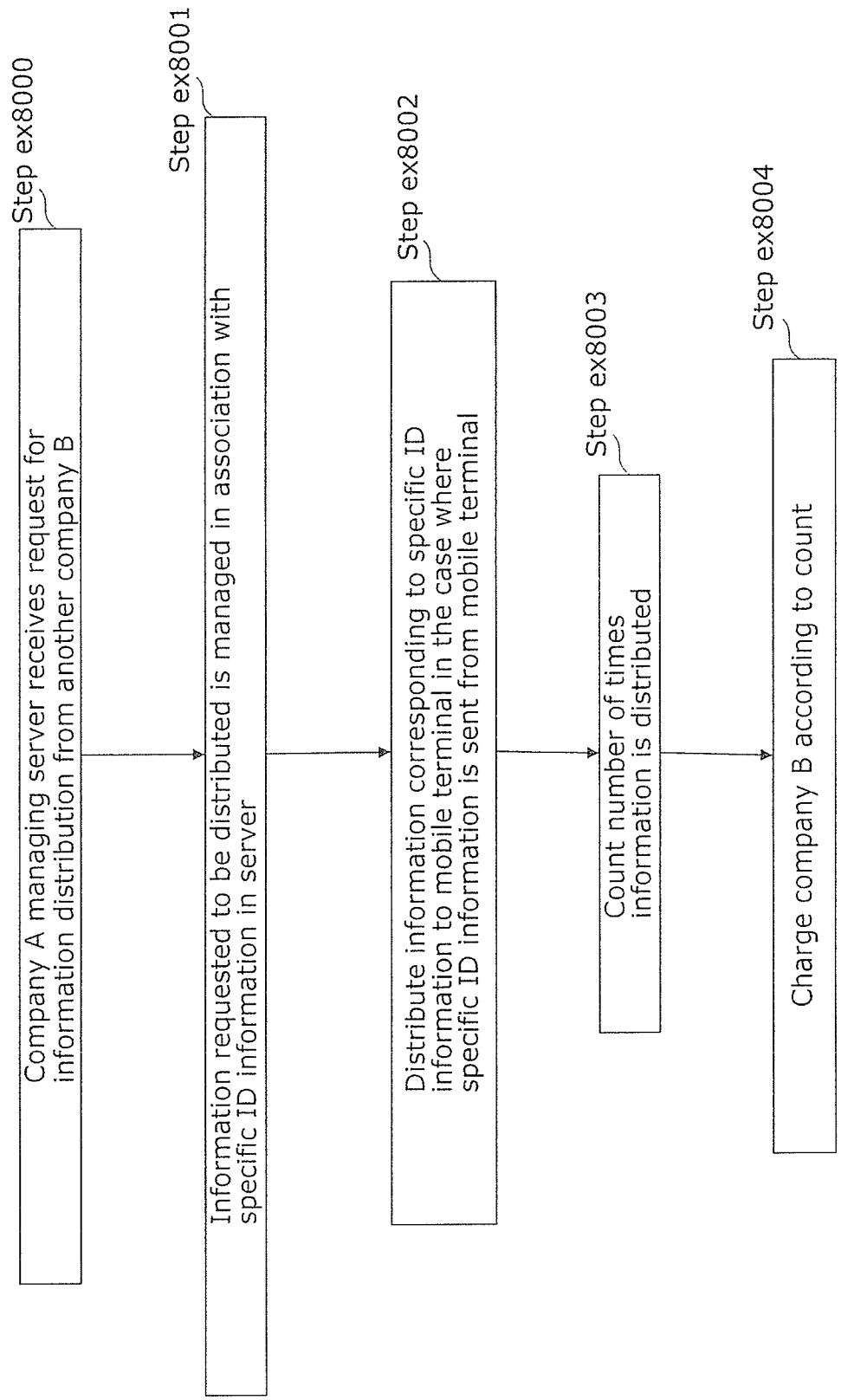
FIG. 64 is a flowchart illustrating flow of service provision.

FIG. 64 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 65:
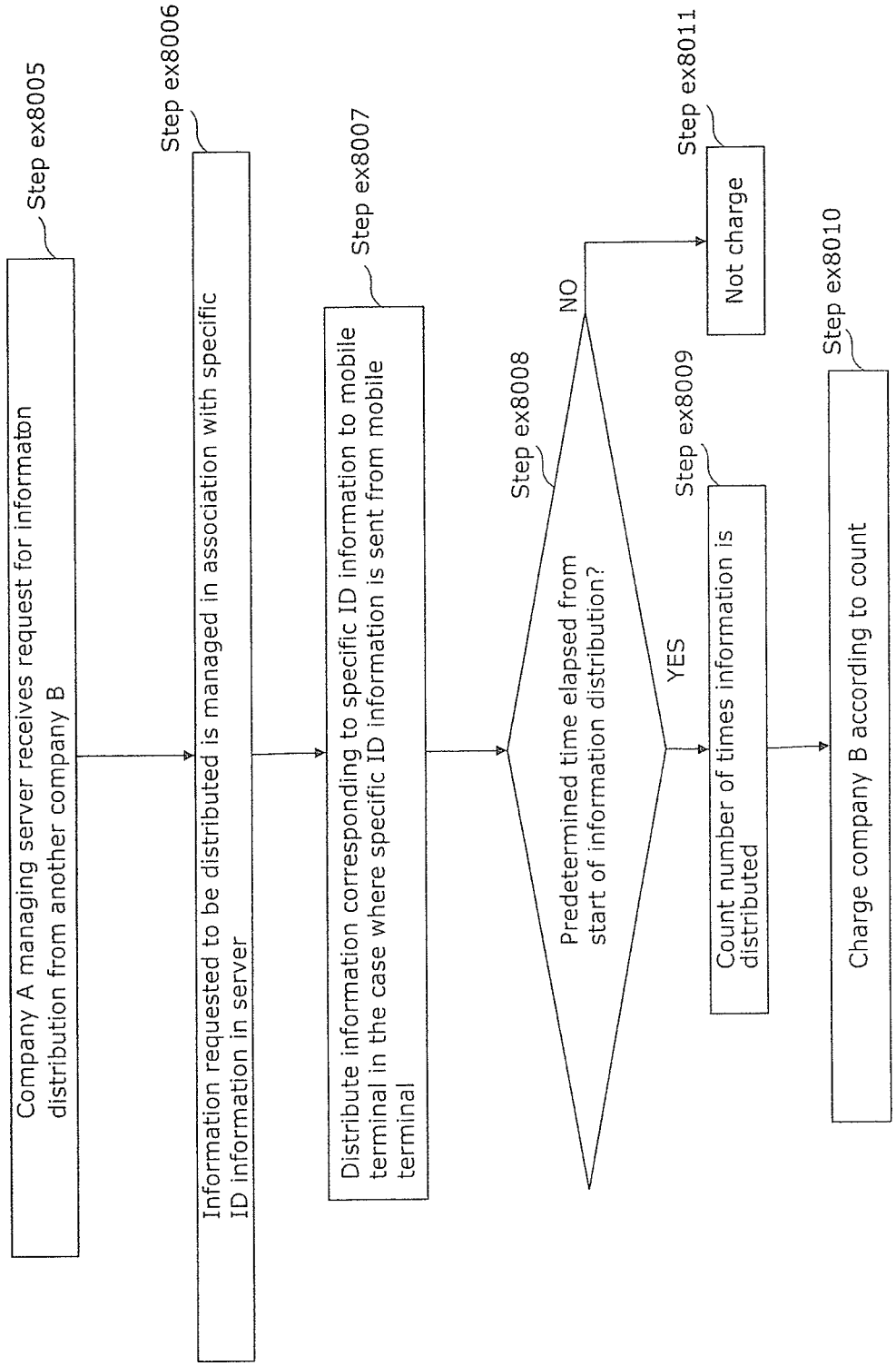
FIG. 65 is a flowchart illustrating service provision in another example.

FIG. 65 is a flowchart illustrating service provision in another example. The description of the same steps as those in FIG. 64 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 66:
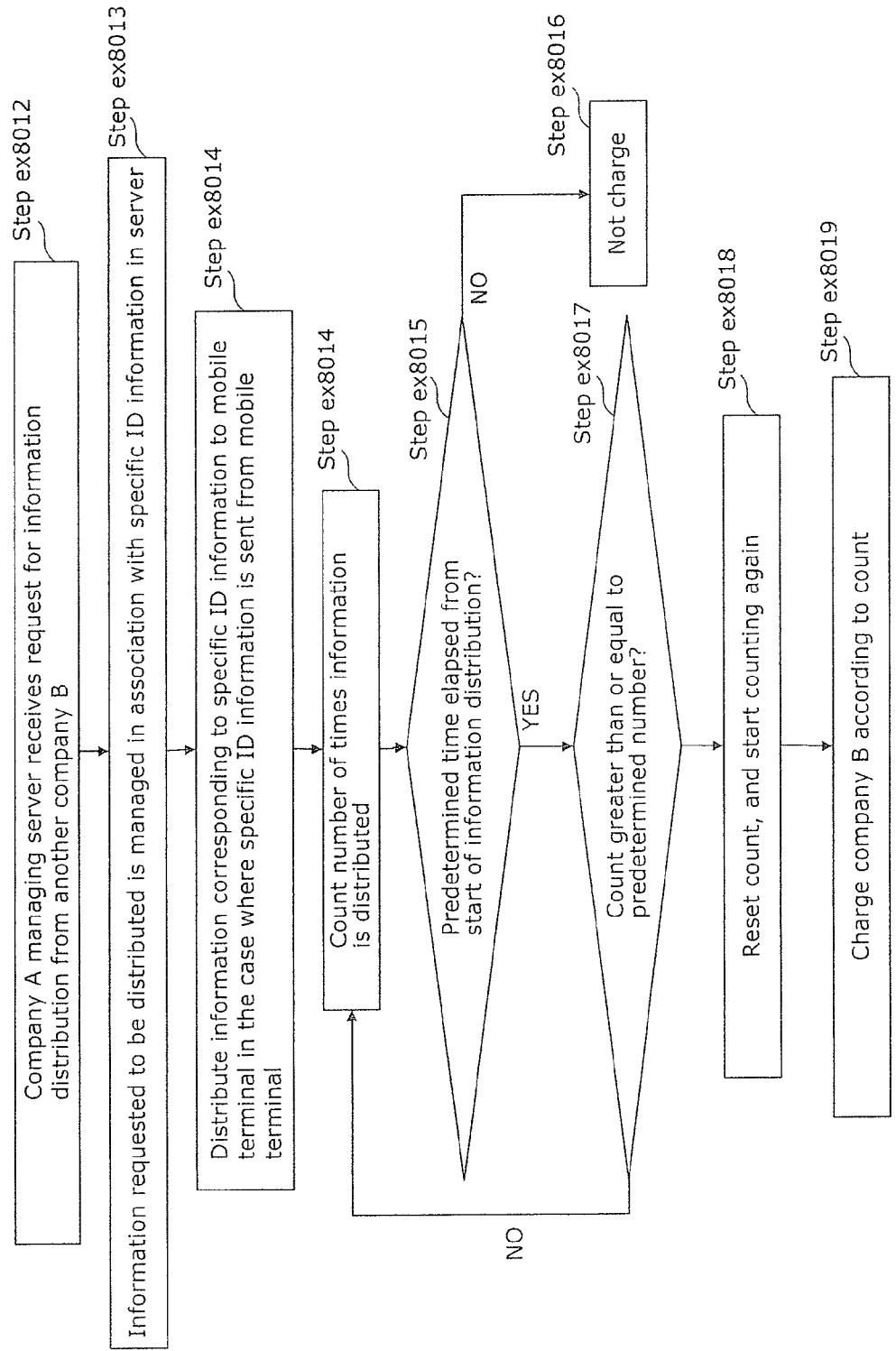
FIG. 66 is a flowchart illustrating service provision in another example.

FIG. 66 is a flowchart illustrating service provision in another example. The description of the same steps as those in FIG. 65 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

Embodiment 6

The following will describe an imaging method according to Embodiment 6. The receiver in each of the aforementioned embodiments may, by imaging the transmitter according to an imaging method in Embodiment 6, receive a signal transmitted from the transmitter (visible light signal). In this case, the receiver includes, as a light receiving unit or an imaging unit, an image sensor including a plurality of exposure lines (imaging element).

(Observation of Luminance of Light Emitting Unit)

The following proposes an imaging method in which, when imaging one image, all imaging elements are not exposed simultaneously but the times of starting and ending the exposure differ between the imaging elements. FIG. 57 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

In the case of imaging a blinking light source shown on the entire imaging elements using this imaging method, bright lines (lines of brightness in pixel value) along exposure lines appear in the captured image as illustrated in FIG. 58. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 milliseconds. In the case where the number of exposure lines whose exposure times do not overlap each other is 1000, it is possible to recognize a luminance change in a period of $1/30000$ second (about 33 microseconds). Note that the exposure time is set to less than 10 milliseconds, for example.

FIG. 58 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

If the exposure state of each exposure line caused by the light emission of the light emitting unit is recognizable in a plurality of levels as illustrated in FIG. 59, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

FIG. 60A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

FIG. 60B illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for imaging an image of the same brightness can be reduced, an image with less noise can be obtained. Communication errors are prevented in this way.

FIG. 60C illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 60B and 60C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore ½f at the shortest. Besides, since 4-value information needs to be received within the time of ½f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

FIG. 60D illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure blank time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure blank time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

FIG. 60E illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E>t_S$, a bright line pattern different from the luminance change of the light source might be obtained, making it difficult to recognize the luminance change of the light source from the captured image.

FIG. 60F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

FIG. 60G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

FIG. 60H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

FIG. 60I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period is by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 62.

Depending on imaging devices, there is a time (blanking) during which no exposure is performed, as illustrated in FIG. 61.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 7

FIG. 63 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

FIG. 64 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

FIG. 65 is a flowchart illustrating service provision in another example. The description of the same steps as those in FIG. 64 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

FIG. 66 is a flowchart illustrating service provision in another example. The description of the same steps as those in FIG. 65 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

It should be noted that each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the transmitter according to each of the embodiments is a program described below. In other words, this program causes a computer to execute each of the steps of a flowchart illustrated in any of FIG. 19B, FIG. 23, FIG. 34, FIG. 35, FIG. 40, FIG. 43B, and FIGS. 64 to 66.

Although a transmitter and the like according to one or more embodiment have been described above, the present disclosure is not limited to these embodiments. Those skilled in the art will readily appreciate that various modifications may be made in these exemplary embodiments without materially departing from the principles and spirit of the inventive concept, the scope of which is defined in the appended Claims and their equivalents.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The present disclosure is applicable to a transmitter and the like, and in particular to a transmitter and the like used for communication with a mobile terminal such as a smartphone, a tablet terminal, or a mobile phone, and with a home electric appliance such as an air conditioner, a lighting device, or a rice cooker.

The invention claimed is:

1. A transmitter that transmits a signal to a receiver by changing an amount of light emitted, the transmitter comprising:
    a liquid crystal board;
    a first board having translucency;
    a second board disposed to sandwich the first board with the liquid crystal board; and
    a control unit configured to, by switching transmittance of the liquid crystal board with respect to outside light between a first transmittance and a second transmittance through application, to the liquid crystal board, of a control voltage corresponding to a signal to be transmitted, change an amount of outside light reflected by the first board and emitted toward the receiver via the liquid crystal board,
    wherein the control unit is configured to, when switching the transmittance of the liquid crystal board to the second transmittance, maintain the transmittance of the liquid crystal board at the second transmittance until outside light that passed through the liquid crystal board is reflected by the second board and reaches the liquid crystal board via the first board, the second transmittance being lower than the first transmittance.

2. The transmitter according to claim 1,
    wherein the liquid crystal board includes: a first polarizing board provided on a surface side of a liquid crystal display; a liquid crystal; and a second polarizing board disposed to sandwich the liquid crystal board with the first polarizing board, and
    the second polarizing board is installed on the liquid crystal display so that a polarizing direction of the second polarizing board is perpendicular to a polarizing direction of the first polarizing board.

3. The transmitter according to claim 1,
    wherein a signal transmitting unit including the liquid crystal board, the first board, and the second board is formed only at an end of a surface of a liquid crystal display.

4. The transmitter according to claim 1,
    wherein a signal transmitting unit including the liquid crystal board, the first board, and the second board is formed only on a rim of a surface of a liquid crystal display.

5. The transmitter according to claim 1,
    wherein a signal transmitting unit including the liquid crystal board, the first board, and the second board is formed only in a portion along a boundary between a plurality of liquid crystal displays that are disposed adjacent to each other, in each surface of the plurality of liquid crystal displays.

6. The transmitter according to claim 1,
    wherein the control unit is configured to, by changing a control voltage to be applied to the liquid crystal board in a range higher than a predetermined voltage value, switch the transmittance of the liquid crystal board between the first transmittance and the second transmittance.

7. The Transmitter according to claim 6,
    wherein the predetermined voltage value is 0 V.

8. The transmitter according to claim 1,
    wherein the control unit is configured to, when transmitting a k-th signal in a case where different frequencies are assigned to respective 0th to n-th signals, apply a control voltage that changes at a frequency assigned to the k-th signal to the liquid crystal board, k being an integer from 0 to n, n being an integer of at least 0, and
    when, in the assignment of the different frequencies, a value of an i-th signal is represented by $(a+b \times i)$ using constants a and b, the different frequencies are assigned so that a difference between a frequency $f(i)$ assigned to the i-th signal and a frequency $f(i-1)$ assigned to an $(i-1)$th signal is larger or smaller as i is larger, i being an integer from 0 to 1.

9. The transmitter according to claim 1,
    wherein in at least one of two polarizing boards included in the liquid crystal board, an area in which polarization is not performed on outside light is uniformly formed with respect to the at least one of two polarizing boards.

10. A transmitting method of transmitting, by a transmitter, a signal to a receiver by changing an amount of light emitted, the transmitter including:
    a liquid crystal board; a first board having translucency; and a second board disposed to sandwich the first board with the liquid crystal board,
    the transmitting method comprising:
    changing, by switching transmittance of the liquid crystal board with respect to outside light between a first transmittance and a second transmittance through application, to the liquid crystal board, of a control voltage corresponding to a signal to be transmitted, an amount of outside light reflected by the first board and emitted toward the receiver via the liquid crystal board; and
    maintaining, when the transmittance of the liquid crystal board is switched to the second transmittance, the transmittance of the liquid crystal board at the second transmittance until outside light that passed through the liquid crystal board is reflected by the second board and reaches the liquid crystal board via the first board, the second transmittance being lower than the first transmittance.

11. A non-transitory computer-readable recording medium for use in a computer, the recording medium having recorded thereon a program for controlling a transmitter that transmits a signal to a receiver by changing an amount of light emitted, the transmitter including: a liquid crystal board; a first board having translucency; and a second board disposed to sandwich the first board with the liquid crystal board, the program causing the computer to execute:
    changing, by switching transmittance of the liquid crystal board with respect to outside light between a first transmittance and a second transmittance through application, to the liquid crystal board, of a control voltage corresponding to a signal to be transmitted, an amount of outside light reflected by the first board and emitted toward the receiver via the liquid crystal board; and
    maintaining, when the transmittance of the liquid crystal board is switched to the second transmittance, the transmittance of the liquid crystal board at the second transmittance until outside light that passed through the liquid crystal board is reflected by the second board and reaches the liquid crystal board via the first board, the second transmittance being lower than the first transmittance.

* * * * *